(12) United States Patent
Sasaki et al.

(10) Patent No.: US 11,143,841 B2
(45) Date of Patent: *Oct. 12, 2021

(54) ACCESSORY, IMAGE PICKUP APPARATUS ON WHICH SAME IS MOUNTABLE, AND CAMERA SYSTEM

(71) Applicant: CANON KABUSHIKI KAISHA, Tokyo (JP)

(72) Inventors: Kunihiko Sasaki, Utsunomiya (JP); Toshinori Yamazaki, Tokyo (JP); Masahisa Tamura, Utsunomiya (JP); Masayasu Shigematsu, Nishitokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,316

(22) Filed: Mar. 25, 2020

(65) Prior Publication Data

US 2020/0225444 A1 Jul. 16, 2020

Related U.S. Application Data

(63) Continuation of application No. 15/992,818, filed on May 30, 2018, now Pat. No. 10,775,585.

(30) Foreign Application Priority Data

May 31, 2017 (JP) .............................. JP2017-108264

(51) Int. Cl.
*G02B 7/14* (2021.01)
*G03B 17/56* (2021.01)
(Continued)

(52) U.S. Cl.
CPC ................. *G02B 7/14* (2013.01); *G02B 7/10* (2013.01); *G03B 17/56* (2013.01); *G03B 17/566* (2013.01);
(Continued)

(58) Field of Classification Search
CPC .. G02B 7/02–16; G03B 17/56; G03B 17/566; H04N 5/2253; H04N 5/2254; H04N 5/23248
See application file for complete search history.

(56) References Cited

U.S. PATENT DOCUMENTS

| 4,307,954 A | 12/1981 | Ludwig |
| 5,021,812 A | 6/1991 | Kohno |

(Continued)

FOREIGN PATENT DOCUMENTS

| CN | 1580850 A | 2/2005 |
| CN | 100495191 C | 6/2009 |

(Continued)

*Primary Examiner* — Sinh Tran
*Assistant Examiner* — Zhenzhen Wu
(74) *Attorney, Agent, or Firm* — Canon U.S.A., Inc. I.P. Division

(57) ABSTRACT

An interchangeable lens assembly includes a plurality of lens-side claw portions configured to enable engagement with a plurality of camera-side claw portions, and a lock pin concave portion in which a lock pin is inserted. Furthermore, θ1 is an angle formed by a line passing through a fifth lens-side end and an optical axis, and a line passing through a center of a lock pin concave portion and the optical axis, and θ2 is an angle formed by a line passing through a fourth lens-side end and the optical axis, and a line that passes through the center of the lock pin concave portion and the optical axis. In the above, θ1 and θ2 satisfy a predetermined conditional expression.

39 Claims, 28 Drawing Sheets

(51) Int. Cl.
  *G02B 7/10* (2021.01)
  *H04N 5/225* (2006.01)
  *H04N 5/232* (2006.01)

(52) U.S. Cl.
  CPC ......... *H04N 5/2253* (2013.01); *H04N 5/2254* (2013.01); *H04N 5/23248* (2013.01)

(56) References Cited

U.S. PATENT DOCUMENTS

| | | |
|---|---|---|
| 8,757,904 B2 | 6/2014 | Hasuda |
| 8,837,062 B2 | 9/2014 | Uehara |
| 9,075,287 B2 | 7/2015 | Hasuda |
| 9,638,987 B2 | 5/2017 | Nishio |
| 9,645,476 B2 | 5/2017 | Hasuda |
| 10,613,419 B2 | 4/2020 | Yamana |
| 10,620,510 B2 | 4/2020 | Tamura et al. |
| 2004/0046890 A1 | 3/2004 | Kikuchi |
| 2006/0165401 A1 | 7/2006 | Doi |
| 2012/0057860 A1* | 3/2012 | Hasuda ................ G03B 17/566 396/531 |
| 2012/0063016 A1 | 3/2012 | Imafuji |
| 2013/0077957 A1* | 3/2013 | Oikawa .................. G03B 17/56 396/532 |
| 2013/0193803 A1 | 8/2013 | Yamasaki |
| 2013/0266304 A1 | 10/2013 | Nishio |
| 2014/0184041 A1 | 7/2014 | Ikezawa |
| 2014/0193145 A1 | 7/2014 | Hasuda |
| 2015/0049244 A1 | 2/2015 | Tokunaga |
| 2015/0168816 A1 | 6/2015 | Fujiwara |
| 2015/0183001 A1 | 7/2015 | Yamamoto |
| 2016/0370689 A1 | 12/2016 | Hasuda |
| 2018/0203213 A1* | 7/2018 | Ueki ...................... G02B 13/00 |
| 2018/0348610 A1* | 12/2018 | Tamura .................. G03B 17/56 |
| 2019/0212634 A1* | 7/2019 | Kondo .................... G03B 17/14 |
| 2020/0201149 A1 | 6/2020 | Tamura et al. |
| 2020/0209719 A1 | 7/2020 | Tamura et al. |

FOREIGN PATENT DOCUMENTS

| | | |
|---|---|---|
| CN | 101533146 A | 9/2009 |
| CN | 102244744 A | 11/2011 |
| CN | 102621660 A | 8/2012 |
| CN | 102970465 A | 3/2013 |
| CN | 103018875 A | 4/2013 |
| CN | 103069335 A | 4/2013 |
| CN | 103296530 A | 9/2013 |
| CN | 103444258 A | 12/2013 |
| CN | 103608725 A | 2/2014 |
| CN | 103702022 A | 4/2014 |
| CN | 104252026 A | 12/2014 |
| CN | 104335116 A | 2/2015 |
| CN | 105516554 A | 4/2016 |
| CN | 105629638 A | 6/2016 |
| CN | 205787540 U | 12/2016 |
| CN | 106462029 A | 2/2017 |
| CN | 106647108 A | 5/2017 |
| CN | 106707454 A | 5/2017 |
| EP | 1672420 A1 | 6/2006 |
| GB | 2187856 A | 9/1987 |
| JP | S62-195633 A | 8/1987 |
| JP | H02-103522 A | 4/1990 |
| JP | H07-114087 A | 5/1995 |
| JP | H109269535 A | 10/1997 |
| JP | 2864384 B2 | 3/1999 |
| JP | 2004102005 A | 4/2004 |
| JP | 2005140846 A | 6/2005 |
| JP | 2010282101 A | 12/2010 |
| JP | 2012-078783 A | 4/2012 |
| JP | 2012-155290 A | 8/2012 |
| JP | 2013235074 A | 11/2013 |
| JP | 2016-126069 A | 7/2016 |
| KR | 20110040740 A | 4/2011 |
| KR | 20130088052 A | 8/2013 |
| RU | 2602404 C2 | 11/2016 |
| SU | 1778745 A1 | 11/1992 |
| TW | 201239502 A | 10/2012 |
| TW | 201312192 A | 3/2013 |
| TW | M464678 U | 11/2013 |
| TW | I518439 B | 1/2016 |

* cited by examiner

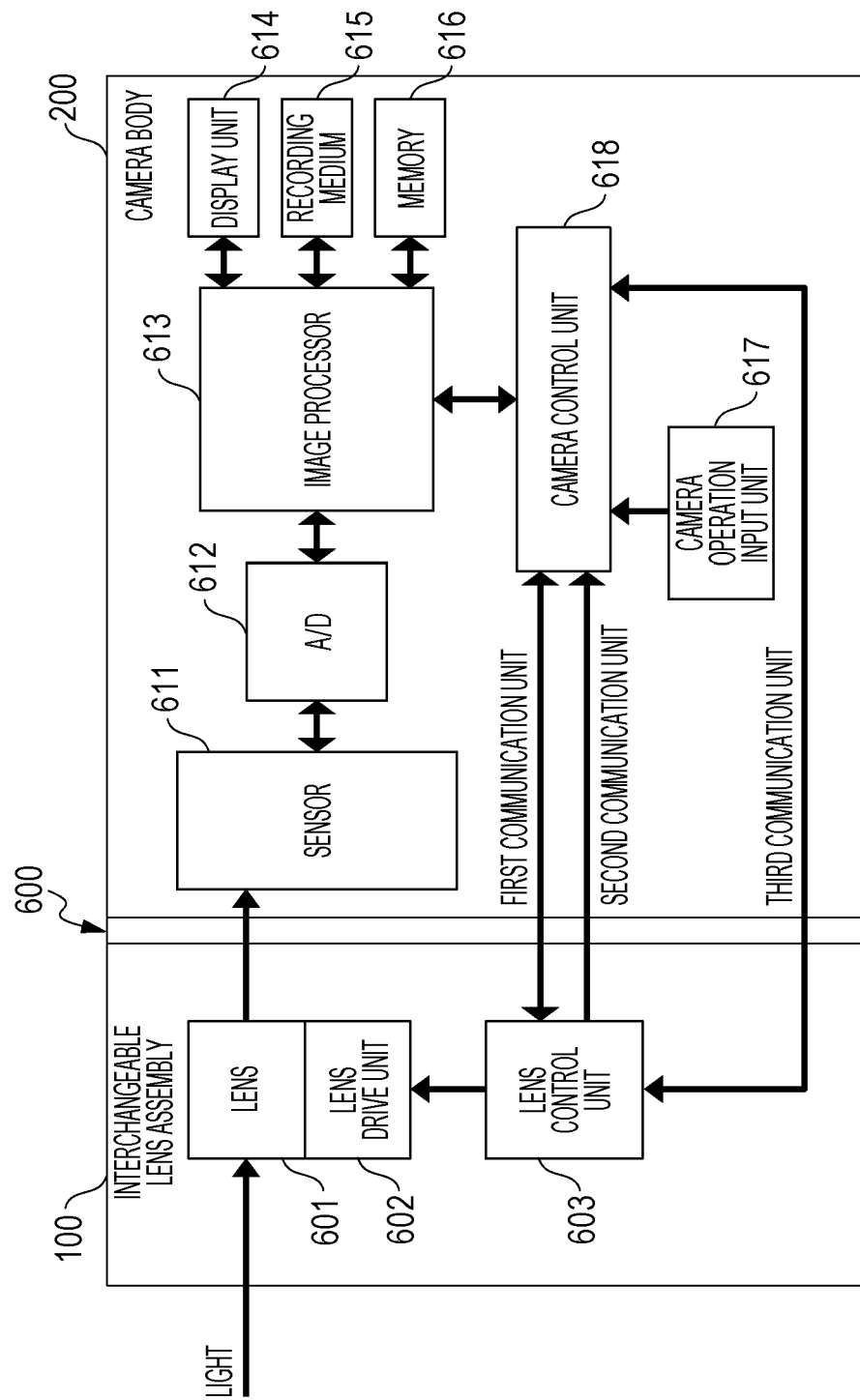

ACCESSORY, IMAGE PICKUP APPARATUS ON WHICH SAME IS MOUNTABLE, AND CAMERA SYSTEM

CROSS REFERENCE TO RELATED APPLICATIONS

This application is a continuation of U.S. patent application Ser. No. 15/992,818 filed May 30, 2018 which claims the benefit of Japanese Patent Application No. 2017-108264 filed May 31, 2017, all of which are hereby incorporated by reference herein in their entirety.

BACKGROUND OF THE INVENTION

Field of the Invention

The present disclosure relates to an accessory, an image pickup apparatus on which the accessory is mountable, and a camera system.

Description of the Related Art

U.S. Pat. No. 8,430,582 discloses a camera body (an image pickup apparatus), and an interchangeable lens assembly (an interchangeable lens) as a camera accessory (an optical apparatus) that can be detachably mounted to the camera body. In U.S. Pat. No. 8,430,582, on initially inserting the interchangeable lens assembly into the camera body, the interchangeable lens assembly is said to be in an insertion/removal phase in which it is rotatable in an, so-called, attaching direction, wherein it becomes removably attached to the camera body. In other words, during the above operation, the interchangeable lens assembly is transitioned to a mounted phase (position), bayonet claw portions on the interchangeable lens assembly side and bayonet claw portions on the camera body side are coupled to each other, and mounting of the interchangeable lens assembly on the camera body is completed.

In U.S. Pat. No. 8,430,582, a lock pin that can be advanced and retracted in an optical axis direction of the interchangeable lens assembly is provided on the camera body side, and a lock pin groove portion, in which the lock pin is insertable is provided on the interchangeable lens assembly side. In U.S. Pat. No. 8,430,582, by inserting the lock pin to the lock pin groove portion, the interchangeable lens assembly is secured to the camera body. The interchangeable lens assembly can only be removed from the camera body by retracting the lock pin from the lock pin groove portion.

The interchangeable lens assembly is required to be mountable to the camera body, when attached, in a stable manner even in a case in which external force such as a vibration is applied to the interchangeable lens assembly. However, in the interchangeable lens assembly described in U.S. Pat. No. 8,430,582, among three bayonet claw portions, the dispositional relationship between one of the two bayonet claw portions that are near the lock pin groove portion in which the lock pin is inserted and the lock pin groove portion, and the dispositional relationship between the other one of the two bayonet claw portions and the lock pin groove portion differ greatly. Accordingly, there is a concern that in U.S. Pat. No. 8,430,582, it is difficult to keep the interchangeable lens assembly mounted on the camera body, in a stable manner, when external forces from various directions is applied or when the orientation of the interchangeable lens assembly is changed.

SUMMARY OF THE INVENTION

Accordingly, the present disclosure provides an accessory that is capable of being mounted on an image pickup apparatus in a more stable manner, an image pickup apparatus on which the accessory can be mounted, and a camera system.

An accessory of the present disclosure is an accessory configured to be detachably mountable to an image pickup apparatus that includes a first mount portion and a pin, the first mount portion including a plurality of first bayonet claw portions, the accessory including a second mount portion that includes a plurality of second bayonet claw portions configured to enable engagement with the plurality of first bayonet claw portions, and a concave portion in which the pin is inserted when the accessory is mounted to the image pickup apparatus, in which when viewed in a central axis direction of the second mount portion, a concave portion side is a side on which the concave portion is provided with respect to a boundary line, the boundary line being a line that is orthogonal to a line passing through a center of the concave portion and a central axis of the second mount portion and that passes through the central axis of the second mount portion, among the plurality of second bayonet claw portions, two second bayonet claw portions that have at least a portion disposed on the concave portion side are denoted as a first concave portion side bayonet claw portion and a second concave portion side bayonet claw portion, and $\theta 1 > \theta 2$, and $1.00 < \theta 1/\theta 2 \leq 1.40$ are satisfied, where $\theta 1$ is an angle formed between a line that passes through an end of the first concave portion side bayonet claw portion that is closer to the concave portion, and the central axis of the second mount portion, and a line that passes through the center of the concave portion and the central axis of the second mount portion, and $\theta 2$ is an angle formed between a line that passes through an end of the second concave portion side bayonet claw portion that is closer to the concave portion, and the central axis of the second mount portion, and a line that passes through the center of the concave portion and the central axis of the second mount portion.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 9A is a block diagram of a camera and an interchangeable lens assembly according to the exemplary embodiment.

DESCRIPTION OF THE EMBODIMENTS

Block Configuration of Interchangeable Lens Assembly and Camera Body

Figure 1:
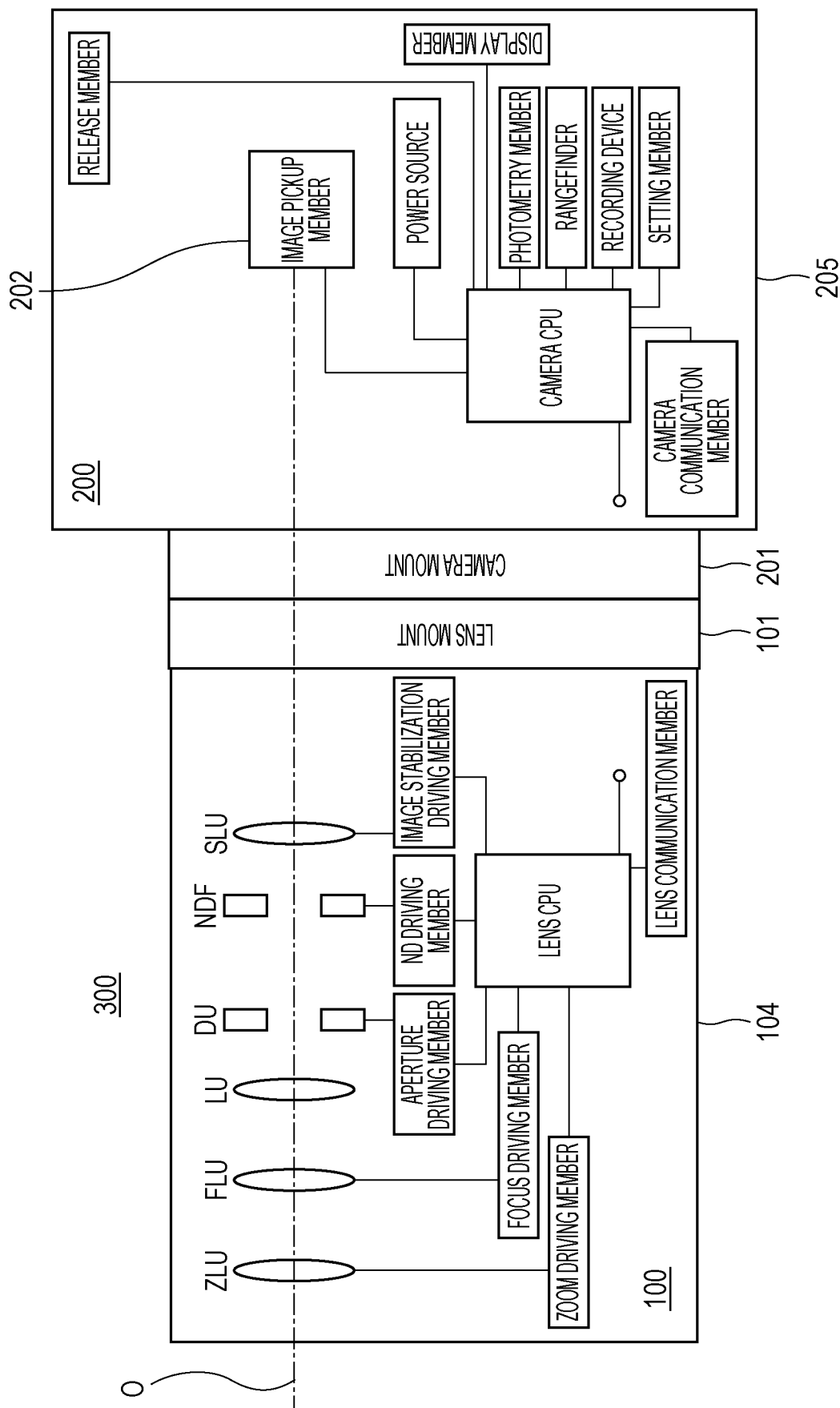
FIG. 1 is a block diagram of a camera body and an interchangeable lens assembly according to an exemplary embodiment of the present disclosure.

Referring first to FIG. 1, a block configuration of an interchangeable lens assembly 100 and a camera body 200 according to the present exemplary embodiment will be described. FIG. 1 is a block diagram of a camera system 300 including the interchangeable lens assembly (an optical apparatus, an accessory, a lens apparatus) 100 and the camera body 200. In FIG. 1 and the diagrams described hereinafter, unnecessary components, components related to the design, and the like are omitted. The interchangeable lens assembly 100 can be mounted and dismounted from the camera body 200.

The camera body 200 includes an image pickup member 202 that is a photoelectric conversion element or an image pickup element that includes a CCD and a CMOS and that converts optical information of a subject obtained through the interchangeable lens assembly 100 into an electric signal, that is, the image pickup member 202 performs photoelectric conversion of the image of the subject. The camera body 200 further includes a camera mount (a first mount portion) 201 connected to a lens mount (a second mount portion) 101 on an interchangeable lens assembly 100 side, and a camera housing 205 that holds the image pickup member 202 and the like.

Other than the image pickup member 202 and the camera mount 201, the camera body 200 also includes a camera communication member that communicates with a lens communication member on the interchangeable lens assembly 100 side, a photometry member that performs photometry, a rangefinder that performs ranging, a recording device that records data of a photograph and a moving image that have been taken. The camera body 200 further includes a setting member that sets photographing conditions, such as a shutter speed, a release member that the user can operate, a display member that displays various pieces of information to the user, and a power source. Moreover, the camera body 200 further includes a camera CPU that is a control member that controls the image pickup member 202 and the like.

The interchangeable lens assembly 100 includes a lens barrel 104, and the lens mount (a camera accessory mount) 101. An electric communication between the interchangeable lens assembly 100 and the camera body 200 is performed by the lens communication member and the camera communication member that include a plurality of electrical contacts capable of being electrically connected to the counterpart. Various types of information, such as power supplying information and control information, can be exchanged between the camera CPU and a lens CPU.

Other than the lens mount 101, the interchangeable lens assembly 100 includes a zooming lens unit ZLU that moves when zooming, a focusing lens unit FLU that moves when focusing, and a shift lens unit SLU that moves to perform a camera shake correction. The interchangeable lens assembly 100 further includes a lens unit LU other than the zooming lens unit ZLU, the focusing lens unit FLU, and the shift lens unit SLU, an aperture unit DU, and a ND filter NDF.

The interchangeable lens assembly 100 further includes a zoom driving member that drives the zooming lens unit ZLU, a focus driving member that drives the focusing lens unit FLU, and an aperture driving member that drives the aperture unit DU. The interchangeable lens assembly 100 further includes an ND driving member that drives the ND filter NDF, and an image stabilization driving member that drives the shift lens unit SLU. The interchangeable lens assembly 100 further includes the lens communication member, and the lens CPU that serves as a control member that controls the lens communication member and the driving members described above.

Configuration of Lens-Side Mount Portion and Camera-Side Mount Portion

Figure 2:
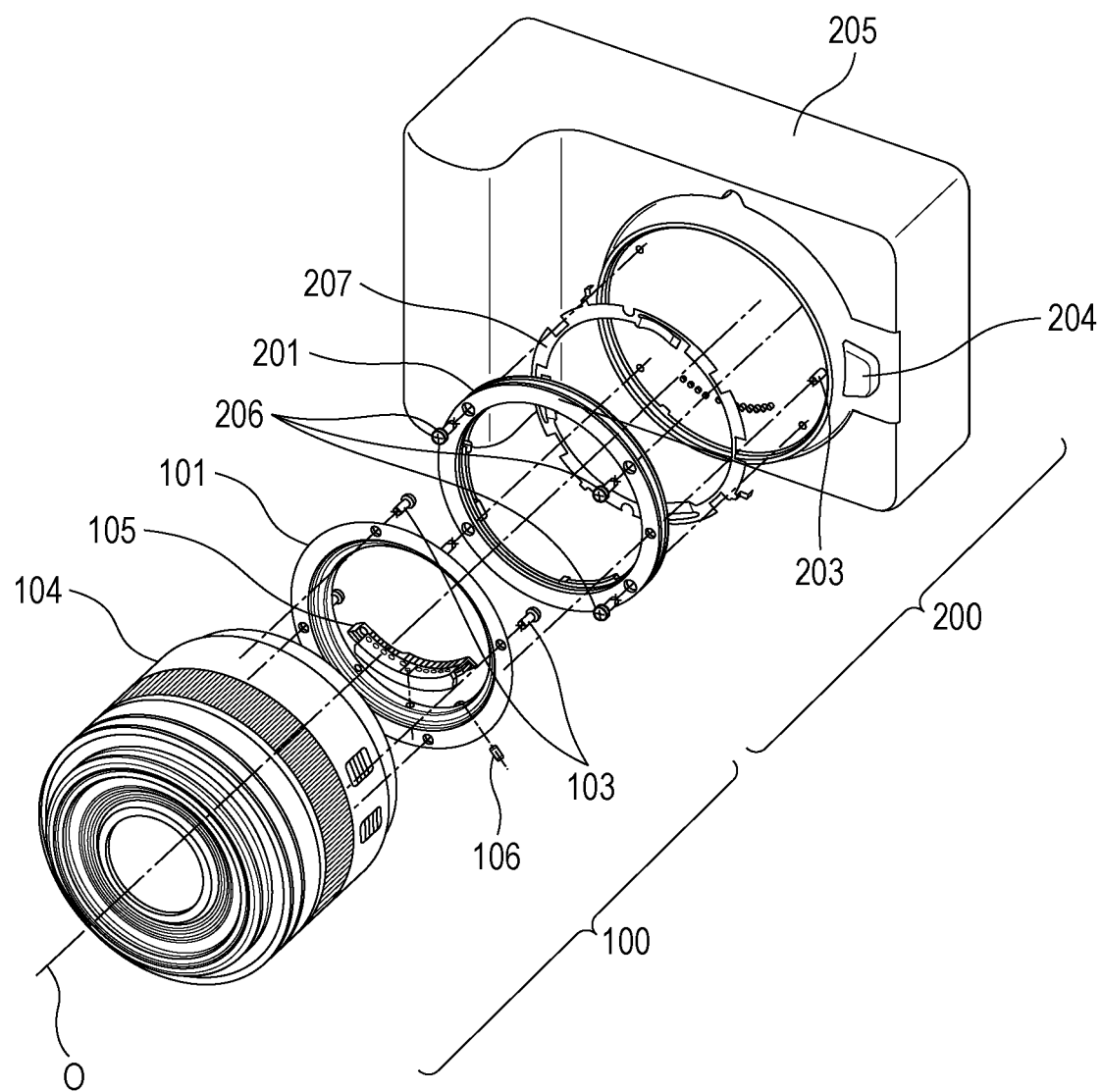
FIG. 2 is an exploded perspective view of mount portions of the exemplary embodiment of the present disclosure.

Referring next to FIG. 2, the mount portions of the interchangeable lens assembly 100 and the camera body 200 will be described. FIG. 2 is an exploded perspective view of the mount portions of the interchangeable lens assembly 100 and the camera body 200.

An optical axis O is an axis that indicates a center of a light flux that is guided by the interchangeable lens assembly 100 and that is from the subject ideally facing the interchangeable lens assembly 100. A lock pin (a pin) 203 is an abutting pin (a restricting portion, a convex portion) that, in a state in which the lens mount 101 and the camera mount 201 are in a mounted state, restricts the cancellation of the mounted state. The lock pin 203 is capable of advancing and retreating in a direction parallel to the optical axis O and has a biasing structure that applies biasing force in the advancing direction at all times.

When the interchangeable lens assembly 100 is in an insertion/removal state with respect to the camera body 200, the lock pin 203 being abutted against the lens mount 101 is pushed into a retreated position. In the above state, the lens mount 101 and the camera mount 201 are in contact with each other. In the mounted state, the lock pin 203 enters (is inserted in) a lock pin groove portion (an inserted portion, a groove portion, a concave portion, a recess) 102 of the lens mount 101, and cancellation of the mounted state is restricted by the lock pin 203 and the lock pin groove portion 102.

When cancelling the mounted state, to remove the interchangeable lens assembly, a release operation member 204 is pushed in, the lock pin 203 is moved from an advanced position to a retreated position, and the interchangeable lens assembly 100 is rotated to an unlocking position. While in a state (the insertion/removal state) in which the contact surfaces of the lens mount 101 and the camera mount 201 are in contact with each other, by relatively moving the interchangeable lens assembly 100 and the camera body 200 from the unlocking position to a locking position, the interchangeable lens assembly 100 and the camera body 200 are connected to each other, or the interchangeable lens assembly 100 and the camera body 200 are brought to the mounted state.

As described above, the camera housing 205 is a base material that holds portions of the camera body 200. More specifically, referring to FIG. 2, the camera housing 205 holds the camera mount 201, a holding member of the camera-side electrical contacts (camera-side terminals or first terminals) that are communication members, camera mount fixing members 206, and a lens mount biasing member 207. The lens mount biasing member 207 is a biasing member that pulls in lens claw portions provided in the lens mount 101 described later towards a camera mount 201 side and is interposed in a space between the camera mount 201 and the camera housing 205.

The lens mount 101 is fixed to the lens barrel (an accessory main body) 104 with lens mount fixing members (mount fixing members) 103. A lens contact portions (lens-side terminals or second terminals) holding member 105 is a holding member that holds a plurality of electrical contacts (terminals) provided on the interchangeable lens assembly 100 side, and is fixed to the lens mount 101 with a lens contact portions holding member fixing member 106.

Disposition of Bayonet Claw Portions of Lens-Side Mount

Figure 3A:
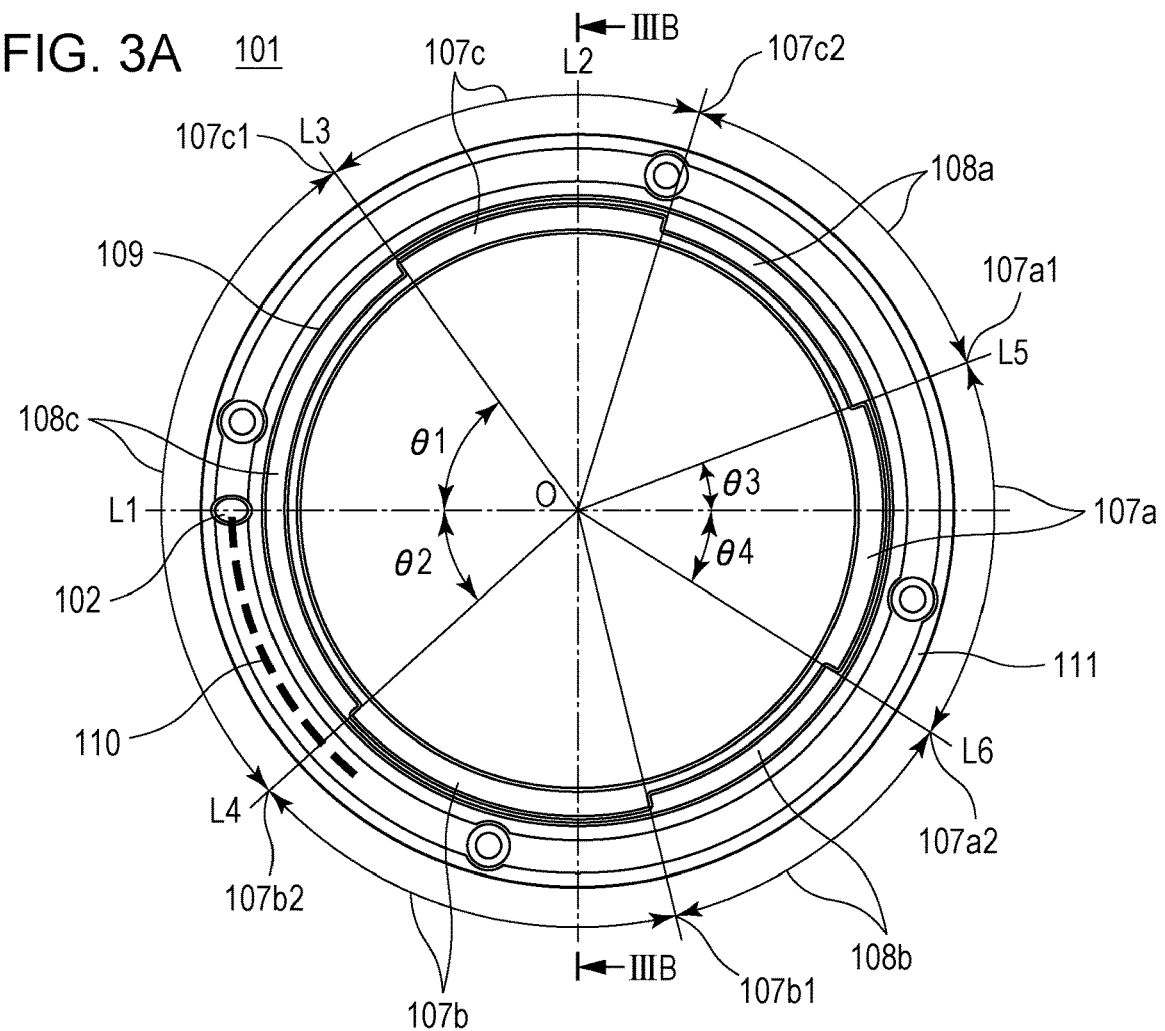
FIG. 3A is a diagram of a lens mount in a normal position viewed from an image pickup plane side.

Referring next to FIG. 3, a phase (disposition) of lens-side bayonet claw portions of the lens mount 101 will be described. Note that in the present exemplary embodiment, the bayonet claw portions on the lens-side is referred to as lens-side claw portions, and the bayonet claw portions on the camera-side is referred to as camera-side claw portions.

FIG. 3 is a diagram viewing the lens mount 101 from an image pickup plane side when the lock pin groove portion 102 in the mounted state, which is a state in which the lock pin 203 is engaged with the lock pin groove portion 102, is at a position (hereinafter, referred to as a normal position) that is a position on the left side when viewed from the image pickup plane side. Note that in the present exemplary embodiment, the lens side is a paraphrase of an optical apparatus (accessory) side, and the camera side is a paraphrase of an image pickup apparatus side.

As illustrated in FIG. 3, when viewed in the optical axis O direction, the lens mount 101 includes a first lens-side claw portion 107a, a second lens-side claw portion 107b, and a third lens-side claw portion 107c that have dimensions in a radial direction and a circumferential direction of an opening included in the lens mount 101. The first lens-side claw portion 107a, the second lens-side claw portion 107b, and the third lens-side claw portion 107c are included in the interchangeable lens assembly 100, and are a plurality of lens-side claw portions (a plurality of second engagement portions or a plurality of second bayonet claw portions) that are capable of engaging with a plurality of camera-side claw portions (a plurality of first engagement portions or a plurality of first bayonet claw portions). Furthermore, the lens mount 101 includes a lens-side diameter fitting portion 109 that becomes a restriction in a direction orthogonal to the optical axis when the lens mount 101 is attached to the camera mount 201.

Note that in the description hereinafter, a portion between the third lens-side claw portion 107c and the first lens-side claw portion 107a is referred to as a first lens-side cutaway (a first cutaway, a first concave portion, a first recess, the same applies hereafter) 108a, and a portion between the first lens-side claw portion 107a and the second lens-side claw portion 107b is referred to as a second lens-side cutaway (a second cutaway) 108b. Furthermore, a portion between the second lens-side claw portion 107b and the third lens-side claw portion 107c is referred to as a third lens-side cutaway (a third cutaway) 108c. Furthermore, one end of the first lens-side claw portion 107a is referred to as a first lens-side end 107a1 and the other end is referred to as a second lens-side end 107a2. Furthermore, lens-side ends of the lens-side claw portions in the clockwise direction in FIG. 3 from the second lens-side end 107a2 are referred to as a third lens-side end 107b1, a fourth lens-side end 107b2, a fifth lens-side end 107c1, and a sixth lens-side end 107c2.

As illustrated in FIG. 3, in the present exemplary embodiment, when in the mounted state and when at a normal position, which is a position in which the lock pin 203 is positioned on the left side when viewed from a photographer side, the first lens-side claw portion 107a is disposed opposite to the lock pin 203 with the optical axis O in between. Furthermore, the second lens-side claw portion 107b and the third lens-side claw portion 107c are sequentially disposed in the clockwise direction from the first lens-side claw portion 107a.

Configuration to Mount Interchangeable Lens Assembly 100 on Camera Body 200 in Further Stable Manner Dispositions of the lens-side claw portions to mount the interchangeable lens assembly 100 on the camera body 200 in a further stable manner will be described. Lines and angles needed to describe the dispositions of the lens-side claw portions will be defined first.

A line passing the center of the lock pin groove portion 102 and a central axis of the interchangeable lens assembly 100, in other words, the optical axis O, when viewed in a central axis direction of the interchangeable lens assembly 100 (when viewed in a central axis direction of the lens mount 101), in other words, when viewed in an optical axis direction of the interchangeable lens assembly 100 is referred to as line L1 (a reference line). Note that line L1 may be a line that passes the center of the lock pin 203 and the optical axis O. The central axis of the interchangeable lens assembly 100 or a central axis of the lens mount 101 may be a central axis of the opening of the lens mount 101.

A line that is orthogonal to line L1 and that passes the optical axis O is referred to as line L2. Furthermore, a side on which the lock pin groove portion 102 is provided with respect to line L2 serving as a boundary line, in other words, the left side of line L2 in FIG. 3 is referred to a lock pin groove portion side (an inserted portion side or a groove portion side).

Furthermore, among the lens-side claw portions, the lens-side claw portions that each have at least a portion thereof disposed on the lock pin groove portion side are referred to as a first inserted-portion-side engagement portion (a first recess-side bayonet claw portion, a first groove portion side bayonet claw portion, a first concave portion side bayonet claw portion) and a second inserted-portion-side engagement portion (a second recess-side bayonet claw portion, a second groove portion side bayonet claw portion, a second concave portion side bayonet claw portion). Referring to FIG. 3, the first inserted-portion-side engagement portion is the third lens-side claw portion 107c, and the second inserted-portion-side engagement portion is the second lens-side claw portion 107b.

An angle formed between line L3 that passes the fifth lens-side end 107c1, which is a lens-side end of the first inserted-portion-side engagement portion on the lock pin groove portion 102 side, and the optical axis O and line L1 is assumed to be θ1. An angle formed between line L4 that passes the fourth lens-side end 107b2, which is a lens-side end of the second inserted-portion-side engagement portion on the lock pin groove portion 102 side, and the optical axis O and line L1 is assumed to be θ2.

The interchangeable lens assembly 100 satisfies $$0.65 \le \theta 1/\theta 2 \le 1.35. \quad (1)$$

In the present exemplary embodiment, θ1=54° and θ2=42°, and θ1/θ2=1.29; accordingly, conditional expression (1) is satisfied. In the present exemplary embodiment, θ1 is larger than θ2. In such a case, conditional expression (1) becomes 1.00<θ1/θ2≤1.35. Note that the values θ1 and θ2 may be the same and, in such a case, the value of conditional expression (1) becomes 1.00. In other words, in a case in which θ1≥θ2, conditional expression (1) becomes 1.00≤θ1/θ≤1.35.

Note that interchangeable lens assembly 100, more preferably, satisfies $$0.70 \le \theta 1/\theta 2 \le 1.30. \quad (1a)$$

Note that the lower limit of conditional expression (1a) may be 0.80 or 0.90. Moreover, conditional expression (1) may be 0.60≤θ1/θ≤1.40.

As illustrated in FIG. 3, when the accessory is at the normal position, the angle θ2 on a gravity direction side with respect to the reference line L1 is smaller than angle θ1 on a side opposite to the gravity direction side with respect to the reference line L1. In other words, when the accessory is at the normal position, the second groove portion side bayonet claw portion is positioned on the gravity direction side with respect to the first groove portion side bayonet claw portion. By having the magnitudes of θ1 and θ2 be in such a relationship, a front end of the interchangeable lens assembly 100 at the normal position can be prevented from tilting in the gravity direction.

In other words, in the interchangeable lens assembly 100 the second lens-side claw portion 107b and the third lens-side claw portion 107c are disposed in a substantially uniform manner when viewed from the lock pin groove portion 102. In other words, in the interchangeable lens assembly 100, the lock pin groove portion 102 is provided in a vicinity of a middle of a region between the second lens-side claw portion 107b and the third lens-side claw portion 107c. By having the interchangeable lens assembly 100 have the above-described configuration, the interchangeable lens assembly 100 can be mounted on the camera body 200 in a more stable manner.

The lock pin 203 and the lock pin groove portion 102, the second lens-side claw portion 107b, and the third lens-side claw portion 107c that fix the position of the interchangeable lens assembly 100 when the interchangeable lens assembly 100 is mounted on the camera body 200 are disposed in a well-balanced manner. Accordingly, the interchangeable lens assembly 100 can be mounted on the camera body 200 in a more stable manner even when external force from various directions are applied to the interchangeable lens assembly 100 or when the orientation of the interchangeable lens assembly 100 is changed.

Furthermore, more preferably, the interchangeable lens assembly 100 further satisfies the following condition. It is more preferable that, in addition to the first inserted-portion-side engagement portion and the second inserted-portion-side engagement portion described above, the plurality of lens-side claw portions include an opposite-side engagement portion described next. The opposite-side engagement portion is a lens-side claw portion in which both lens-side ends thereof are provided on the side opposite to the lock pin groove portion side with respect to line L2 that is a boundary line, in other words, the opposite-side engagement portion is a lens-side claw portion in which both lens-side ends thereof are provided on the right side of line L2 in FIG. 3. In the present exemplary embodiment, the first lens-side claw portion 107a is the opposite-side engagement portion. As illustrated in FIG. 3, both ends of the opposite-side engagement portion are positioned on the right side of line L2.

Furthermore, line L1 and the opposite-side engagement portion overlap each other. In addition to the configuration described above in which the lock pin groove portion 102 is provided in the vicinity of the middle of the region between the second lens-side claw portion 107b and the third lens-side claw portion 107c, by having the opposite-side engagement portion at the position described above, the following effect can be obtained. In other words, in the present exemplary embodiment, when the interchangeable lens assembly 100 is mounted on the camera body 200, the lock pin 203 and the lock pin groove portion 102, and each lens-side claw portion that fix the position of the interchangeable lens assembly 100 are disposed uniformly at intervals of substantially 90°. Accordingly, the interchangeable lens assembly 100 can be mounted on the camera body 200 in a more stable manner.

Furthermore, an angle formed between line L5 that passes the first lens-side end 107a1 that is a lens-side end of the first lens-side claw portion 107a, which is the opposite-side engagement portion described above, on the third lens-side claw portion 107c side and the optical axis O, and line L1 is assumed to be θ3. Furthermore, an angle formed between line L6 that passes the second lens-side end 107a2 that is a lens-side end of the first lens-side claw portion 107a on the second lens-side claw portion 107b side and the optical axis O, and line L1 is assumed to be θ4. The interchangeable lens assembly 100 preferably satisfies $$0.60 \leq \theta3/\theta4 \leq 0.90, \quad (2)$$

or $$0.60 \leq \theta3/\theta4 \leq 0.80. \quad (2a)$$

In other words, when the first lens-side claw portion 107a is divided in the up-down direction in FIG. 3 with line L1, the portion on the lower side is preferably slightly longer than the portion on the upper side. Note that the upper limit of conditional expression (2a) may be 0.70. In the present exemplary embodiment, since θ3=21°, θ4=32°, θ3/θ4=0.66, conditional expression (2) is satisfied. In the present exemplary embodiment, θ4 is larger than θ3.

When θ3/θ4 deviates from the upper limit of conditional expression (2), the portion on the lower side of the first lens-side claw portion 107a that is divided by line L1 is, with respect to line L1, in other words, with respect to the lock pin groove portion 102, excessively long with respect to the portion on the upper side. In such a state, the length of the second lens-side cutaway 108b needs to be reduced, and a length of a second camera-side claw portion 208b described later needs to be reduced accordingly. As a result, the area of the region in which the lens-side claw portion and the camera-side claw portion engage with each other becomes smaller, and it may not be possible to mount the interchangeable lens assembly 100 on the camera body 200 in a stable manner.

When θ3/θ4 deviates from the lower limit of conditional expression (2), the effect described next resulting from the portion on the lower side of the first lens-side claw portion 107a that is divided by line L1 being longer than the portion on the upper side may not be sufficiently obtained.

Generally, in many cases, imaging is performed using the camera system 300 while the lock pin groove portion 102 is at the normal position, that is, on the left side when viewed from an image pickup member 202 side. When the camera system 300 is at the normal position, the downward direction in the sheet surface of FIG. 3 is the gravity direction. Accordingly, in order to prevent the interchangeable lens assembly 100 at the normal position from tilting, with respect to the camera body 200, in a direction approaching the ground surface by its own weight, it is preferable that the portion on the lower side of the first lens-side claw portion 107a that is divided by line L1 is longer than the portion on the upper side.

Furthermore, as illustrated in FIG. 3, both the third lens-side claw portion 107c that is the first inserted-portion-side engagement portion and the second lens-side claw portion 107b that is the second inserted-portion-side engagement portion overlap line L2 that is the boundary line described above. With the above configuration, a change in the orientation in which the interchangeable lens assembly 100 tilts can be suppressed.

Furthermore, more preferably, the interchangeable lens assembly 100 further satisfies the following condition. In other words, the interchangeable lens assembly 100 satisfies $$90° < \theta1+\theta2 < 180°. \quad (3)$$

The configuration satisfying conditional expression (3) is significant of the angle between the second lens-side claw portion 107b and the third lens-side claw portion 107c being an obtuse angle. As described above, in the present exemplary embodiment, θ1=54°, θ2=42°, and θ1+θ2=96° are satisfied. The upper limit of conditional expression (3) may be 120° or 100°.

The angle between the second lens-side claw portion 107b and the third lens-side claw portion 107c being an obtuse angle is significant of the second lens-side claw portion 107b and the third lens-side claw portion 107c being apart from each other to some extent. As illustrated in FIG. 3, the lock pin groove portion 102 is provided between the second lens-side claw portion 107b and the third lens-side claw portion 107c.

In the present exemplary embodiment, the lock pin groove portion 102 is provided in a region between the second lens-side claw portion 107b and the third lens-side claw portion 107c that are apart from each other to some extent, in other words, the lock pin groove portion 102 is provided in a region including some space. And, as described above, the lock pin groove portion 102 is provided at the third lens-side cutaway 108c (or at a region where the third lens-side cutaway 108c provided) between the second lens-side claw portion (the second concave portion side bayonet claw portion) 107b and the third lens-side claw portion (the first concave portion side bayonet claw portion) 107c. Accordingly, in the present exemplary embodiment, when the interchangeable lens assembly 100 is mounted on the camera body 200, biasing force from the lock pin 203 is received in the region that includes some space. Accordingly, in the present exemplary embodiment, abrasion in the portion where the lock pin 203 slides in the lens mount 101 can be suppressed more with the biasing force from the lock pin 203. Furthermore, in the present exemplary embodiment, the portion between the second lens-side claw portion 107b and the third lens-side claw portion 107c, in other words, the third lens-side cutaway 108c is longer than the other lens-side cutaways; accordingly, the abrasion described above can be suppressed further.

Furthermore, in the present exemplary embodiment, $$40°<\theta1<70°, \text{ and } 40°<\theta2<70° \quad (4)$$

are satisfied.

In other words, in the present exemplary embodiment, the second lens-side claw portion 107b and the third lens-side claw portion 107c are disposed 102 in a well-balanced manner with respect to the lock pin groove portion; accordingly, as described above, the interchangeable lens assembly 100 can be mounted on the camera body 200 in a further stable manner. The upper limit of conditional expression (4) may be 60°.

Furthermore, since the second lens-side claw portion 107b and the third lens-side claw portion 107c overlap line L2 that is a boundary line, the second lens-side claw portion 107b and the third lens-side claw portion 107c can be disposed in a well-balanced manner with respect to the lock pin groove portion 102.

Disposition of Bayonet Claw Portions of Camera-Side Mount

Figure 4A:
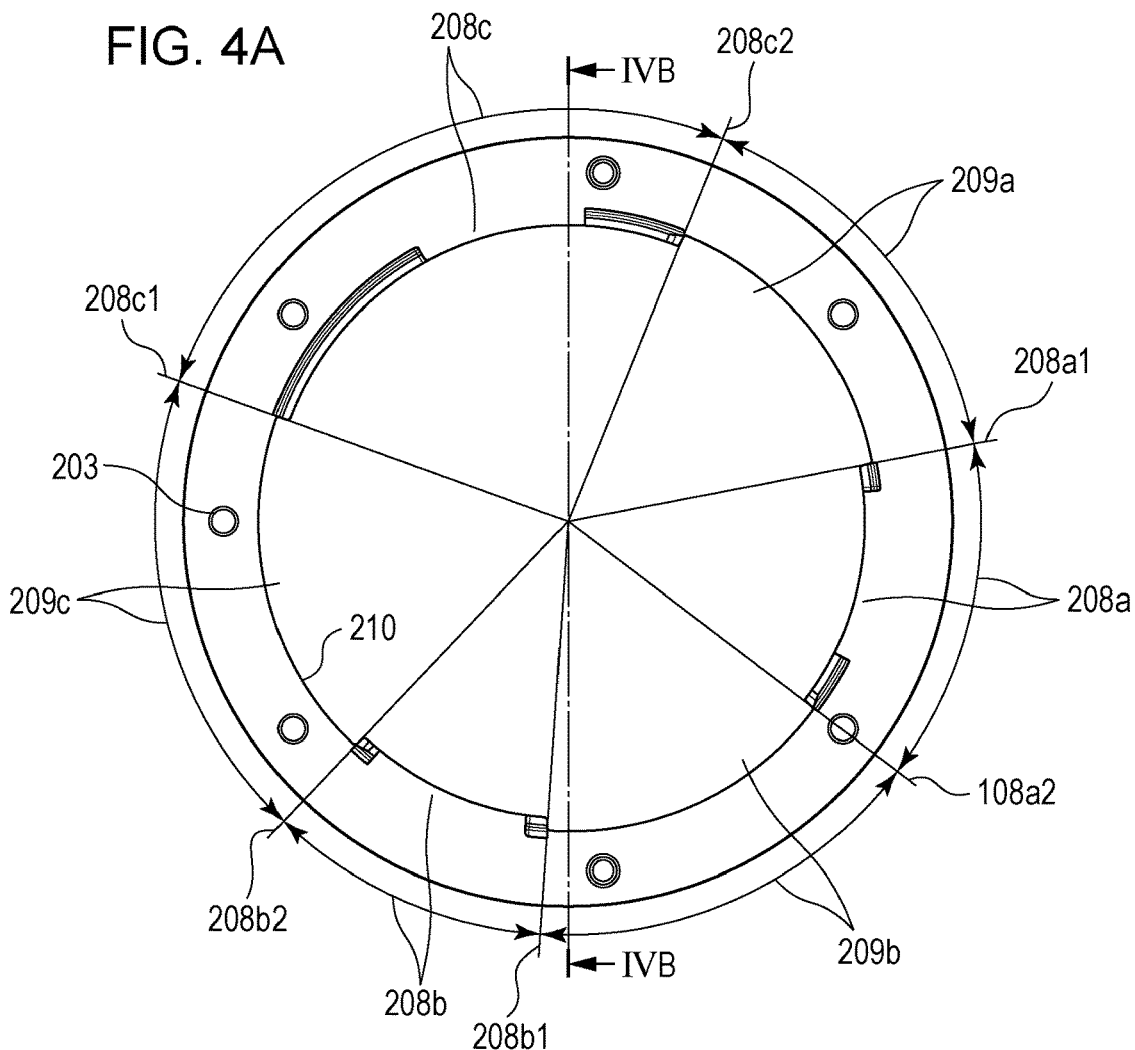
FIG. 4A is a diagram of a camera mount in a normal position viewed from an image pickup plane side.

Referring next to FIG. 4A, a phase (disposition) of the camera-side claw portions of the camera mount 201 will be described. FIG. 4A is a diagram of the camera mount 201 in a normal position state viewed from the image pickup plane side of the camera body 200.

As illustrated in FIG. 4A, when viewed in the optical axis O direction, the camera mount 201 includes a first camera-side claw portion (a third bayonet claw portion) 208a, the second camera-side claw portion (a fourth bayonet claw portion) 208b, and a third camera-side claw portion (a fifth bayonet claw portion) 208c that have dimensions in a radial direction and a circumferential direction of an opening included in the camera mount 201. The first camera-side claw portion 208a, the second camera-side claw portion 208b, and the third camera-side claw portion 208c are a plurality of first engagement portions included in the camera body 200. Furthermore, the camera mount 201 includes a camera-side diameter fitting portion 210 that becomes a restriction in a direction orthogonal to the optical axis when the lens mount 101 is attached to the camera mount 201. When the lens mount 101 is attached to the camera mount 201, the above camera-side diameter fitting portion 210 and the lens-side diameter fitting portion 109 described above are diametrically fitted to each other.

Note that in the description hereinafter, a portion between the third camera-side claw portion 208c and the first camera-side claw portion 208a is referred to as a first camera-side cutaway 209a, and a portion between the first camera-side claw portion 208a and the second camera-side claw portion 208b is referred to as a second camera-side cutaway 209b. Furthermore, a portion between the second camera-side claw portion 208b and the third camera-side claw portion 208c is referred to as a third camera-side cutaway 209c. Furthermore, one end of the first camera-side claw portion 208a is referred to as a first camera-side end 208a1 and the other end is referred to as a second camera-side end 208a2. Furthermore, camera-side ends of the camera-side claw portions in the clockwise direction in FIG. 4A from the second camera-side end 208a2 are referred to as a third camera-side end 208b1, a fourth camera-side end 208b2, a fifth camera-side end 208c1, and a sixth camera-side end 208c2.

In the present exemplary embodiment, among the camera-side claw portions, the first camera-side claw portion 208a is positioned on a substantially opposite side of the lock pin 203 with the optical axis O in between when the camera mount 201 at the normal position is viewed from the photographer side.

Operation of Attaching Interchangeable Lens Assembly 100 to Camera Body 200

Figure 5:
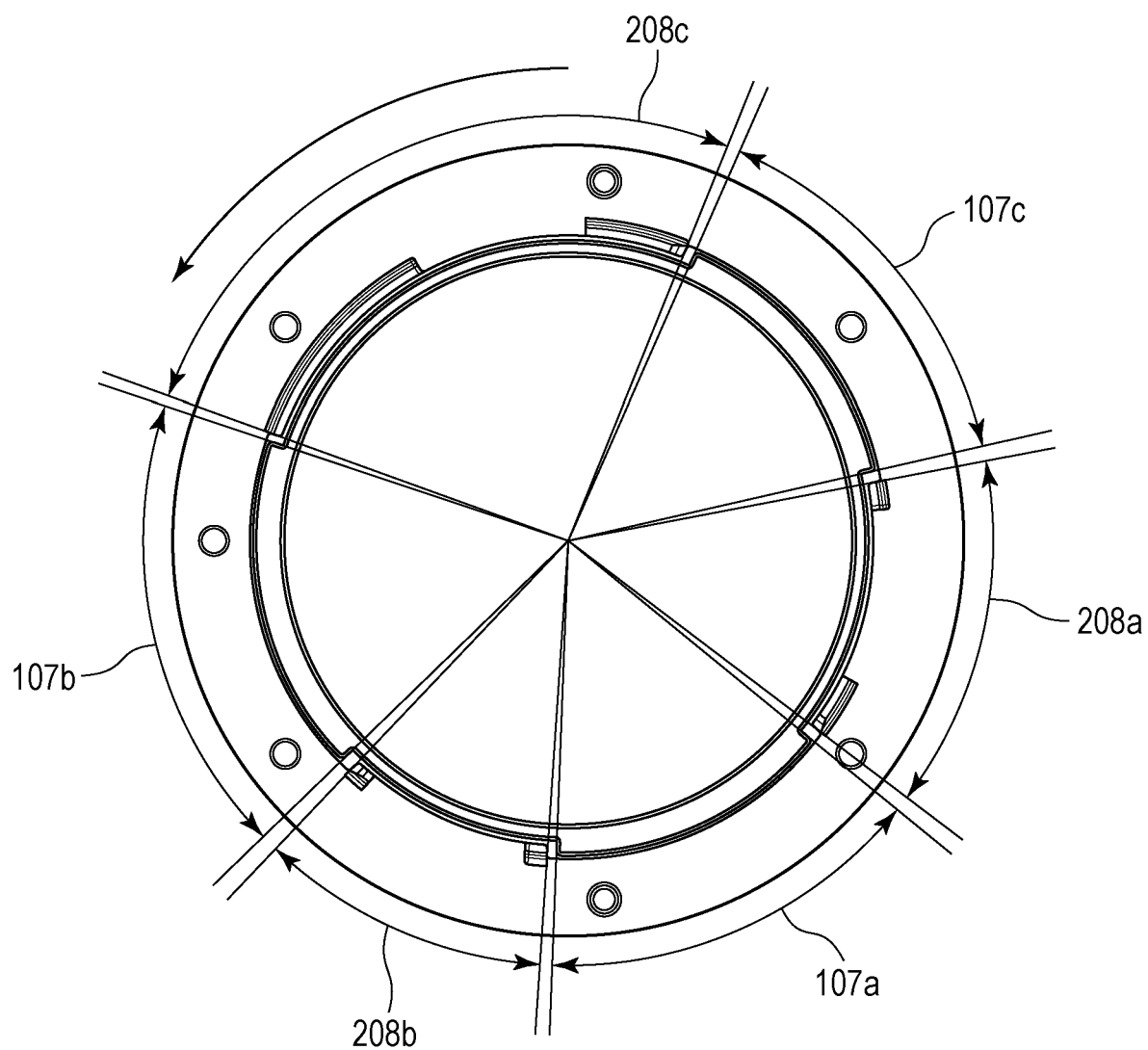
FIG. 5 is a diagram illustrating an insertion/removal state of the lens mount and the camera mount in a normal position viewed from an image pickup plane side.
Figure 6:
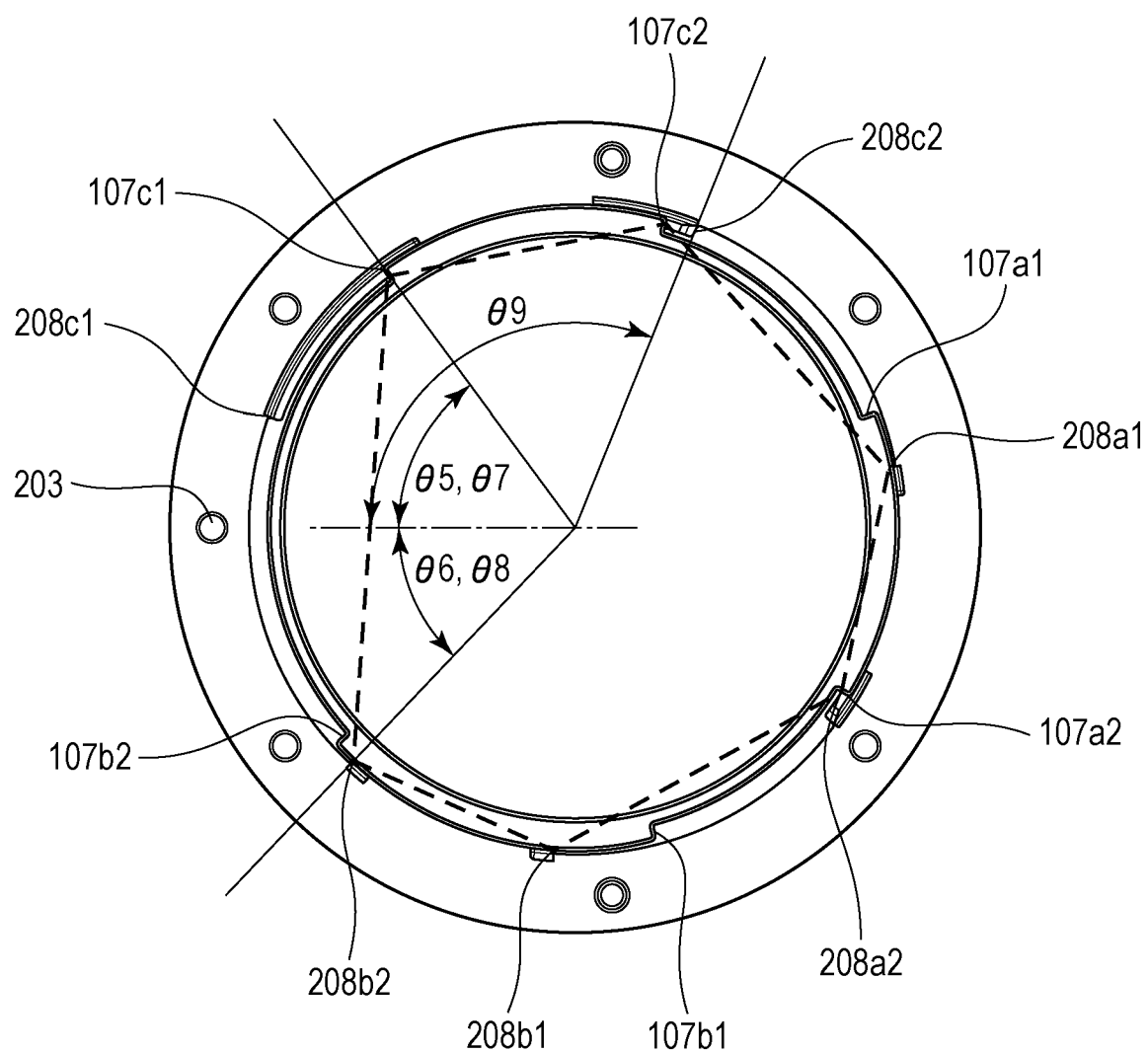
FIG. 6 is a diagram illustrating a mounted state of the lens mount and the camera mount in a normal position viewed from an image pickup plane side.

Referring next to FIGS. 5 and 6, an operation of attaching the interchangeable lens assembly 100 to the camera body 200 will be described. FIG. 5 is a diagram of the lens mount 101 and the camera mount 201 in the insertion/removal state and at the normal position viewed from the image pickup member 202 side, and FIG. 6 is a diagram of the lens mount 101 and the camera mount 201 in the mounted state and at the normal position viewed from the image pickup member 202 side.

The interchangeable lens assembly 100 is mounted on the camera body 200 by, first, matching the phases of the camera-side claw portions and the lens-side cutaways so that the interchangeable lens assembly 100 and the camera body 200 are in a state (the insertion/removal state) in which the phases of the camera-side cutaways and the lens-side claw portions matches each other. Furthermore, in the above insertion/removal state, the lens-side diameter fitting portion 109 and the camera-side diameter fitting portion 210 are diametrically fitted to each other, and the interchangeable lens assembly 100 is inserted into the camera body 200 to a position where a contact surface on a lens mount 101 side and a contact surface on the camera mount 201 side abut against each other.

When the interchangeable lens assembly 100 is fully inserted in the camera body 200, the interchangeable lens assembly 100 is rotated about 60° (in a direction illustrated by an arrow in FIG. 5) relative to the camera body 200 from the phase in the insertion/removal state towards the phase in the mounted state. As a result of the above operation, mounting of the interchangeable lens assembly 100 on the camera body 200 is completed. In the phase in the mounted state, when viewed in the optical axis direction, the camera-side claw portions and the lens-side claw portions overlap each other. In other words, since both members are bayonet coupled to each other, the interchangeable lens assembly 100 can be prevented from coming off from the camera body 200 in the optical axis direction.

More specifically, in the mounted state, the first lens-side claw portion 107a is positioned on the image pickup member 202 side of the first camera-side claw portion 208a, and the second lens-side claw portion 107b is positioned on the image pickup member 202 side of the second camera-side claw portion 208b. Furthermore, the third lens-side claw portion 107c is positioned on the image pickup member 202 side of the third camera-side claw portion 208c. Accordingly, separation in the optical axis direction does not occur as long as the lock pin 203 does not come off from the lock pin groove portion 102. Furthermore, in the above, since the lens-side claw portions being biased (pulled in) in an image pickup member 202 direction by the lens mount biasing member 207 are moved to one side, a space between the camera body 200 and the interchangeable lens assembly 100 in the optical axis direction is suppressed from being created.

Influence Lock Pin 203 being Retreated has Between Insertion/Removal State and Transition State In the fitting operation described above, the lock pin 203 is pressed by the lens mount 101 and the lock pin 203 is pressed against the lens mount 101 at all times in the insertion/removal state and in a transition state between the insertion/removal state and the mounted state. When in the mounted state, the lock pin 203 is inserted into the lock pin groove portion 102, and the lock pin 203 is brought to an advanced state from a retreated state.

In other words, in the insertion/removal state and in the transition state, force that separates the lens mount 101 and the camera mount 201 from each other is applied between the two mounts. Accordingly, the two mounts need to be pressed against each other with the force of the user during the transition between the transition state and the insertion/removal state. In other words, both mounts need to be pressed against each other with force that is equivalent to or larger than the biasing force of the lock pin 203 until engaging between the lens-side claw portions and the camera-side claw portions start. Furthermore, in the transition state, the biasing force of the lock pin 203 is continuously applied, without change, to a lock pin traveling surface 110 (a broken-line portion in FIG. 3) of the lens mount 101.

Since the lock pin 203 needs to have strength, a material with high hardness is used in many cases, and stainless steel is used in the present exemplary embodiment as well. On the other hand, a material that is inferior in strength is used for the lens mount 101 in many cases and, for example, an aluminum alloy, a copper alloy including brass, a resin member, or another metal material is typically used. Accordingly, when operations of attaching and detaching the interchangeable lens assembly 100 to and from the camera body 200 are repeated, degradations such as the appearance being damaged due to abrasions and scratches occurring on the lens mount 101, an increase in the sliding friction, and a deterioration in flatness may occur.

Note that in the present exemplary embodiment, as a measure against the deterioration in flatness, a difference in level is provided between the lock pin traveling surface 110 and a contact surface 111 between the lens mount 101 and the camera mount 201. With the above, accuracy in the abutment between the lens mount 101 and the camera mount 201 is obtained, and occurrence of deterioration in flatness is suppressed.

Reducing the biasing force of the lock pin 203 can be conceived as a measure to suppress abrasions and scratches from occurring. However, if the biasing force of the lock pin 203 is reduced, there is a risk of the mounted state becoming released when, in the mounted state, the user touches the release operation member 204 due to carelessness or when, in the mounted state, a vibration is applied to the mounts. Accordingly, while not reducing the biasing force itself against the lock pin 203, the influence of the biasing force, which is applied to the lock pin 203, needs to be suppressed.
Configuration That Suppresses Influence of Biasing Force of Lock Pin 203

Referring now to FIG. 6, an angle formed by a point that is nearest to the lock pin 203 in the range (the region) where the third lens-side claw portion 107c and the third camera-side claw portion 208c overlap each other, the optical axis O, and the center of the lock pin 203 or the center of the lock pin groove portion 102 is assumed to be θ5. In the present exemplary embodiment, the point that is nearest to the lock pin 203 is a point on the fifth lens-side end 107c1. Furthermore, an angle formed by a point that is nearest to the lock pin 203 in the range where the second lens-side claw portion 107b and the second camera-side claw portion 208b overlap each other, the optical axis O, and the center of the lock pin 203 is assumed to be θ6. In the present exemplary embodiment, the point that is nearest to the lock pin 203 is a point on the fourth camera-side end 208b2.

Note that the point that is nearest to the lock pin 203 or the lock pin groove portion 102 in the range (region) in which the lens-side claw portions and the camera-side claw portions overlap each other is a point on an end of the lens-side claw portion or an end of the camera-side claw portion. The end of the lens-side claw portion or the end of the camera-side claw portion herein may be a middle point in the end of the claw portion. Alternatively, the point on the end of the lens-side claw portion or the end of the camera-side claw portion may be an intersection between the end of the lens-side claw portion and an outer peripheral surface or an inner peripheral surface or the camera-side claw portion. Alternatively, the point on the end of the lens-side claw portion or the end of the camera-side claw portion may be an intersection between the end of the camera-side claw portion and an outer peripheral surface or an inner peripheral surface or the lens-side claw portion.

Note that assuming that A is a difference in dimensions in the optical axis direction defined by the lens-side claw portions and the camera-side claw portions, when the mounts move parallel to each other, the space component in the optical axis direction between the mounts remains to be A. Furthermore, the direction in which the mounts tend to tilt is determined by the angle at which the claw portions overlap each other, in other words, by the size of the area in which the lens claw portions and the camera claw portions overlap each other. In other words, the intermediate point between the ranges (or the regions) where the lens-side claw portions and the camera-side claw portions overlap each other is the direction in which the mounts tilt most easily. Vertexes of a hexagon illustrated by a broken line in FIG. 6 are points that practically restrict the tilting of the mounts. The tilting near the center of each side of the hexagon is large, and as the side becomes longer, the absolute value of the tilting in the direction towards the side becomes larger.

Note that two of the vertexes of the hexagon illustrated in FIG. 6 can be paraphrased as a first end and a second end of the region where the first inserted-portion-side engagement portion and a third image-pickup-apparatus-side engagement portion overlap each other. The other vertexes can be paraphrased in a similar manner.

In the present exemplary embodiment, among the ranges in which the lens-side claw portions and the camera claw portions overlap each other, the range between the fourth camera-side end 208b2 and the fifth lens-side end 107c1, in other words, the range including the angle θ5+θ6 is the largest. In other words, among the sides of the hexagon illustrated in FIG. 6, the side between the fourth camera-side end 208b2 and the fifth lens-side end 107c1 is the longest. In other words, in the present exemplary embodiment, the range in which tilting of the lens mount 101 relative to the camera mount 201 occurs most easily is the range between the fourth camera-side end 208b2 and the fifth lens-side end 107c1.

As in the present exemplary embodiment, among the ranges in which the lens-side claw portions and the camera claw overlap each other, the lock pin 203 is provided in the range having the widest angle and in which the lens mount 101 relatively tilts most easily (in which a space is created most easily). Accordingly, even if the biasing force of the lock pin 203 is not reduced, abrasion of the surface of the lens mount 101 can be suppressed with the biasing force of the lock pin 203.

Note that while the description given above uses angle θ5 and angle θ6 formed when the interchangeable lens assembly 100 and the camera body 200 are in the mounted state illustrated in FIG. 6, angle θ5 changes in the course of reaching the mounted state from the insertion/removal state through the transition state. Accordingly, in each state, the smallest θ5 is defined as θ7, and the smallest θ6 is defined as θ8. In the present exemplary embodiment, θ7=54°, and θ8=46°.

Note that θ5 is always determined by the fifth lens-side end 107c1, the optical axis O, and the lock pin 203, and changes in the course of reaching the mounted state from the insertion/removal state through the transition state. The state in which θ5 is at its minimum value is the mounted state. Meanwhile, θ6 is always determined by the fourth camera-side end 208b2, the optical axis O, and the lock pin 203, does not change in the course of reaching the mounted state from the insertion/removal state through the transition state, and is always fixed, that is, θ6=θ8 at all times. In the present exemplary embodiment, the interchangeable lens assembly 100 is configured so as to satisfy $$0.75 \le \theta 7/\theta 8 \le 1.25, \tag{8}$$

or $$0.80 \le \theta 7/\theta 8 \le 1.20. \tag{8a}$$

In the present exemplary embodiment, θ7/θ8=1.17, and conditional expression (8) described above are satisfied. By having the interchangeable lens assembly 100 satisfy conditional expression (8), the state in which θ5+θ6 is the smallest is achieved. And, in this mounted state, the lock pin 203 is positioned at substantially the middle in the range between the fifth lens-side end 107c1 and the fourth camera-side end 208b2.

In other words, in the mounted state, the lock pin 203 is positioned in the direction (the position) in which the lens mount 101 tilts easily. Accordingly, the influence of the biasing force of the lock pin 203 in the mounted state in which the biasing force becomes the strongest can be suppressed. Furthermore, the interchangeable lens assembly 100 can be mounted on the camera body in a more stable manner. In the present exemplary embodiment θ7 is larger than θ8.

Furthermore, in the present exemplary embodiment, the interchangeable lens assembly 100 satisfies $$90°<\theta 7+\theta 8<180°, \text{ and } 90°<\theta 9+\theta 8<180°, \tag{9}$$

or $$90°<\theta 7+\theta 8<110°, \text{ and } 140°<\theta 9+\theta 8<170°. \tag{9a}$$

As illustrated in FIG. 6, θ9 is an angle formed by the sixth camera-side end 208c2, the optical axis O, and the center of the lock pin 203, and is the maximum value of θ5.

When the interchangeable lens assembly 100 satisfies conditional expression (9) from the time the interchangeable lens assembly 100 is attached to the camera body 200 until the mounting of the interchangeable lens assembly 100 on the camera body 200 is completed, the following effect can be obtained. The lock pin 203 is always positioned in the region where the interval between the points in which the lens-side claw portions and the camera-side claw portions are in contact with each other is wide. Accordingly, since, from the insertion/removal state to the transition state, the lock pin 203 is always in a state in which tilting easily occurs, even if the biasing force of the lock pin 203 is not weakened, the influence of the biasing force of the lock pin 203 can be suppressed. In the present exemplary embodiment, θ7+θ8=100° and θ9+θ8=160° are satisfied.

Furthermore, θ7 and θ8 are both 45 degrees or larger, and the lock pin 203 is positioned away from the positions where the claw portions, which are tilting restricting members, overlap each other; accordingly, the lock pin 203 is more likely to become tilted.

By having the above configuration, the tilting of the lock pin 203 in the phase direction (circumferential direction) can be made large, the mounts are separated from each other by the biasing force of the lock pin 203, and the biasing force of the lock pin 203 in the transition state is weakened; accordingly, abrasion and scratching can be suppressed from occurring. Furthermore, in the mounted state, by biasing the lens-side claw portions with the lens mount biasing member 207 with force that is larger than the biasing force of the lock pin 203, the space created during the mounted state can be suppressed.

Dispositional Relationship between Lock Pin Groove Portion and Lens Side Claw Portions While the dispositional relationship between the lock pin groove portion and the lens-side claw portions has been described with reference to FIG. 3, the dispositional relationship between the lock pin groove portion and the lens-side claw portions according to the present exemplary embodiment can be described in the following manner with reference to FIGS. 7, 8A, and 8B.

As described above, the lens-side claw portions are biased in the image pickup member 202 direction with the lens mount biasing member 207. With the above biasing force, creation of the space between the interchangeable lens assembly 100 and the camera body 200, in other words, the space between the lens mount 101 and the camera mount 201 is suppressed. Furthermore, the biasing force generates frictional force between the lens mount 101 and the camera mount 201, and suppresses the space in the radial direction orthogonal to the optical axis direction from being created and the lens mount 101 from being relatively displaced in the radial direction with respect to the camera mount 201. Furthermore, the space in the radial direction and the relative displacement are also suppressed by, as described above, inserting the lock pin 203 in the lock pin groove portion 102.

Supposedly, if such biasing force concentrates on a single lens claw portion, there will be a concern that the lens mount 101 and, consequently, the interchangeable lens assembly 100 will tilt in the direction where the lens claw portion is located. Accordingly, it is desirable that the biasing force of the lens mount biasing member 207 acts on the lens mount 101, in other words, the interchangeable lens assembly 100 in a uniform manner. Accordingly, in the present exemplary embodiment, the lens claw portions that receive the biasing force from the lens mount biasing member 207 are disposed in a substantially uniform manner. Hereinafter, the disposition will be described in detail.

Figure 7:
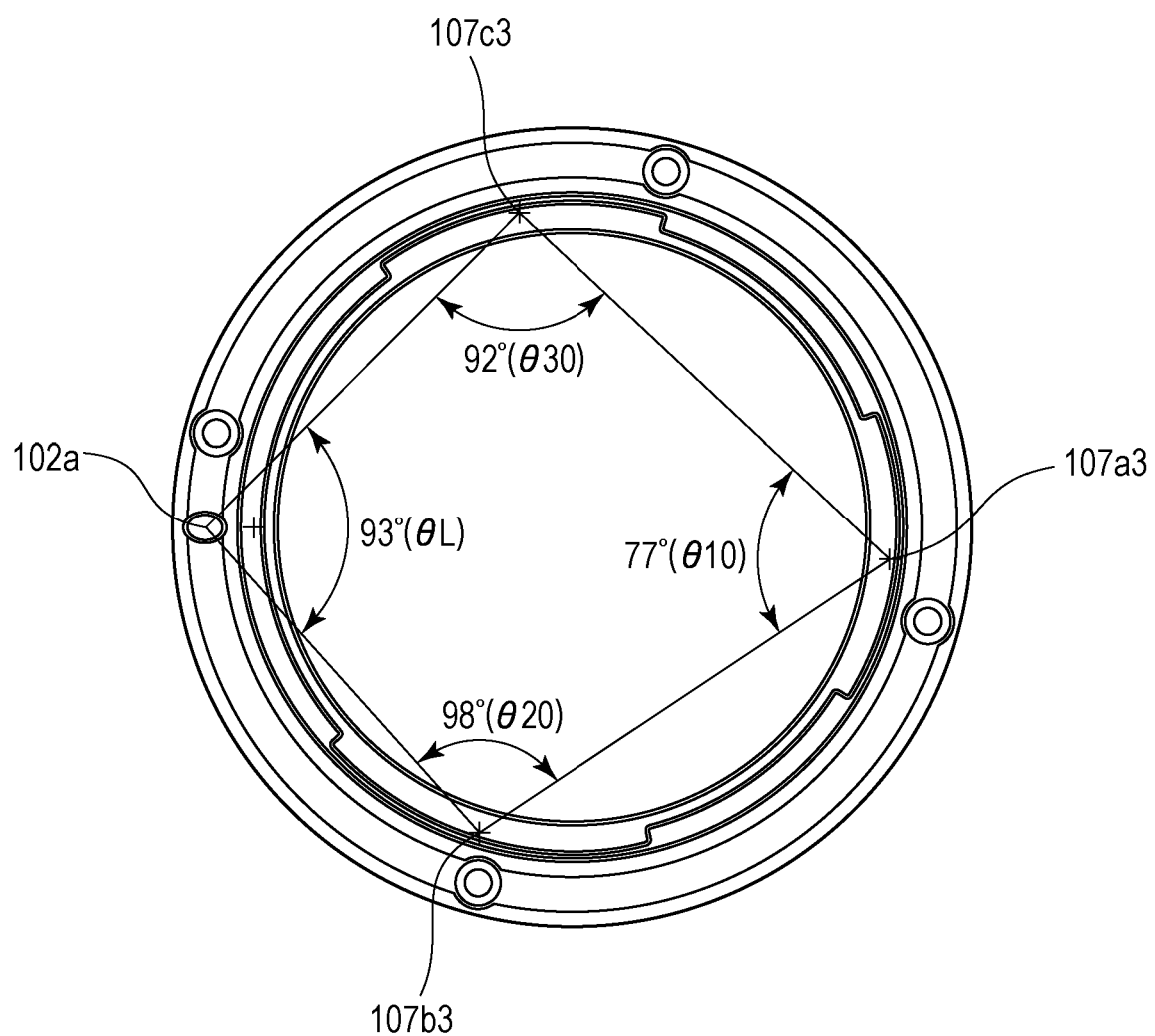
FIG. 7 is an explanatory drawing of a polygonal shape formed of a center of a lock pin groove, and centers of lens-side claw portions.

Referring to FIG. 7, the center of the first lens-side claw portion 107a is referred to as a first lens-side claw portion center 107a3, the center of the second lens-side claw portion 107b is referred to as a second lens-side claw portion center 107b3, and the center of the third lens-side claw portion 107c is referred to as a third lens-side claw portion center 107c3. In other words, the suppression of the space between the lens mount 101 and the camera mount 201 is achieved through frictional force and position restriction by, mainly, the lock pin groove portion center 102a, in addition to the three lens-side claw portion centers 107a, 107b3, and 107c3. Accordingly, by disposing the above centers on the lens mount 101 in a substantially uniform manner, the frictional force generated between the lens mount 101 and the camera mount 201 can be equalized. By adopting the above configuration in the present exemplary embodiment, the interchangeable lens assembly 100 can be mounted on the camera body 200 in a further stable manner.

Note that the definitions of the lens-side claw portion centers and the lock pin groove portion center 102a will be described with reference to FIGS. 8A and 8B. Specifically, first, as illustrated in FIG. 8A, line L7 is a line that passes the point that equally divides the dimension of the lens-side claw portion into two in the circumferential direction, in other words, a point where dimensions c1 and c2 are the same in the circumferential direction, and the optical axis O. Furthermore, line L8 is a curved line that passes a point that equally divides the dimension of the lens-side claw portion into two in the radial direction, in other words, line L8 is a curved line in which dimensions d1 and d2 are the same in the radial direction. In the above, the intersection between line L7 and line L8 is assumed to be the center of the lens-side claw portion. The above dimension of the lens-side claw portion in the radial direction is a dimension from a point P1 or P2 where the lens-side claw portion stands in a portion of the lens mount 101 to the outer peripheral surface of the lens-side claw portion. Furthermore, the center of the lens-side claw portion may be an intersection of two diagonal lines of a quadrangle formed by connecting four points, that is, two points P1 and P2 where the lens-side claw portion stands and two points at the ends of the outer peripheral surface of the lens-side claw portions.

Figure 8A:
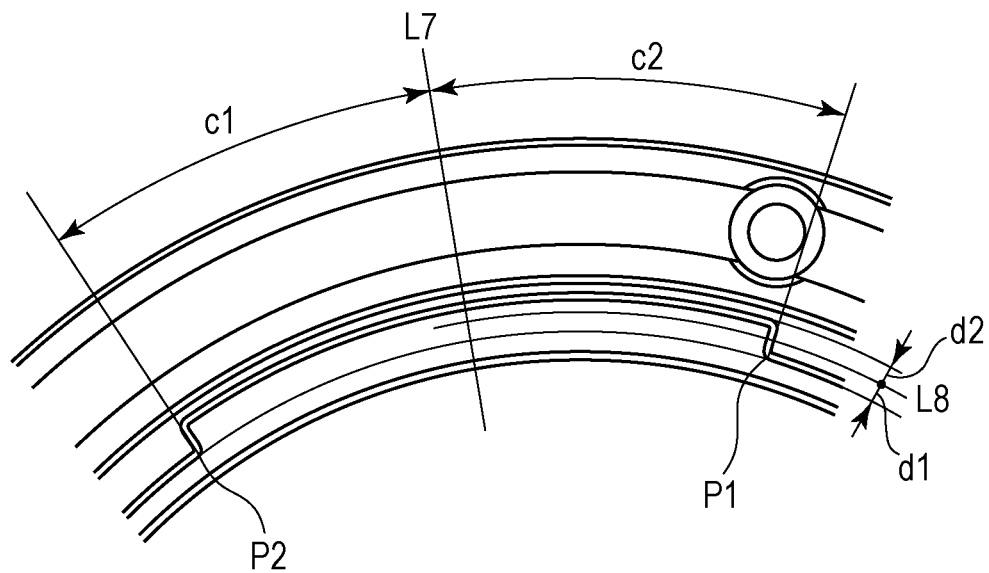
FIGS. 8A and 8B are explanatory drawings of the center of a lock pin groove and a center of lens-side claw portion.
Figure 8B:
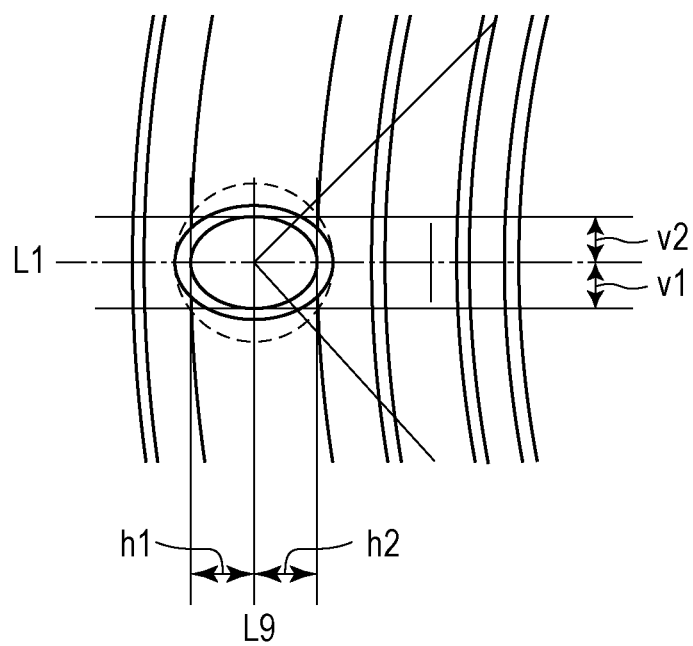

Furthermore, the lock pin groove portion center 102a is as illustrated in FIG. 8B. Specifically, first, line L9 is a line that passes a point that equally divides the dimension of the lock pin groove portion 102 into two in the line L1 direction, in other words, a line that passes a point where the dimensions h1 and h2 are the same in the line L1 direction, and is a line that is orthogonal to line L1. In the above, the intersection between line L9 and line L1 is assumed to be the lock pin groove portion center 102a. Note that line L1 is also a line that equally divides the dimension of the lock pin groove portion 102 into two in the line L9 direction, in other words, line L1 is a line that passes a point where dimensions v1 and v2 are the same in the line L8 direction.

Referring next to FIG. 7, the configuration of disposing the above-described centers of the lens mount 101 in a substantially uniform manner will be described in a more specific manner. FIG. 7 illustrates a quadrangle having the lens-side claw portion centers 107a3 to 107c3 and the lock pin groove portion center 102a as the vertexes, and internal angles of the quadrangle.

Note that among the internal angles, θ10 is an angle of a first internal angle having the first lens-side claw portion center 107a3 as its vertex, θ20 is an angle of a second internal angle having the second lens-side claw portion center 107b3 as its vertex, θ30 is an angle of a third internal angle having the third lens-side claw portion center 107c3 as its vertex, and θL is an angle of a fourth internal angle having the lock pin groove portion center 102a as its vertex. In the present exemplary embodiment, the angles of the internal angles are set so that the lens-side claw portion centers and the lock pin groove portion center are disposed in a substantially uniform manner. Since θ10, θ20, θ30, and θL are internal angles of the quadrangle, θ10+θ20+θ30+θL=360° is satisfied. More specifically, the interchangeable lens assembly 100 according to the present exemplary embodiment satisfies $$75°≤θ10≤105°, 75°≤θ20≤105°, 75°≤θ30≤105°,$$

and $$75°≤θL≤105°. \quad (10)$$

In other words, since each of θ10, θ20, θ30, and θL falls within a predetermined angle range, as described above, the lens-side claw portion centers and the lock pin groove portion center are disposed in a substantially uniform manner. Note that conditional expression (10) may be expressed as $$60°≤θ10≤120°, 60°≤θ20≤120°, 60°≤θ30≤120°, \text{ and } 60°≤θL≤120°. \quad (10a)$$

Alternatively, conditional expression (10) may be expressed as $$60°≤θ10≤100°, 60°≤θ20≤100°, 60°≤θ30≤100°, \text{ and } 60°≤θL≤100° \quad (10b)$$

or $$65°≤θ10≤100°, 65°≤θ20≤100°, 65°≤θ30≤100°, \text{ and } 65°≤θL≤100° \quad (10c)$$

or $$70°≤θ10≤100°, 70°≤θ20≤100°, 70°≤θ30≤100°, \text{ and } 70°≤θL≤100°. \quad (10d)$$

Note that the upper limits of conditional expressions (10b), (10c) and (10d) may be 99°.

Furthermore, it is preferable that at least either one of θ10, θ20, θ30, and θL is in the range of 85 degrees to 95 degrees, inclusive, since the lens-side claw portion centers and the lock pin groove portion center are disposed in a further substantially uniform manner.

It is more preferable that the interchangeable lens assembly 100 satisfies $$85°≤θL≤95° \quad (11)$$

or $$90°<θL≤95° \quad (11a)$$

since the lens-side claw portion centers are disposed in a further uniform manner with respect to the lock pin groove portion center 102a.

Most preferably, the interchangeable lens assembly 100 satisfies $$0.75≤θ30/θ20≤1.25 \quad (12)$$

or $$0.85≤θ30/θ20≤1.15 \quad (12a)$$

or $$0.95≤θ30/θ20≤1.05. \quad (12b)$$

The above is preferable since the second lens-side claw portion 107b and the third lens-side claw portion 107c are disposed in a uniform manner with respect to the lock pin groove portion 102. Furthermore, if θL is larger than 90°, in other words, if θL is an obtuse angle, the third lens-side cutaway 108c will be longer than the other lens-side cutaways; accordingly, the influence of the biasing force of the lock pin 203 can be suppressed. In the present exemplary embodiment, θ20 is larger than θ30.

Note that regarding the internal angles in the present exemplary embodiment, θ10=77°, θ20=98°, θ30=92°, and θL=93°, and the interchangeable lens assembly 100 satisfies the conditions described above related to the internal angles. As described above, in the present exemplary embodiment, the center points are disposed on the lens mount 101 in a substantially uniform manner. Accordingly, the frictional force generated between the lens mount 101 and the camera mount 201 can be equalized, and the interchangeable lens assembly 100 can be mounted on the camera body 200 in a further stable manner while suppressing the space from being created.

In many cases, when in the state in which the interchangeable lens assembly 100 is mounted on the camera body 200, the interchangeable lens assembly 100 is operated while holding the camera body 200. Accordingly, there are cases in which force in the radial direction, which is a direction perpendicular to the optical axis direction, is applied between the lens mount 101 and the camera mount 201. Conversely, since the present exemplary embodiment employs the configuration described above, the interchangeable lens assembly 100 can be mounted on the camera body 200 in a further stable manner. Accordingly, when high-speed consecutive photographing is carried out or when a moving image is taken, positional displacement between each frame caused by the space between the lens mount 101 and the camera mount 201 does not easily occur.

In recent years, achievements of high-resolution in image pickup members are becoming noticeable, such as a sensor having 250 million pixels being developed in APS-H size (about 29.2×20.2 mm) sensors. As the image becomes higher in resolution, positional displacement becomes more conspicuous when the image of each frame is checked. With regards to such a situation, the present exemplary embodiment is capable of suppressing positional displacement even when the image pickup member achieves higher resolution.

Note that in order to suppress the space between the lens mount 101 and the camera mount 201 in the radial direction from being created, one may conceive of tightening the fit between the lens-side diameter fitting portion 109 and the camera-side diameter fitting portion 210. However, if the fit between the lens-side diameter fitting portion 109 and the camera-side diameter fitting portion 210 is tightened, the work efficiency of attaching the lens mount 101 and the camera mount 201 to each other decreases. Conversely, by employing the configuration of the present exemplary embodiment, there will be no need to tighten the fit between the lens-side diameter fitting portion 109 and the camera-side diameter fitting portion 210; accordingly, the decrease in the work efficiency described above can be suppressed.

Furthermore, in order to suppress the space between the lens mount 101 and the camera mount 201 in the radial direction from being created, one may conceive of increasing the biasing force generated by the lens mount biasing member 207. However, if the biasing force generated by the lens mount biasing member 207 is increased, operating force when the lens mount 101 and the camera mount 201 are in the insertion/removal state needs to be increased. Conversely, by employing the configuration of the present exemplary embodiment, there will be no need to increase the biasing force generated by the lens mount biasing member 207; accordingly, a large operating force described above will be not need.

Modifications

While a preferable embodiment of the present disclosure has been described above, the present disclosure is not limited to the embodiment and may be deformed and modified within the gist of the present disclosure.

For example, as long as the configuration of the present exemplary embodiment is used in optical apparatuses (accessories), the configuration can be used in camera accessories other than interchangeable lens assemblies used with a mount such as an adapter or an extender interposed in between. Furthermore, the claw portions may each be provided with a cutaway or a step portion. Furthermore, the configuration described in the present exemplary embodiment can be used in lens barrels for various image pickup devices other than the interchangeable lens assembly for a single-lens reflex camera, such as a lens shutter camera, a digital camera, and a video camera. In both the interchangeable lens assembly 100 and the adapters, a member in which the lens mount 101 is fixed with the lens mount fixing members 103 is the accessory main body.

Note that in the present exemplary embodiment, while θ7 is practically determined by the fifth lens-side end 107$c$1, depending on the angle range of the third lens-side claw portion 107$c$ or the third camera-side claw portion 208$c$, θ7 may be determined by the fifth camera-side end 208$c$1.

Furthermore, the three bayonet claw portions provided in the mounts in the exemplary embodiment described above may each be divided so as to be further divided into segments. In other words, a single bayonet claw portion may be formed as a collection of a plurality of bayonet claw portions (a group of bayonet claw portions). For example, the above corresponds to a case in which a groove portion is provided in a single bayonet claw portion. In such a case, the angle range of the group of bayonet claw portions arranged in the circumferential direction of each mount is as in the exemplary embodiment described above.

Figure 9B:
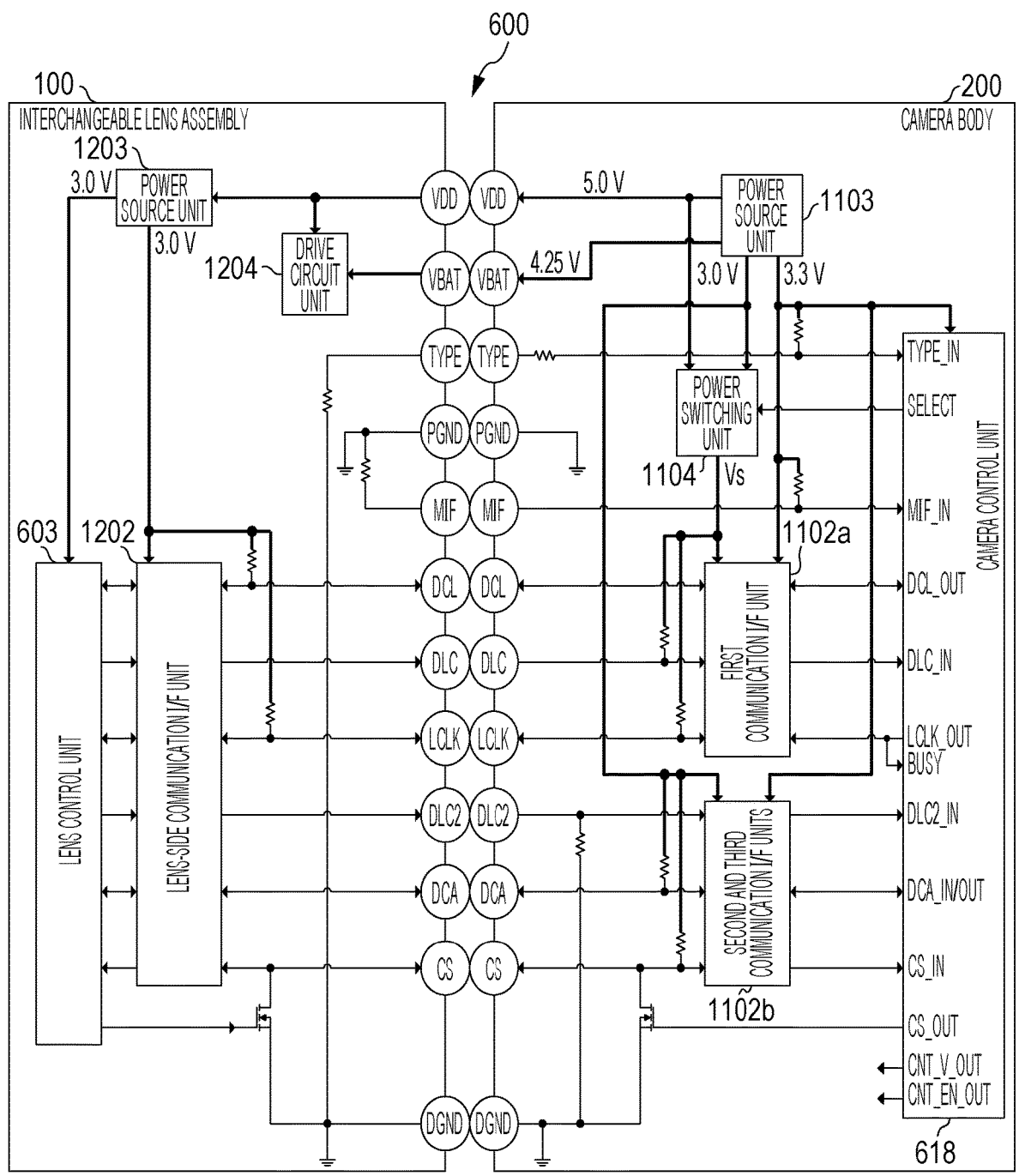
FIG. 9B is a block diagram of terminals of the camera and the interchangeable lens assembly according to the exemplary embodiment.

Referring now to FIGS. 9A and 9B, a description of a plurality of electrical contacts (terminal units or electrical contacts units) included in the lens contact portions (lens-side terminals) holding member 105 will be given. FIG. 9A is a block diagram of the camera system viewed in a manner different from that of FIG. 1 described above. A lens 601 in FIG. 9A is the optical elements in FIG. 1, such as the zoom lens unit ZLU and the focus lens unit FLU. A lens control unit 603 is the lens CPU in FIG. 1, and a mount 600 is a collective term for the lens mount 101 and the camera mount 201. A lens drive unit 602 is a collective term for the driving members in FIG. 1, and an image sensor 611 is the image pickup member 202 in FIG. 1. A lens control unit 603 is capable of performing first, second, and third communication between a camera control unit 618 through terminals described later.

The camera body 200 includes an A/D conversion unit 612 that converts an analog electrical signal output from the image sensor 611 into a digital signal, and an image processor 613 that generates an image signal by performing various types of image processing on the digital signal converted by the A/D conversion unit 612.

The image signal (a still image or a moving image) generated with the image processor 613 is displayed on a display unit 614 or is recorded in a recording medium 615. Furthermore, the camera body 200 includes a memory 616 that functions as a buffer when processing is performed on the image signal. The memory 616 stores an operation program used by the camera control unit 618 described later. The camera body 200 further includes a camera operation input unit 617 including a power switch that turns the power source on and off, a photographing switch that starts recording of an image signal, and a selecting/setting switch to perform setting of various menus.

The camera body 200 further includes the camera control unit 618 that includes a microcomputer. The camera control unit 618 performs various settings based on signals input from the camera operation input unit 617, and controls the communication between the lens control unit 603 included in the interchangeable lens assembly 100 through the mount 600.

Referring next to FIG. 9B, a configuration of the electrical connection between the camera body 200 and the interchangeable lens assembly 100 will be described. FIG. 9B illustrates an electric circuit configuration when the camera body 200 and the interchangeable lens assembly 100 are connected to each other through the mount 600, terminals (electrical contacts) provided in the mount 600 to electrically connect the camera body 200 and the interchangeable lens assembly 100 to each other, and a state in which the terminals are connected to each other.

The mount 600 in the camera system includes a mount portion (a first mount portion) A on the camera body 200 side and a mount portion (a second mount portion) B on the interchangeable lens assembly 100 side. The mount portion A and the mount portion B include a plurality of terminals (contact points or electrical contacts) that are capable of being electrically connected to the counterparts.

More specifically, the mount 600 includes VDD terminals and VBAT terminals that supply power to the interchangeable lens assembly 100 from the camera body 200, DGND terminals and PGND terminals that are ground terminals. The mount 600 further includes LCLK terminals, DCL terminals, DLC terminals, DLC2 terminals, CS terminals, and DCA terminals that are communication terminals for the camera control unit 618 and the lens control unit 603 to communicate with each other. As other terminals, the mount 600 further includes MIF terminals that detect that the interchangeable lens assembly 100 has been mounted on the camera body 200, and TYPE terminals that distinguish the type of camera accessory that has been mounted on the camera body 200.

Hereinafter, a more detailed description of the terminals will be given.

Power Terminals

The VDD terminals are terminals that supply communication control power (VDD), which is communication power used mainly to control communication, to the interchangeable lens assembly 100 from the camera body 200. In the present exemplary embodiment, the communication control power is 5.0 V. The VBAT terminals are terminals that supply driving power (VBAT), which is driving power used in operations other than the above communication control, such as operations of mechanical drive systems and the like mainly including a motor and the like, to the interchangeable lens assembly 100 from the camera body 200. In the present exemplary embodiment, the driving power is 4.25 V.

The DGND terminals are terminals that connect the communication control systems of the camera body 200 and the interchangeable lens assembly 100 to the ground. In other words, the DGND terminals are ground (GND) terminals corresponding to the VDD power source described above. Grounding herein is setting to a level that is the same as the level of the negative electrode-side of the power source such as a battery. The PGND terminals are terminals that connect the camera body 200 and the mechanical drive system, such as a motor, provided in the interchangeable lens assembly 100 to the ground. In other words, the PGND terminals are terminals that correspond to the VBAT power source described above.

Communication Terminals

The communication terminals include a terminal unit (the LCLK, DCL, and DLC terminals) that is a first communication unit that performs the first communication, and terminals (the DLC2 terminals) that are a second communication unit that performs the second communication independent of the first communication. The communication terminals further include a terminal unit (the CS, and DCA terminals) that is a third communication unit that performs the third communication independent of the first and second communications. The camera control unit 618 and the lens control unit 603 are capable of performing the first, second, and third communications that are independent of each other through the above communication terminals.

The LCLK terminals are terminals for communication clock signals output from the camera body 200 to the interchangeable lens assembly 100, and are also terminals in which the camera body 200 monitors a busy state of the interchangeable lens assembly 100. The DCL terminals are terminals for two-way communication data between the camera body 200 and the interchangeable lens assembly 100, and are CMOS interfaces. The DLC terminals are terminals for communication data that is output from the interchangeable lens assembly 100 to the camera body 200, and are CMOS interfaces.

The DLC2 terminals are terminals for communication data that is output from the interchangeable lens assembly 100 to the camera body 200, and are CMOS interfaces. The DCA terminals are terminals for two-way communication data between the camera body 200 and the interchangeable lens assembly 100, and are CMOS interfaces. The CS terminals are terminals for a communication request signal between the camera body 200 and the interchangeable lens assembly 100, and are open interfaces.

Other Terminals

MIF terminals are terminals for detecting whether the interchangeable lens assembly 100 has been mounted on the camera body 200, and whether the interchangeable lens assembly 100 has been dismounted from the camera body 200. After detecting that the interchangeable lens assembly 100 has been mounted on the camera body 200 by detecting the change in the voltage level of the MIF terminals, the camera control unit 618 starts supplying power to the VDD terminals and the VBAT terminals, and starts communication. In other words, the MIF terminals are triggers that start the supply of power from the camera body 200 to the interchangeable lens assembly 100. As described above, the TYPE terminals are terminals that distinguish the type of camera accessory mounted on the camera body 200. The camera control unit 618 detects the voltages of the signals of the TYPE terminals, and based on the value of the voltages, distinguishes the type of camera accessory mounted on the camera body 200. The interchangeable lens assembly 100 is pull-down connected to the DGND terminals at a predetermined resistance value described later. In the present exemplary embodiment, in a case in which the interchangeable lens assembly 100 is mounted on the camera body 200, communication is performed while the interface voltages of the first communication unit, the second communication unit, and the third communication unit are set to 3.0 V.

Furthermore, in the exemplary embodiment described above, a configuration has been described in which a device that includes either one of the camera mount and the accessory mount is actually rotated relative to a device that includes the other one of the camera mount and the accessory mount to bayonet couple the devices to each other; however, the configuration is not limited to the above configuration. For example, a configuration that allows the camera mount and the accessory mount to be bayonet coupled to each other by having the camera mount and the accessory mount be relatively rotated against each other may be employed. Hereinafter, the detail of the above will be described specifically.

Figure 10:
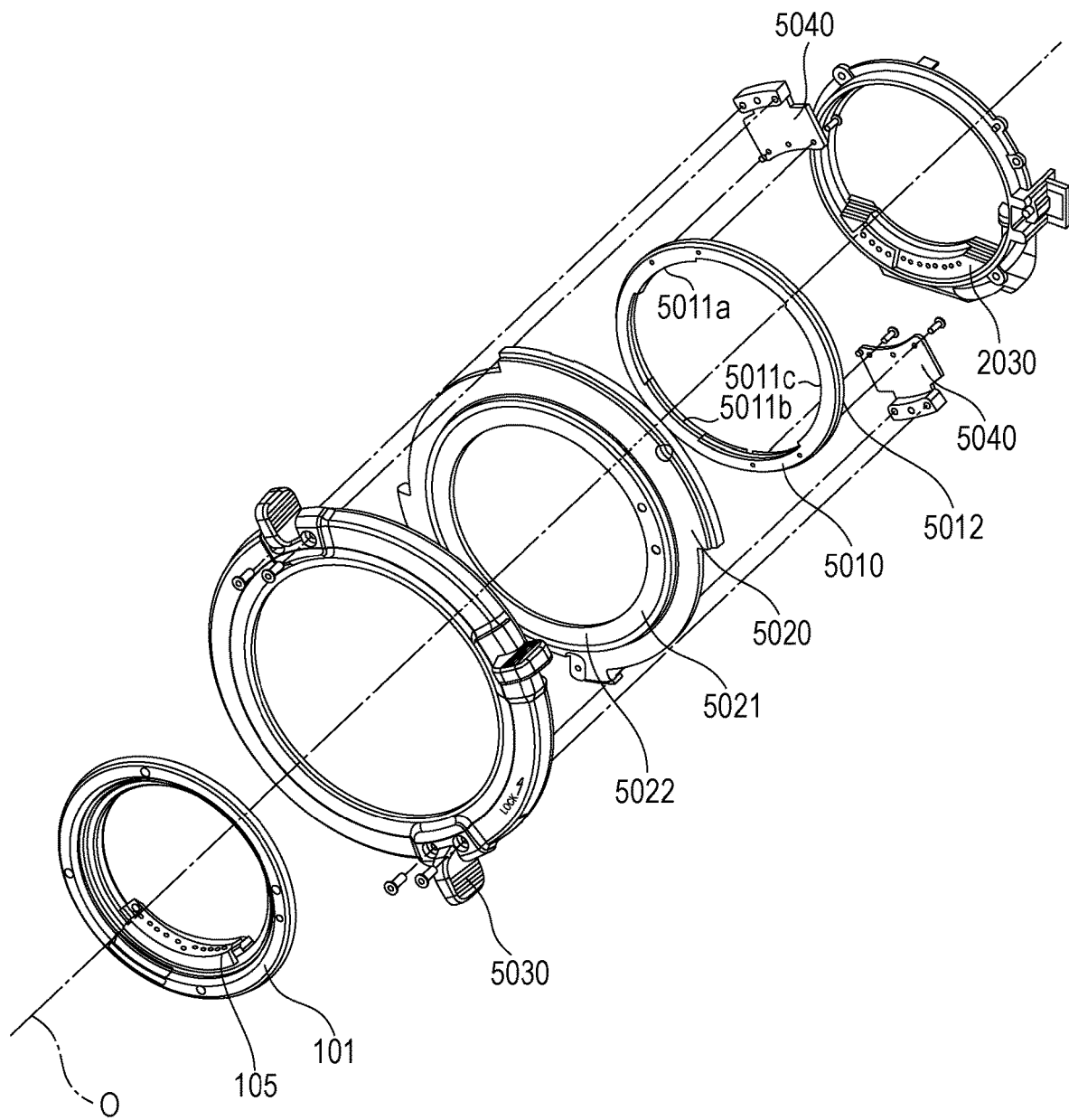
FIG. 10 is an exploded perspective view of a mount mechanism according to a modification.
Figure 11A:
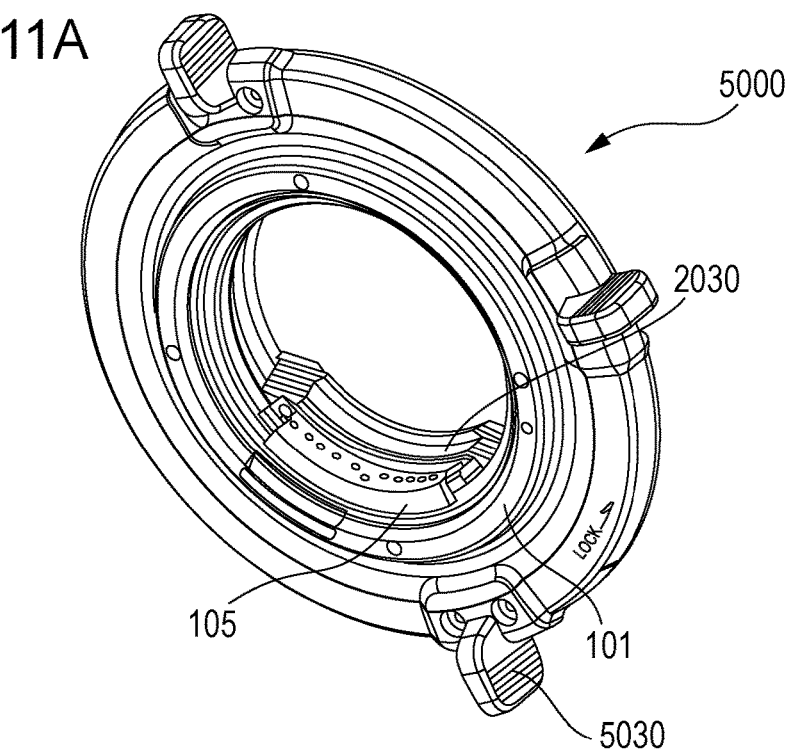
FIGS. 11A to 11C are drawings illustrating a mount mechanism according to the modification in a non-connected state.
Figure 11B:
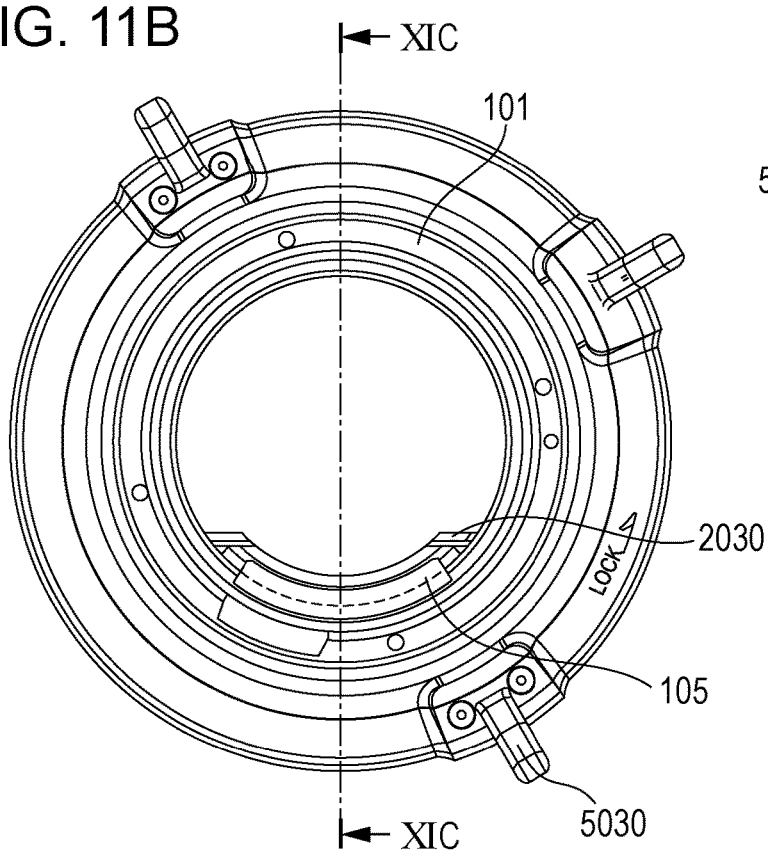
Figure 11C:
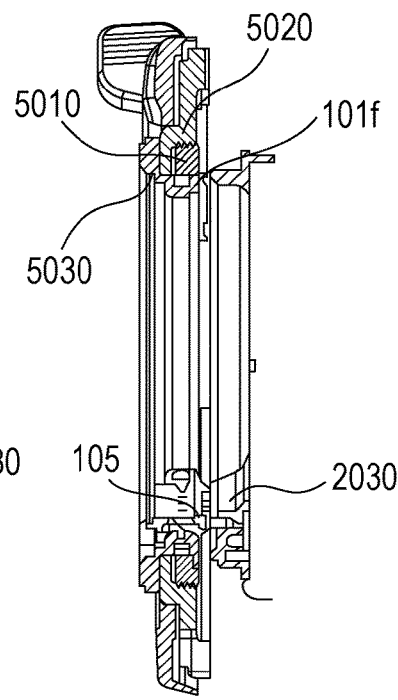
Figure 12A:
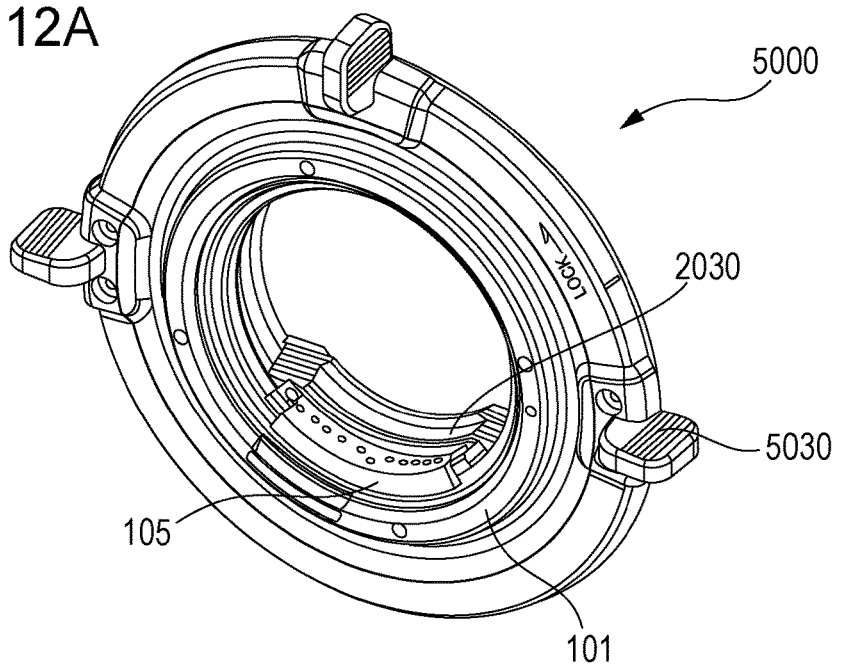
FIGS. 12A to 12C are drawings illustrating a mount mechanism according to the modification in a connected state.
Figure 12B:
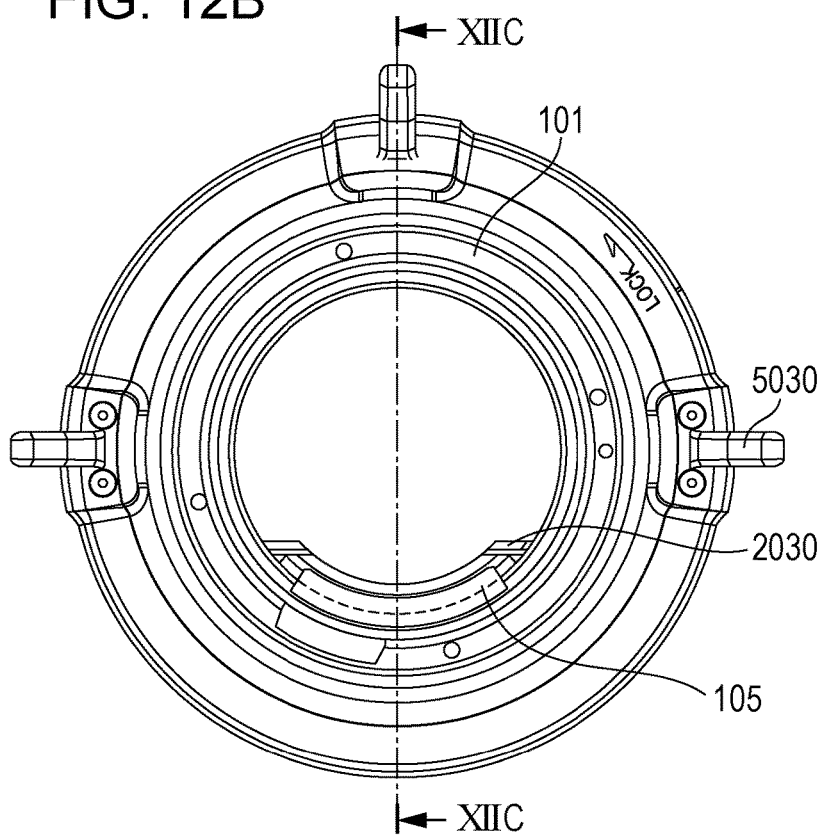
Figure 12C:
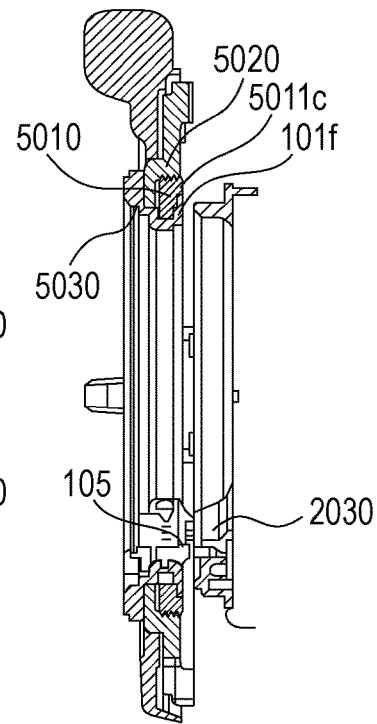

FIG. 10 is an exploded perspective view of a mount mechanism 5000 according to a modification of the present disclosure. FIGS. 11A to 11C are diagrams that exemplify a non-connected state of the mount mechanism 5000 according to the modification of the present disclosure. FIGS. 12A to 12C are diagrams that exemplify a connected state of the mount mechanism 5000 according to the modification of the present disclosure. Note that in FIGS. 10 to 12C, for the sake of description, a movable mount portion 5010 of the mount mechanism 5000, and a lens mount 101 that is capable of being bayonet coupled to the movable mount portion 5010 of the mount mechanism 5000 are illustrated at the same time. Furthermore, description of members that are the same as those of the exemplary embodiment is omitted and the same reference numerals are attached to the members.

As illustrated in FIG. 10, in the mount mechanism 5000 of the present modification, an operation portion 5030, a fixed mount portion 5020, the movable mount portion 5010, a contact point holding member 2030 that have an optical axis 3000 as the central axis are disposed in that order from the side on which the lens mount 101 is attached. The operation portion 5030 is a ring-shaped operation member rotatable about the central axis, and is connected to the movable mount portion 5010 with arm portions 5040 and screws. Note that in the present modification, the operation portion 5030 and the movable mount portion 5010 are fixed to each other at two portions using two arm portions 5040 disposed in a direction orthogonal to the central axis. With the above configuration, the movable mount portion 5010 is also rotated about the central axis in accordance with the rotating operation of the operation portion 5030 in an integrated manner.

Movable mount claw portions 5011a, 5011b, and 5011c capable of being bayonet coupled to bayonet claw portions provided in the lens mount 101 are provided in the movable mount portion 5010. Furthermore, a screw portion 5012 threaded about the central axis is provided in the movable mount portion 5010. The state in which the screw portion 5012 and a screw portion 5022 of the fixed mount portion 5020 described later are screwed to each other changes in accordance with the rotation of the movable mount portion 5010 about the central axis.

The fixed mount portion 5020 includes a camera mount surface 5021 that abuts against a mount surface of the lens mount 101, and the screw portion 5022 that is screwed to the screw portion 5012 of the movable mount portion 5010 described above. Different from the movable mount portion 5010 described above, the fixed mount portion 5020 does not rotate about the central axis in accordance with the rotating operation of the operation portion 5030.

Referring next to FIGS. 11A to 12C, a bayonet coupling method of the mount mechanism according to the present modification will be described. Note that while in a state in which the bayonet claws are inserted in an opening portion of the operation member 5030 and an opening portion of the fixed mount portion 5020, the bayonet claws provided on the lens mount 101 are engageable with the movable mount claw portions 5011a to 5011c of the movable mount portion 5010. In the state illustrated in FIGS. 11A to 11C, the operation portion 5030 is positioned in the unlocking position. In the above state, while a lens mount surface of the lens mount 101 and the camera mount surface 5021 of the fixed mount portion 5020 abut against each other, the claw portions of the lens mount 101 and the claw portions of the movable mount portion 5010 do not engage or overlap each other when viewed in the central axis direction. FIG. 11C is a cross-sectional diagram taken along cross-section XIC-XIC in FIG. 11B. FIGS. 12A to 12C illustrate an exemplification of the mount mechanism 5000 in a state in which the rotation operation has been performed on the operation portion 5030 from the above state.

In the state illustrated in FIGS. 12A to 12C, the operation portion 5030 is positioned in the locking position. In the above state, when viewed in the central axis direction, the claw portions of the lens mount 101 and the claw portions of the movable mount portion 5010 overlap each other to engage with each other in the central axis direction. FIG. 12C is a cross-sectional diagram taken along cross-section XIIC-XIIC in FIG. 12B. As illustrated in FIGS. 11C and 12C, the movable mount portion 5010 moves away from the fixed mount portion 5020 in a center axis direction of the mount depend on a non-locking state of the mount mechanism 5000 changing in a lock state of the mount mechanism 5000. Furthermore, in the above state, in accordance with the rotating operation of the operation member 5030, the state in which the screw portion 5022 of the fixed mount portion 5020 and the screw portion of the movable mount portion 5010 are screwed to each other changes and the movable mount portion 5010 moves in the central axis direction towards the image pickup apparatus side. With the above configuration, the movable mount claw portions 5011a to 5011c engaged with the bayonet claw portions on the lens mount 101 side each move towards the image pickup apparatus side.

As described above, in the mount mechanism 5000 of the present modification, by having the movable mount portion including the claw portions that can be engaged with the claw portions on the lens mount side be rotated about the central axis, the movable mount portion can be moved in the central axis direction relative to the fixed mount portion. With such a configuration, in a state in which the lens mount and the camera-side mount are connected to each other, the mount mechanism 5000 of the present modification can reduce the occurrence of the gap (the space) created between the lens mount and the camera-side mount.

Note that in the modification described above, a configuration in which the mount mechanism 5000 is provided on the image pickup apparatus side has been described; however, the present disclosure can be applied to, for example, a configuration in which the mount mechanism 5000 is provided on the camera accessory side such as the interchangeable lens assembly side.

Hereinafter, a more detailed description of the dispositional relationship between the terminals and the mount portions will be given.

Figure 13A:
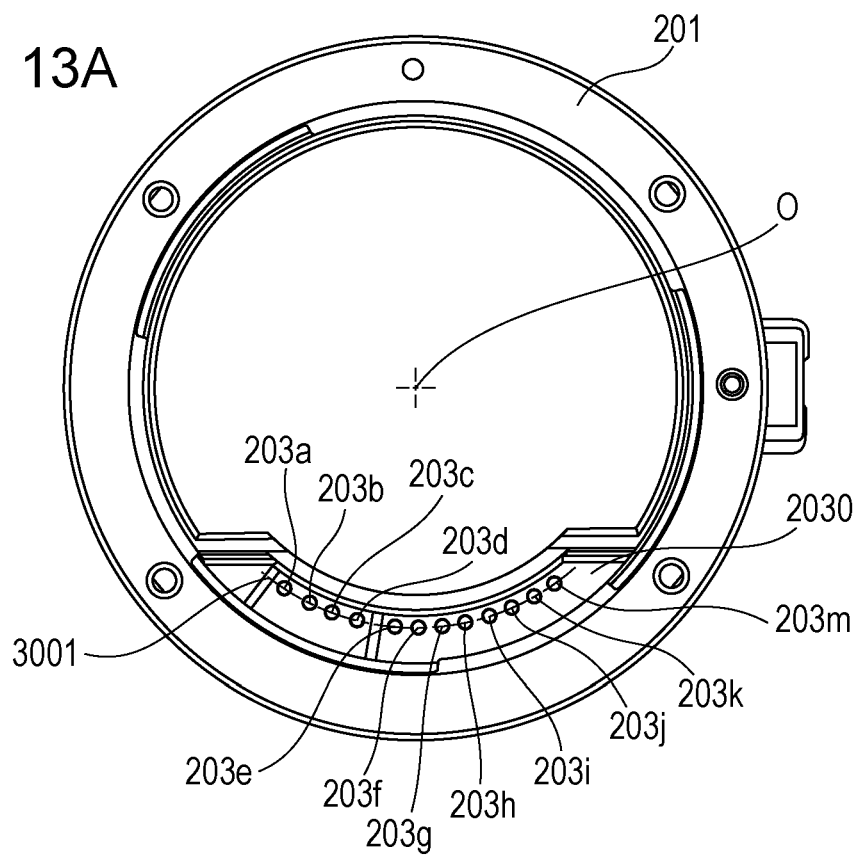
FIG. 13A is a detailed diagram illustrating a dispositional relationship of a camera contact pin according to the present exemplary embodiment.
Figure 13B:
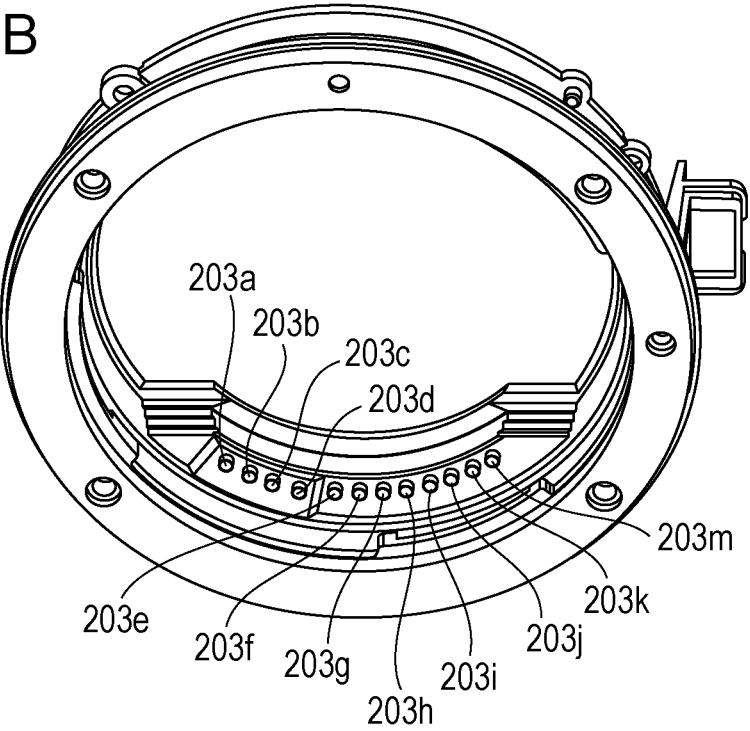
FIG. 13B is a perspective view illustrating a dispositional relationship of a camera contact pin according to the present exemplary embodiment.

Referring to FIGS. 13A and 13B, the dispositional relationship between the camera mount 201 and camera-side terminals described above will be described.

FIG. 13A is a diagram of the dispositional relationship between the camera mount 201, the plurality of terminal pins 203a to 203k, and 203m that are the plurality of camera-side terminals (first terminals), and a camera side terminals holding member 2030 viewed from the subject side (a front side of the camera body 10). FIG. 13B is a diagram of the camera mount 201, the terminal pins 203a to 203k, and 203m, and the holding member 2030 viewed from obliquely above and from the subject side (the front side of the camera body 10).

As illustrated in FIG. 8A, in the holding member 2030, the terminal pins 203a to 203k, and 203m are arranged on a camera terminal pin arrangement line 3001. The terminal pins 203a to 203k, and 203m are each a movable terminal that can be advanced and retreated in a direction parallel to the optical axis 3000, and are biased towards the interchangeable lens assembly 100 side with springs (not shown).

The relationship between the terminals illustrated in FIG. 1B described above and the terminal pins is as follows. In other words, the terminal pin 203a is the camera-side VDD terminal, the terminal pin 203b is the camera-side VBAT terminal, the terminal pin 203c is the camera-side TYPE terminal, the terminal pin 203d is the camera-side PGND terminal, and the terminal pin 203e is the camera-side MIF terminal. Furthermore, the terminal pin 203f is the camera-side DCL terminal, the terminal pin 203g is the camera-side DLC terminal, the terminal pin 203h is the camera-side LCLK terminal, the terminal pin 203i is the camera-side DLC2 terminal, and the terminal pin 203j is the camera-side DCA terminal. Furthermore, the terminal pin 203k is the camera-side CS terminal, the terminal pin 203m is the camera-side DGND terminal.

As illustrated in FIG. 13B, heights of the terminal pins 203a, 203b, 203c, and 203d in an optical axis 3000 direction are higher than heights of the terminal pins 203e, 203f, 203g, 203h, 203i, 203j, 203k, and 203m in the optical axis 3000 direction. The above is because the holding member 2030 includes two surfaces that have different heights in the optical axis 3000 direction in which the terminal pins 203a, 203b, 203c, and 203d are provided in the higher surface and the rest of the terminal pins are provided in the lower surface.

In other words, all of the terminal pins of the present exemplary embodiment are not provided in surfaces at the same height. By having such a configuration, the present exemplary embodiment is capable of suppressing abrasion of the terminals caused by the camera-side terminals sliding against the lens-side terminals when the interchangeable lens assembly 100 is mounted on the camera body 10. More specifically, when the interchangeable lens assembly 100 is rotated from the locking position to the unlocking position to mount the interchangeable lens assembly 100 on the camera body 10, there is a period in which the terminal pins 203e to 203k, and 203m are not in contact with the lens-side terminals. Accordingly, the abrasion of the terminals described above can be suppressed.

Figure 14A:
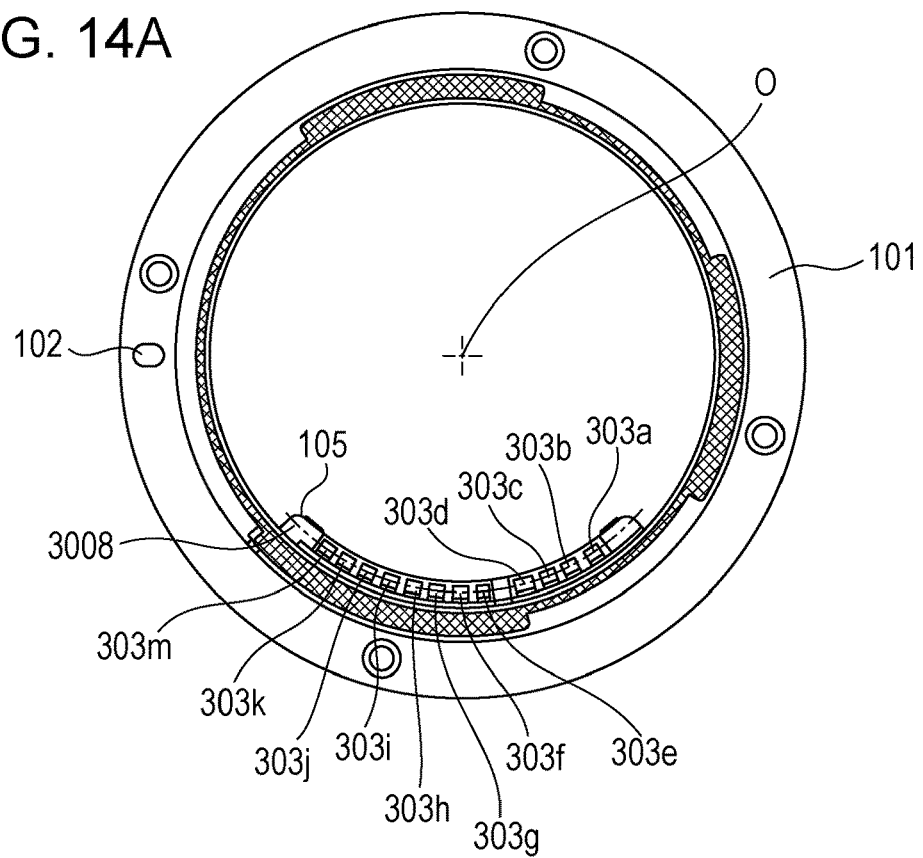
FIG. 14A is a detailed diagram illustrating a dispositional relationship of lens contact portions according to the present exemplary embodiment.
Figure 14B:
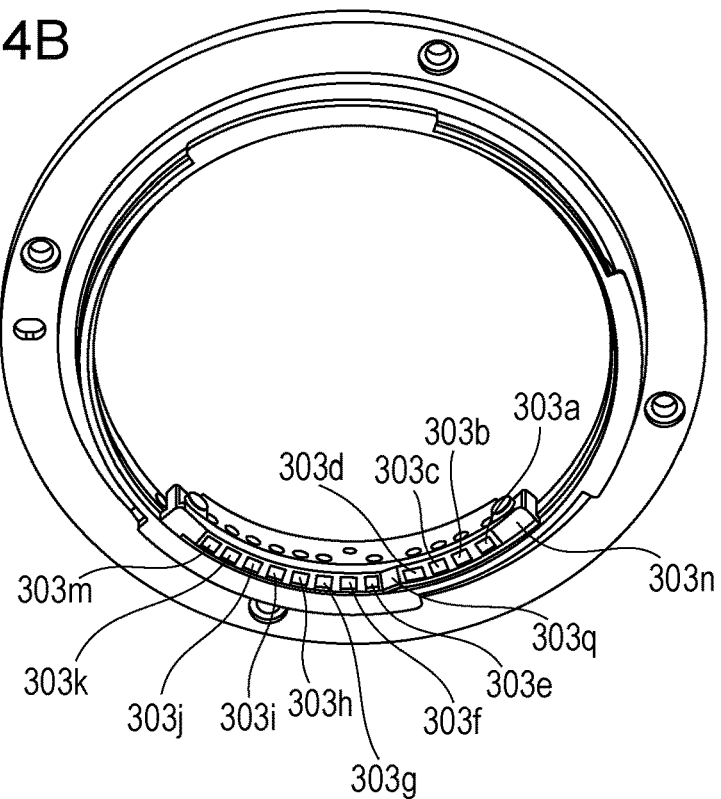
FIG. 14B is a perspective view illustrating a dispositional relationship of the lens contact portions according to the present exemplary embodiment.

Referring next to FIGS. 14A and 14B, the dispositional relationship between the lens mount 101 and lens-side terminals described above will be described. FIG. 14A is a diagram of the dispositional relationship between the lens mount 101 in which the interchangeable lens assembly 100 is in the lock phase state, the terminal surfaces 303a to 303k, and 303m that are the plurality of lens-side terminals (second terminals), and the holding member 105 viewed from the photographer side. FIG. 9B is a diagram of the lens mount 101, the terminal surfaces 303a to 303k, and 303m, and the holding member 105 viewed from obliquely above from the photographer side in a case in which the interchangeable lens assembly 100 is in the lock phase state and in which the interchangeable lens assembly 100 is mounted on the camera body 10.

As illustrated in FIG. 14A, in the holding member 105, the terminal surfaces 303a to 303k, and 303m are arranged on a lens contact point arrangement line 3004. The relationship between the terminals illustrated in FIG. 9B described above and the terminal surfaces is as follows. In other words, the terminal surface 303a is the lens-side VDD terminal, the terminal surface 303b is the lens-side VBAT terminal, the terminal surface 303c is the lens-side TYPE terminal, the terminal surface 303d is the lens-side PGND terminal, and the terminal surface 303e is the lens-side MIF terminal.

Furthermore, the terminal surface 303f is the lens-side DCL terminal, the terminal surface 303g is the lens-side DLC terminal, the terminal surface 303h is the lens-side LCLK terminal, the terminal surface 303i is the lens-side DLC2 terminal, and the terminal surface 303j is the lens-side DCA terminal. Furthermore, the terminal surface 303k is the lens-side CS terminal, and the terminal surface 303m is the lens-side DGND terminal.

As illustrated in FIG. 14B, heights of the terminal surfaces 303a, 303b, 303c, and 303d in the optical axis 3000 direction are lower than heights of the terminal surfaces 303e, 303f, 303g, 303h, 303i, 303j, 303k, and 303m in the optical axis 3000 direction. The above is because the holding member 105 includes two surfaces that have different heights in the optical axis 3000 direction in which the terminal surfaces 303a, 303b, 303c, and 303d are provided on the lower surface and the rest of the terminal surfaces are provided on the higher surface. By having the lens-side terminals have the above configuration that corresponds to the configuration of the camera-side terminals described above, the abrasion of the terminals described above can be suppressed.

Reference numerals 303n and 303q are guiding inclined faces (inducing oblique surfaces) for mounting the interchangeable lens assembly 100 on the camera body 10 by pushing the terminal pins towards the image pickup member 202 side when the interchangeable lens assembly 100 is rotated. By providing the guiding inclined faces, the contact pressure against the lens mount 101 of the terminal pins provided on the camera body 10 side changes in a gentle and stepwise manner; accordingly, deformation of the terminal pins provided on the camera body 10 side can be reduced.

Figure 15A:
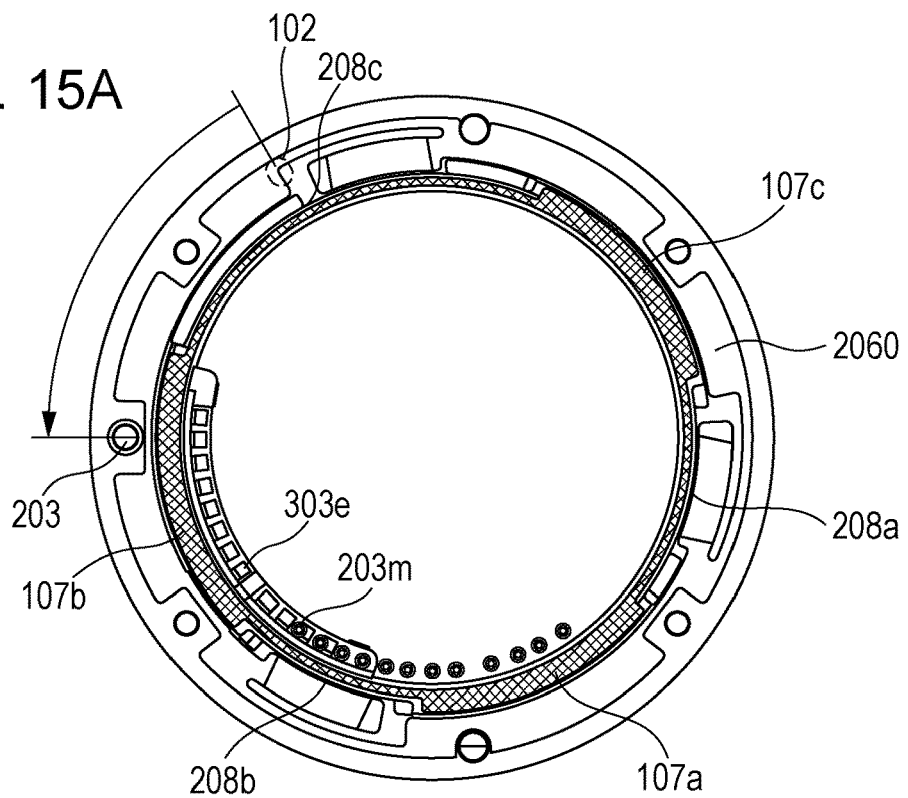
FIG. 15A is a diagram illustrating an insertion phase state when the interchangeable lens assembly is attached to the camera according to the present exemplary embodiment viewed from the camera photographer side.
Figure 15B:
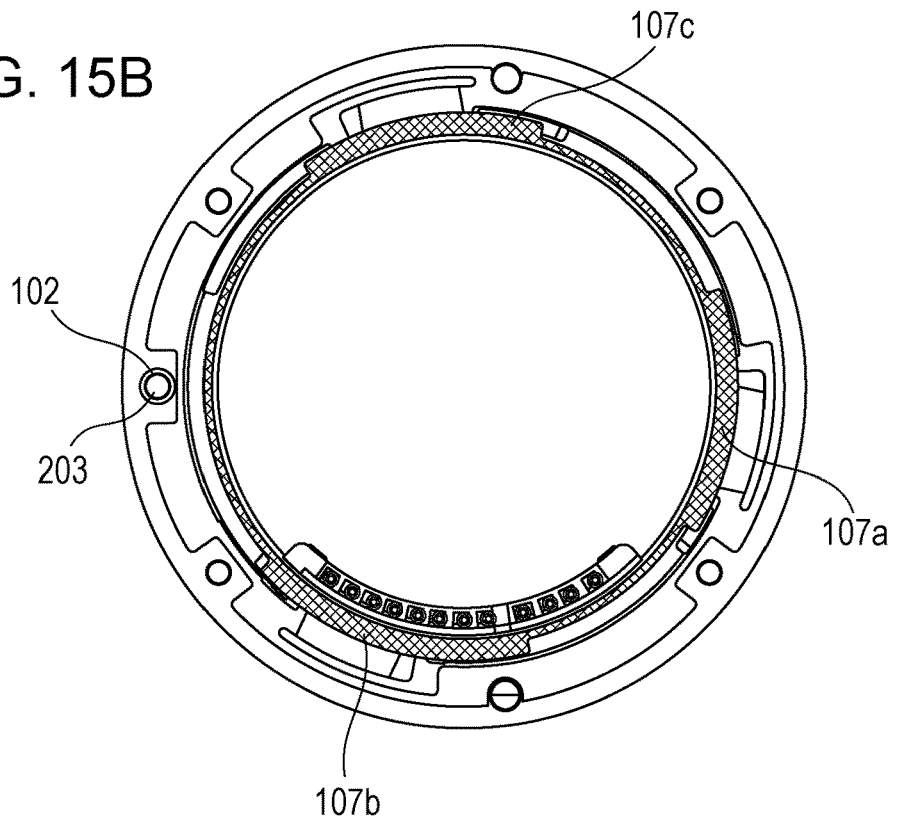
FIG. 15B is a diagram illustrating a lock phase state when the interchangeable lens assembly is attached to the camera according to the present exemplary embodiment viewed from the camera photographer side.

Referring next to FIGS. 15A and 15B, an operation of fitting the interchangeable lens assembly 100 on the camera body 10 will be described.

The operation of mounting a camera accessory, such as the interchangeable lens assembly 100, on the camera body 10 can be broadly separated into a first operation and a second operation described next.

Figure 3B:
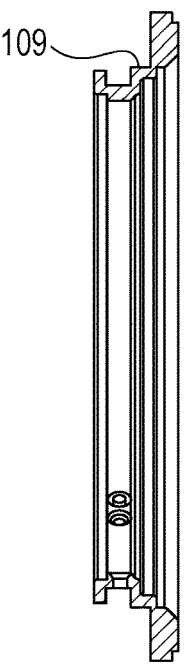
FIG. 3B is a cross sectional view of a lens mount.
Figure 4B:
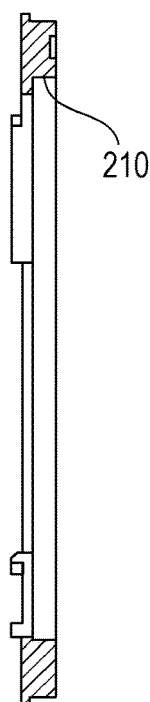
FIG. 4B is a cross sectional view of a camera mount.

The first operation is an operation in which the interchangeable lens assembly 100 is inserted into the camera body 10 by setting the positions of the camera body 10 and the interchangeable lens assembly 100 to predetermined positions in the rotation direction so as to allow the lens claw portions enter the camera cutaways and is an operation in which a lens-side diameter fitting portion 109 in FIG. 3B and a camera-side diameter fitting portion 210 in FIG. 4B are diametrically fitted to each other. Furthermore, the second operation is an operation in which, while the lens-side diameter fitting portion 109 and the camera-side diameter fitting portion 210 are diametrically fitted to each other, relatively rotating the camera body 10 and the interchangeable lens assembly 100 towards the locking position, and is an operation bringing the camera body 10 and the interchangeable lens assembly 100 to a bayonet coupled state.

FIG. 15A is a diagram illustrating an insertion phase state (a first state) when the camera body 10 is attached to the interchangeable lens assembly 100 of the present exemplary embodiment viewed from the camera mount 201 side (the photographer side). Note that the insertion phase state refers to a state in which the first lens-side claw portion 107a is inserted in the second camera-side cutaway 209b, the second lens-side claw portion 107b is inserted in the third camera-side cutaway 209c, and the third lens-side claw portion 107c is inserted in the first camera-side cutaway 209a. The lens-side diameter fitting portion 109 and the camera-side diameter fitting portion 210 are diametrically fitted to each other in the above state.

FIG. 15B is a diagram illustrating a lock phase state (a second state) when the camera body 10 is attached to the interchangeable lens assembly 100 of the present exemplary embodiment viewed from the camera mount 201 side (the photographer side). Note that the lock phase state is a state in which the interchangeable lens assembly 100 is, from the insertion phase state illustrated in FIG. 15A described above, rotated 60° in the clockwise direction when viewed from the subject side of the interchangeable lens assembly 100 to engage the lens claw portions and the camera claw portions to each other.

More specifically, in the lock phase state, the first lens-side claw portion 107a is positioned on the image pickup member 202 side of the first camera-side claw portion 208a, and the second lens-side claw portion 107b is positioned on the image pickup member 202 side of the second camera-side claw portion 208b. Furthermore, the third lens-side claw portion 107c is positioned on the image pickup member 202 side of the third camera-side claw portion 208c. The lens claw portions and the camera claw portions are engaged with each other in the above state, and the lock pin 203 is inserted in the lock pin groove 102; accordingly, rotation of the interchangeable lens assembly 100 is locked. Furthermore, in the lock phase state, the lens claw portions are biased towards the image pickup member 202 with the lens mount biasing member 2060. Note that in place of the lens mount biasing member 2060, a flat spring portion may be provided in each camera claw portion.

Furthermore, when the interchangeable lens assembly 100 is transitioned from the insertion phase state to the lock phase state, the terminal pins on the camera body 10 side are pressed towards the image pickup member 202 side with the guiding inclined faces 303n and 303q described above.

Furthermore, while being continuously pressed, each of the terminal pins on the camera body 10 side come in contact with the corresponding terminal surfaces 303a to 303k, and 303m. Note that the terminal pin 203m and the terminal surface 303e come in contact with each other first.

As described above, for example, in the present exemplary embodiment, the configuration of the interchangeable lens assembly 100 has been described by exemplifying an interchangeable lens assembly 100 serving as the optical apparatus, however, the optical apparatus of the present disclosure is not limited to the interchangeable lens assembly 100. For example, an adapter that can be interposed between the interchangeable lens assembly 100 and the camera body 10 may serve as the optical apparatus (the accessory) of the present disclosure. Hereinafter, a more detailed description of this adapter will be given. Note that in the following description, a second conversion adapter 70 has a camera mount 1201 same as the camera mount 201 of the camera body 10. And, note that in the following description, a first conversion adapter 40 has a lens mount 1301 same as the lens mount 101 of the first lens 100. And note that the camera mount 201 and the lens mount 101 have the ring-shaped, but this is not restrictive in the present embodiments. For example, a configuration may be employed where this is realized by each of the camera mount 201 and lens mount 101 have an arc-shaped contact faces, may be employed in the configuration. In other words, a configuration may be employed where this is realized by the camera mount 201 and the lens mount 101 are lacked a part of the contact face.

Figure 16A:
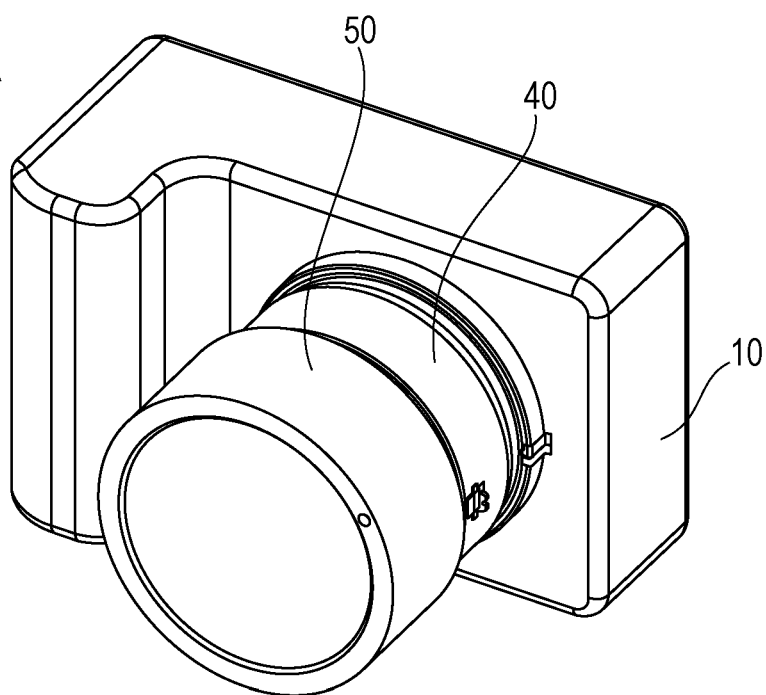
FIGS. 16A and 16B are diagrams describing a first conversion adapter that is mountable to the camera body, and a second interchangeable lens assembly.
Figure 16B:
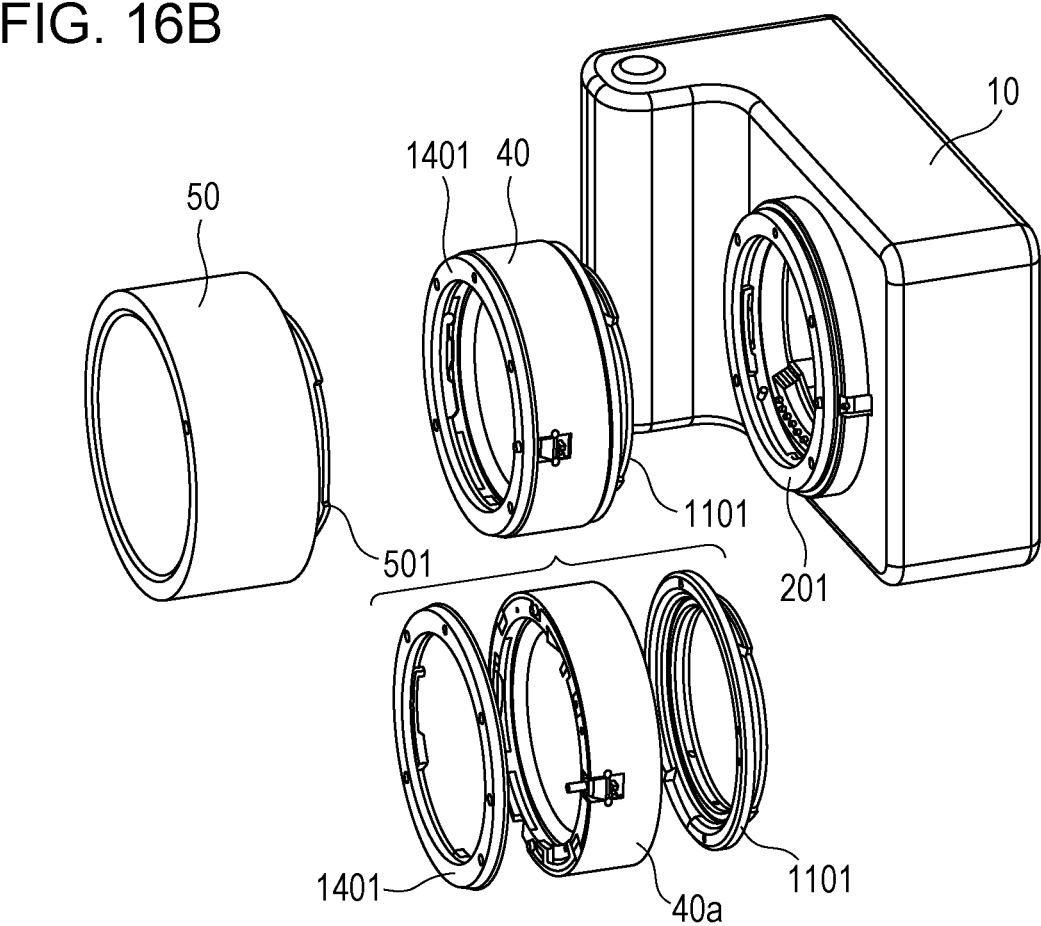

Firstly, the basic configuration of a conversion adapter (adapter device) that is a camera accessory mountable to the camera mount 201 of the above-described camera body 10 will be described with reference to FIGS. 16A through 17B. FIGS. 16A and 16B are diagrams describing a first conversion adapter 40 that is mountable to the camera body 10, and a second interchangeable lens assembly 50. FIG. 16A illustrates an external perspective view of the second interchangeable lens assembly 50 having been mounted to the camera body 10 via the first conversion adapter 40. FIG. 16B illustrates an external perspective view of a state where the camera body 10, first conversion adapter 40, and second interchangeable lens assembly 50 have each been detached. Note that the second interchangeable lens assembly (hereinafter referred to as second lens) 50 has a lens mount 501 that is short in flange focal distance, but has the same mount diameter as the camera mount 201, as to the camera body 10. That is to say, the second lens 50 has the same mount diameter as the above-described first lens 100, but unlike the first lens 100, is a camera accessory that is not compatible with direct mounting to the camera body 10.

Figure 17A:
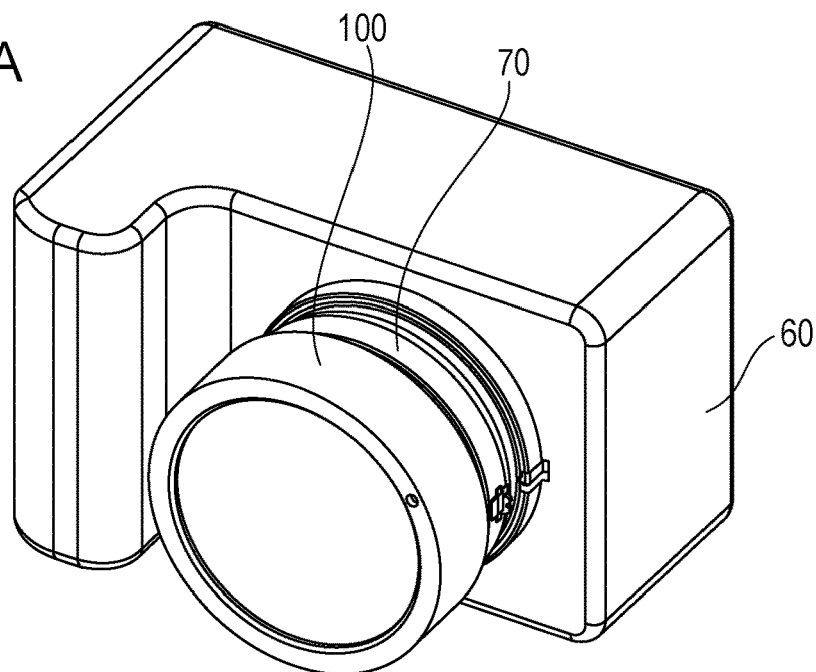
FIGS. 17A and 17B are diagrams describing a second conversion adapter that is mountable to a camera body, and the first interchangeable lens assembly.
Figure 17B:
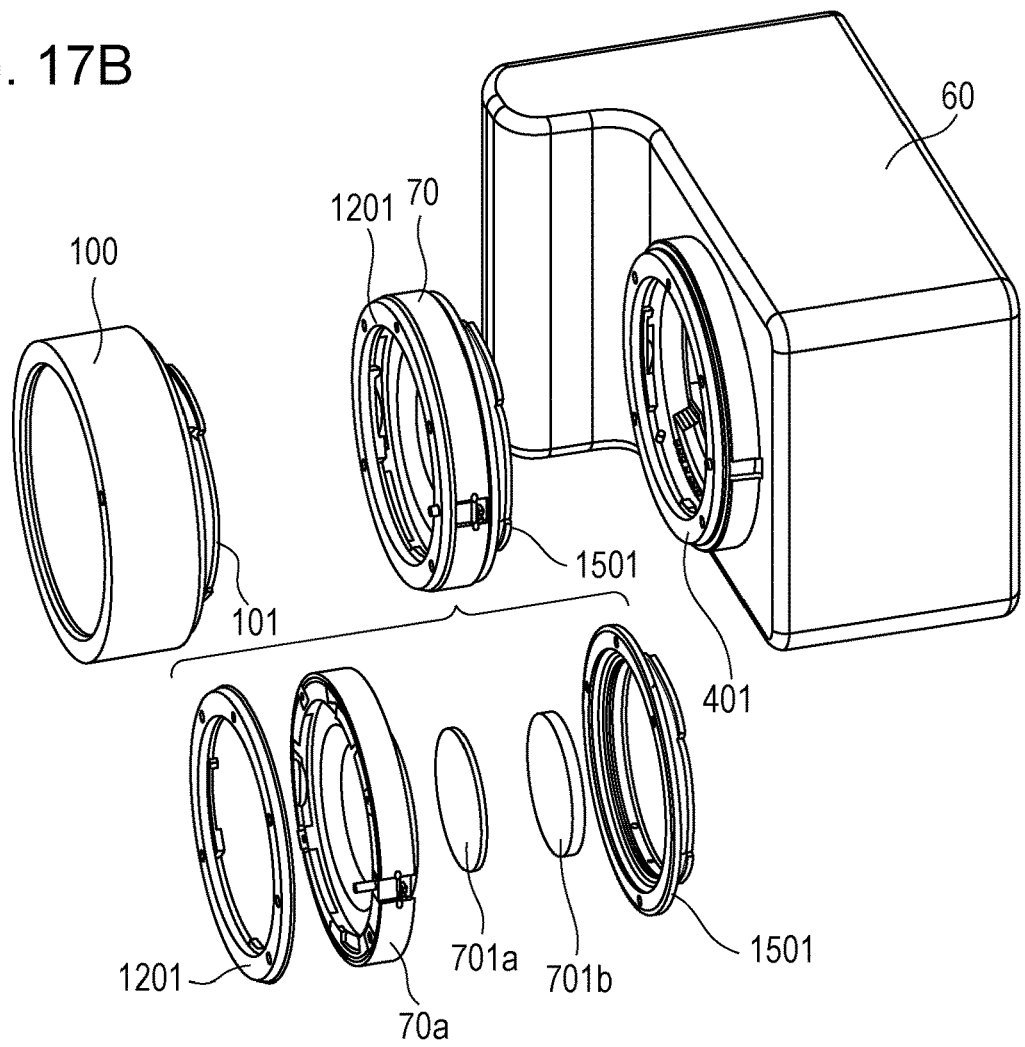

FIGS. 17A and 17B are diagrams for describing a second conversion adapter 70 that is mountable to a camera body 60 and the first lens 100. FIG. 17A illustrates an external perspective view of a state where the first lens 100 is mounted to the camera body 60 via the second conversion adapter 70, and FIG. 17B illustrates an external perspective view where the camera body 60, second conversion adapter 70, and first lens 100 have each been detached.

Now, in a case where an interchangeable lens assembly with a long flange focal distance is directly mounted to an imaging apparatus with a short flange focal distance, trouble will occur such as the focal point not being formed at an accurate position or the like, and imaging a subject in this way will result in an unnatural image being obtained. For example, the above problem will occur if the second lens 50 that has a long flange focal distance is mounted to the above-described camera body 10.

In the same way, in a case where an interchangeable lens assembly with a short flange focal distance is directly mounted to an imaging apparatus with a long flange focal distance, trouble will occur such as the focal point not being formed at an accurate position or the like, and imaging a subject in this way will result in an unnatural image being obtained. For example, the above problem will occur if the first lens 100 that has a short flange focal distance is mounted to the camera body 60 serving as a second imaging apparatus that has a longer flange focal distance than the above-described camera body 10.

Particularly, the camera body 10 and camera body 60, and the first lens 100 and second lens 50, have the same mount diameter, it is difficult for a user to judge which imaging apparatuses and which interchangeable lens assemblies have flange focal distances that are compatible for direct mounting.

Accordingly, it is preferable that only interchangeable lens assemblies that are compatible can be directly mounted to a certain imaging apparatus, so that imaging apparatuses and interchangeable lens assemblies that have mutually incompatible flange focal distances are not erroneously directly mounted.

Also, in a case of mounting an incompatible interchangeable lens assembly to an imaging apparatus, a conversion adapter needs to be interposed between the two to adjust the flange focal distance. However, in a case where one side of the conversion adapter is mounted to the imaging apparatus and an interchangeable lens assembly compatible with direct mounting to the imaging apparatus is mounted to the other side of the conversion adapter, the focal point may not be accurately formed, as described above. Accordingly, the one side and other side of the conversion adapter preferably have configurations to restrict imaging apparatuses and camera accessories that are directly mountable.

Specifically, in a case of mounting an interchangeable lens assembly having a long flange focal distance to an imaging apparatus having a short flange focal distance, a conversion adapter is preferable where one end side is only mountable to this imaging apparatus, and the other end side is only mountable to this interchangeable lens assembly. Also, in a case of mounting an interchangeable lens assembly having a short flange focal distance to an imaging apparatus having a long flange focal distance, a conversion adapter is preferable where one end side is only mountable to this imaging apparatus, and the other end side is only mountable to this interchangeable lens assembly.

The first conversion adapter 40 has the lens mount 1101 attached to an adapter barrel 40a by fastening screws (omitted from illustration), at one end side in the optical axis direction. This lens mount 1101 is an accessory mount that is detachable from the camera mount 201 provided to the camera body 10 described above.

A camera mount 1401 is attached to the adapter barrel 40a by fastening screws (omitted from illustration), at the other end side of the first conversion adapter 40 in the optical axis direction. This camera mount 1401 is a camera mount that is detachable from the lens mount 501 of the second lens 50. Note that the camera mount 1401 of the first conversion adapter 40 is attached so that the imaging plane of the imaging sensor 11 of the will be situated at a position corresponding to the flange focal distance of the second lens 50.

The second conversion adapter 70 has the lens mount 1501 attached to an adapter barrel 70a by fastening screws (omitted from illustration), at one end side in the optical axis direction. This lens mount 1501 is an accessory mount that is detachable from the camera mount 1401 provided to the camera body 60.

The camera mount 1201 is attached to the adapter barrel 70a by fastening screws (omitted from illustration), at the other end side of the second conversion adapter 70 in the optical axis direction. This camera mount 1201 is a camera mount that is detachable from the lens mount 101 of the first lens 100, as described above.

Note that a first optical member 701a and a second optical member 701b are provided to the second conversion adapter 70, between the adapter barrel 70a and the lens mount 1501 in the optical axis direction. The first optical member 701a and second optical member 701b enable the second conversion adapter 70 to extend length of the flange focal distance of the first lens 100 in accordance with the imaging plane of the imaging sensor disposed in the camera body 60. While the optical members have been illustrated as two lenses for the sake of convenience, this is not restrictive.

Figure 18A:
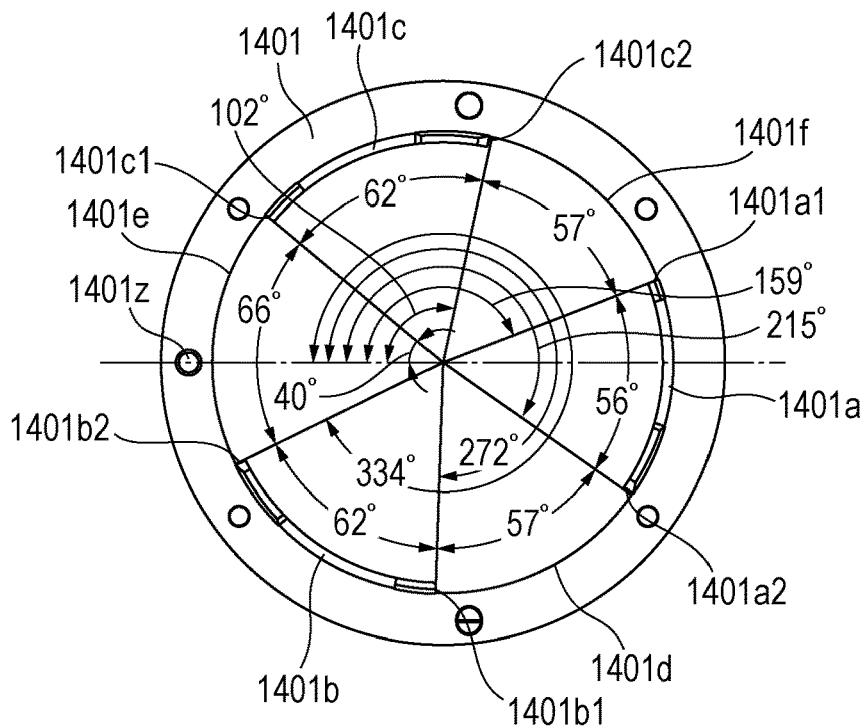
FIGS. 18A through 18C is a diagram for exemplarily describing angle so disposing bayonet claw portions in a camera mount provided on one end of the first conversion adapter.
Figure 18B:
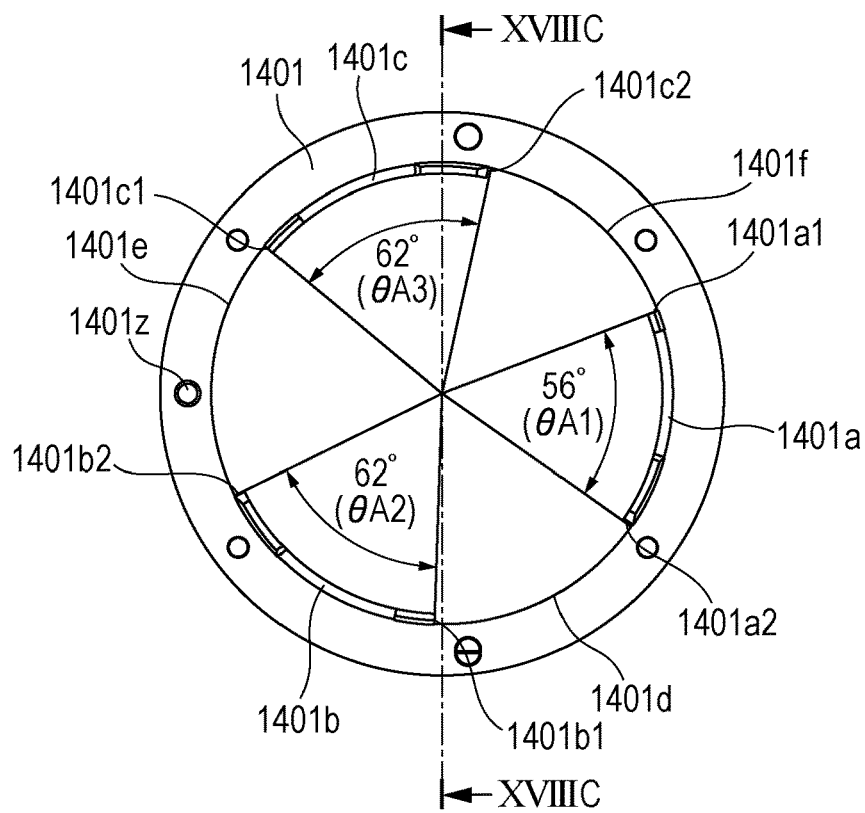
Figure 18C:
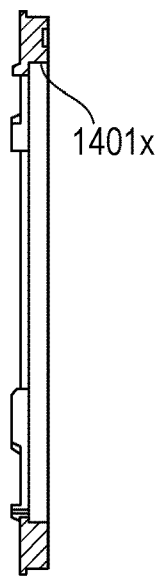

Next, the angles (phases) at which bayonet claw portions are disposed on the circumferential direction of the camera mount and lens mount of the first conversion adapter 40 will be described with reference to FIG. 18A through FIG. 22. FIGS. 18A through 22 are diagrams for exemplarily describing displacement angles of bayonet claw portions in the camera mount 1401 provided on one end of the first conversion adapter 40. FIG. 18A is a diagram illustrating angle ranges that camera claw portions and camera cutaways occupy in the circumferential direction of the camera mount 1401 with the lock pin 1401z as a reference, as viewed from the rear face side (camera body 10 side). FIG. 18B is a diagram illustrating angle ranges that multiple camera claw portions 1401a through 1401c occupy in the circumferential direction of the camera mount 1401, as viewed from the rear face side (camera body 10 side). FIG. 18C is a cross-sectional diagram taken along cross-section XVIIIB-XVIIIB in FIG. 18B.

The first conversion adapter 40 is a mount adapter used for mounting the second lens 50 that has a long flange focal distance to the camera body 10 that has a short flange focal distance. Accordingly, it is preferable for the first conversion adapter 40 to be configured such that the camera body 60 that has a long flange focal distance cannot be directly mounted to the lens mount 1101, and the first lens 100 that has a short flange focal distance cannot be directly mounted to the camera mount 401. According to this configuration, the positional relation of claw portions and cutaways can be satisfied so that the lens mount 1101 provided to one end (first end) of the first conversion adapter 40 and the camera mount 1401 provided to the other end (second end) cannot each be directly mounted.

A first camera claw portion 1401a, second camera claw portion 1401b, and third camera claw portion 1401c, are provided in order, to the camera mount 1401 in the circumferential direction (inner radial direction). When viewing the camera mount 1401 from the rear face side as illustrated in FIG. 18A, the camera claw portion that is provided at a position farthest from the lock pin 401z is the first camera claw portion 1401a. The second camera claw portion 1401b and third camera claw portion 1401c are then consecutively provided in order from the first camera claw portion 1401a in a clockwise direction.

Also, cutaways which are a first camera cutaway 1401d, second camera cutaway 1401e, and third camera cutaway 1401f are provided in order, to the camera mount 1401 in the circumferential direction (inner radial direction). When viewing the camera mount 1401 from the rear face side as illustrated in FIG. 18A, the cutaway that is provided at a position nearest to the lock pin 401z is the second camera cutaway 1401e. The third camera cutaway 1401f and first camera cutaway 1401d are then consecutively provided in order from the second camera cutaway 1401e in a clockwise direction.

As illustrated in FIG. 18C, a fitting member 1401x that restricts movement of the camera accessory in a direction parallel to the optical axis when the camera accessory is mounted, is provided to the camera mount 1401 side. In the present embodiment, the diameter of the fitting member 1401x in a direction orthogonal to the optical axis at the camera mount 1401 side is the mount diameter.

The way of bayonet coupling of the first conversion adapter 40 and second lens 50 is the generally the same as the way of bayonet coupling of the camera body 10 and first lens 100 described above, so description will be omitted.

Note that the end portions of the camera claw portions 1401a, 1401b, and 1401c, in the circumferential direction, will be referred to as first end portion 1401a1, second end portion 1401a2, third end portion 1401b1, fourth end portion 1401b2, fifth end portion 1401c1, and end portion 1401c2, for the sake of description. The end portions are denoted with part numerals in order from the first camera claw portion 1401a in the clockwise direction, when viewing the camera mount 1401 from the rear face side, as described above.

As illustrated in FIG. 18A, the angles that the camera claw portions and camera cutaways occupy in the circumferential direction of the camera mount 1401 (angle ranges) in the first conversion adapter 40 according to the present embodiment are stipulated as follows. For the first camera claw portion 1401a, the angle θA1=56°, for the second camera claw portion 1401b, the angle θA2=62°, and for the third camera claw portion 1401c, the angle θA3=62°. Also, for the first camera cutaway 1401d, the angle is 57°, for the second camera cutaway 1401e, the angle is 66°, and for the third camera cutaway 1401f, the angle is 57°. That is to say the camera mount 1401 has different angles for the camera claw portions with respect to the above-described camera mount 201 of the camera body 10, but the angles of the camera cutaways are the same.

Also, when viewing the camera claw portions from the rear face side of the first conversion adapter 40, the angles where the camera claw portions are disposed on the circumferential direction of the camera mount 1401 with the position of the lock pin 402 (referred to as reference position) as a reference are stipulated as follows. The first camera claw portion 1401a is disposed between 159° to 215° with the reference position as a start point. The second camera claw portion 1401b is disposed between 272° to 334° with the reference position as a start point. The third camera claw portion 1401c is disposed between 40° to 102° with the reference position as a start point.

Figure 19A:
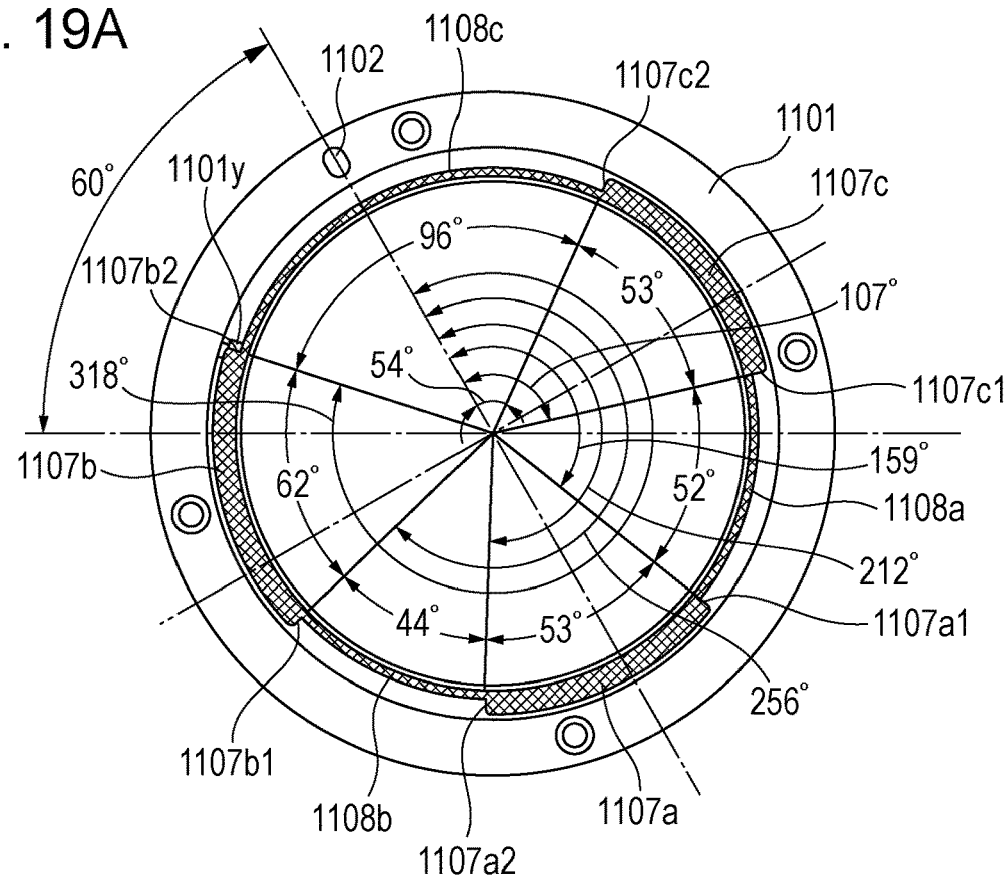
FIGS. 19A and 19B are diagrams exemplarily describing angle so disposing bayonet claw portions in the lens mount provided on the other end of the first conversion adapter.
Figure 19B:
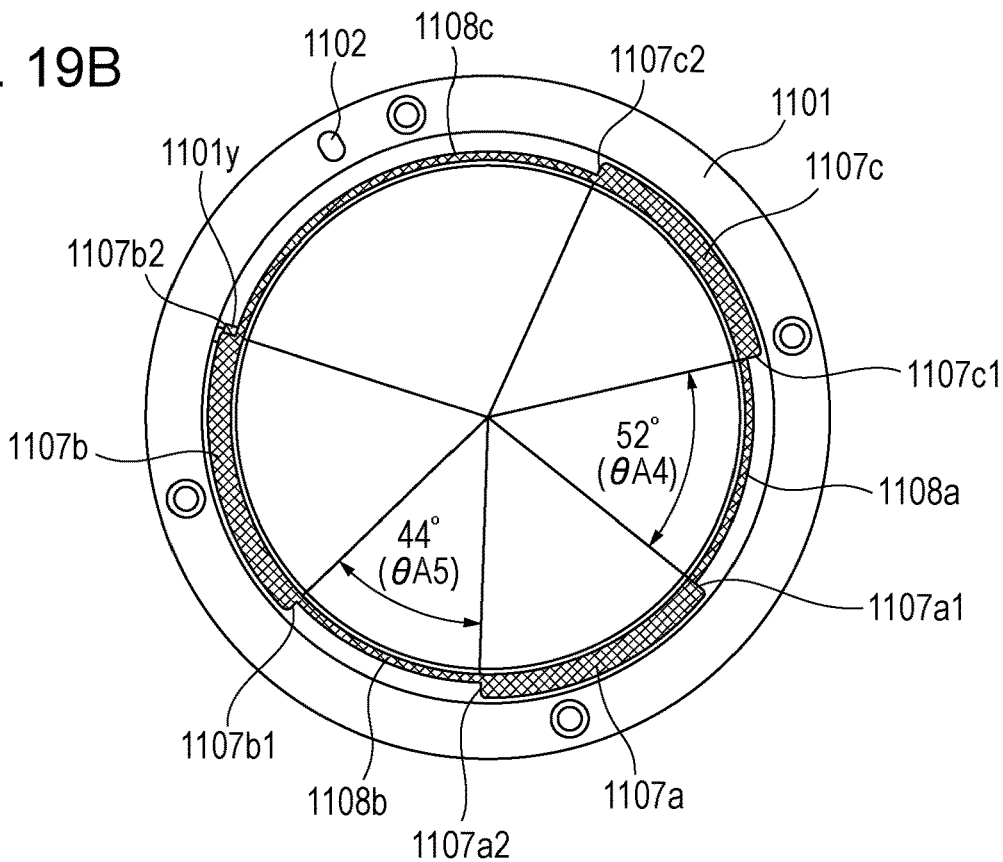

Next, FIGS. 19A and 19B are diagrams exemplarily describing angles of disposing the bayonet claw portions on the lens mount 1101 provided to the other end of the first conversion adapter 40. FIG. 19A is a diagram illustrating angle ranges that camera claw portions and camera cutaways occupy in the circumferential direction of the camera mount 1401 with the lock pin groove 1102 as a reference, as viewed from the rear face side. FIG. 19B is a diagram illustrating angle ranges that multiple lens cutaways 1101a through 1101c occupy in the circumferential direction of the lens mount 1101, as viewed from the rear face side. In FIG. 19A, 1101y is a circumferential-direction positioning pin 1101y that prevents the first conversion adapter 40 from rotating excessively from the desired position when the first conversion adapter 40 is mounted on the camera body 10. By having the positioning pin 1101y come in contact with the fourth end 208b2, the first conversion adapter 40 is stopped from rotating past the desired position described above. The first lens (the interchangeable lens assembly described in FIG. 2) 100 has a circumferential-direction positioning pin same as the circumferential-direction positioning pin 1101y.

The angles (angle ranges) that the lens cutaways occupy in the circumferential direction of the lens mount 1101 are, represented by θA4 as the angle of the first lens-side cutaway 1108a and θA5 as the angle of the second lens-side cutaway 1108b, as illustrated in FIG. 19B. Note that the angle so disposing the claw portions and cutaways on the lens mount 1101 of the first conversion adapter 40 is the same as the lens mount 101 of the first lens 100 described above, and accordingly description will be omitted.

The angles of the claw portions and cutaways in the circumferential direction, on the lens mount 1101 and camera mount 1401 provided to the first conversion adapter 40, will be compared. For example, at the lens mount 1101 side, the angle θA5 of the second lens-side cutaway 1108b having the smallest angle is 44°, whereas, at the camera mount 1401 side, the angle θA1 of first camera claw portion 1401a having the smallest angle is 56°. That is to say, the claw portion having the smallest angle at the camera mount 1401 side is larger than the cutaway having the smallest angle at the lens mount 1101 side (θA5<θA1). In this case, of the cutaways on the lens mount 1101 side and the claw portions on the camera mount 1401 side, at least one or more lens cutaway and camera claw portions will interfere with each other. Accordingly, even if an attempt is made to mount the interchangeable lens assembly to the camera body so that the optical axis at the camera mount 1401 side and lens mount 1101 side are generally parallel, the claw portions and cutaways interfere, so the interchangeable lens assembly cannot be mounted to the camera body.

Figure 20A:
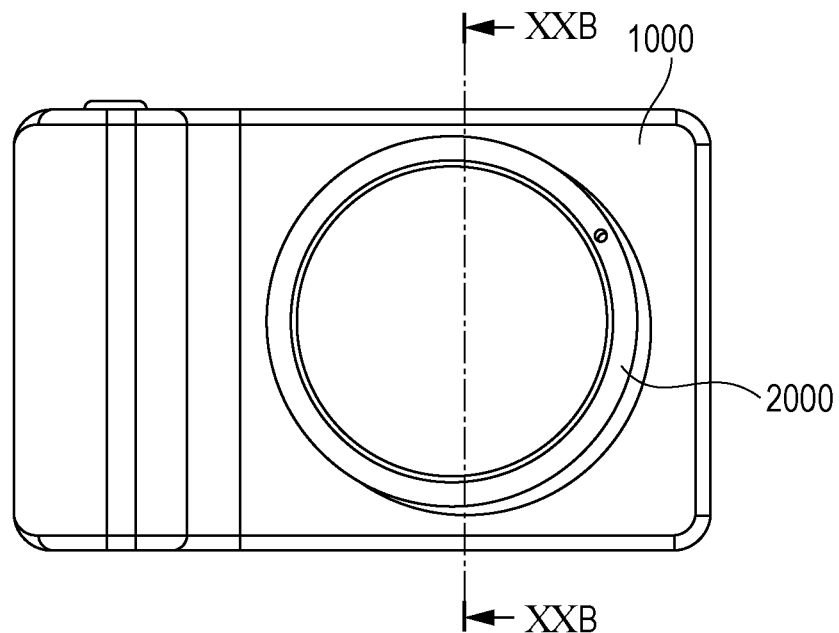
FIGS. 20A and 20B are diagrams exemplarily describing a mounting method of a predetermined imaging apparatus and a predetermined interchangeable lens assembly having claw portions and recesses that interfere with each other.
Figure 20B:
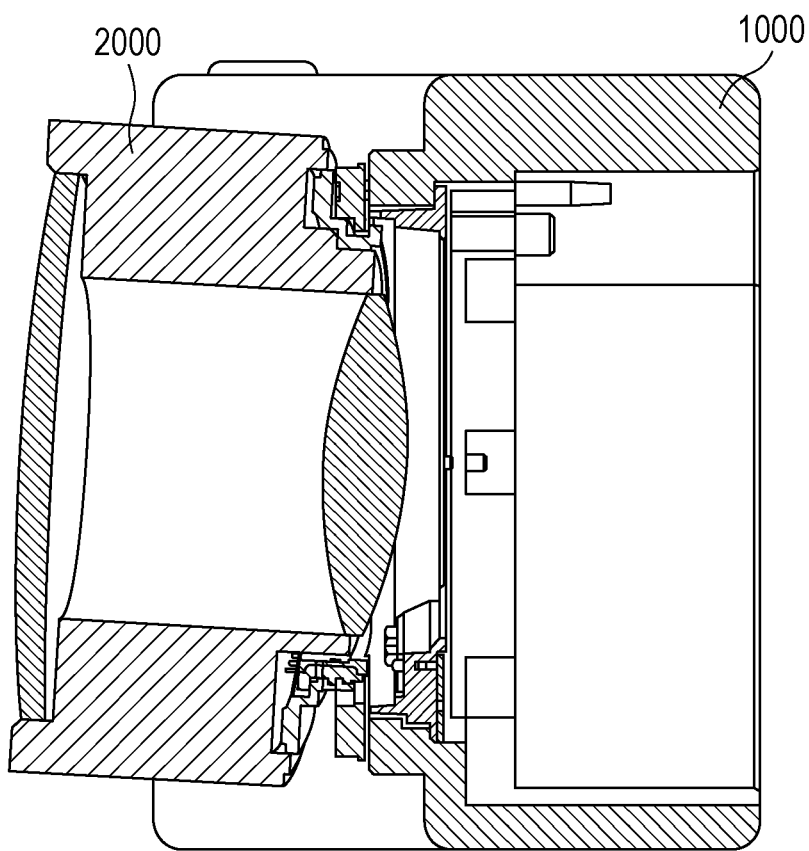

However, if only one claw portion and cutaway are interfering, there may be cases where claw portions of the camera mount side can be inserted into cutaways of the lens mount side. FIGS. 20A and 20B are diagrams exemplarily describing a mounting method of a predetermined imaging apparatus 1000 and a predetermined interchangeable lens assembly 2000 having claw portions and cutaways that interfere with each other. FIG. 20A is a diagram exemplarily describing a frontal view of partway through mounting a predetermined interchangeable lens assembly to a predetermined imaging apparatus that have claw portions and cutaways that interfere with each other. FIG. 20B is a cross-sectional view taken along cross-section XXB-XXB in FIG. 20A.

For example, in a state where the optical axis of the lens mount side is obliquely inclined as to the optical axis of the camera mount side, one end of a camera claw portion is inserted into a lens cutaway, and from this state, the lens mount and camera mount are rotated relatively to each other, as illustrated in FIGS. 20A and 20B. In this case, even if the camera claw portions and lens cutaways originally interfere with each other, this interference with each other is resolved during the relative rotation of the lens mount and camera mount, and transition can be made to a state where the camera claw portion is inserted into this lens cutaway. In this case, if there are no other camera claw portions and lens cutaways interfering, the interchangeable lens assembly can be mounted to the camera body.

Accordingly, the claw portions and cutaways on the lens mount 1101 side and camera mount 1401 side are disposed such that the angle of a predetermined lens cutaway adjacent to a reference lens claw portion is smaller than the angle of two camera claw portions adjacent to a reference camera cutaway. Specifically, in the present embodiment, the angles θA4 and θA5 of the first lens-side cutaway 1108a and second lens-side cutaway 1108b adjacent to the first lens-side claw portion 1107a are smaller than the angles θA1 and θA2 of the first camera claw portion 1401a and second camera claw portion 1401b adjacent to the first camera cutaway 1401d. That is to say, θA4 (52°) is smaller than θA1 (56°), and θA5 (44°) is smaller than θA2 (62°) (θA4<θA1, θA5<θA2). Accordingly, even if an attempt is made to insert the first lens-side claw portion 1107a into the first camera cutaway 1401d, the second lens-side claw portion 1107b interferes with the second camera claw portion 1401b in a sure manner, as well does the third lens-side claw portion 1107c with the first camera claw portion 1401a, as illustrated in FIGS. 21A and 21B.

Figure 21A:
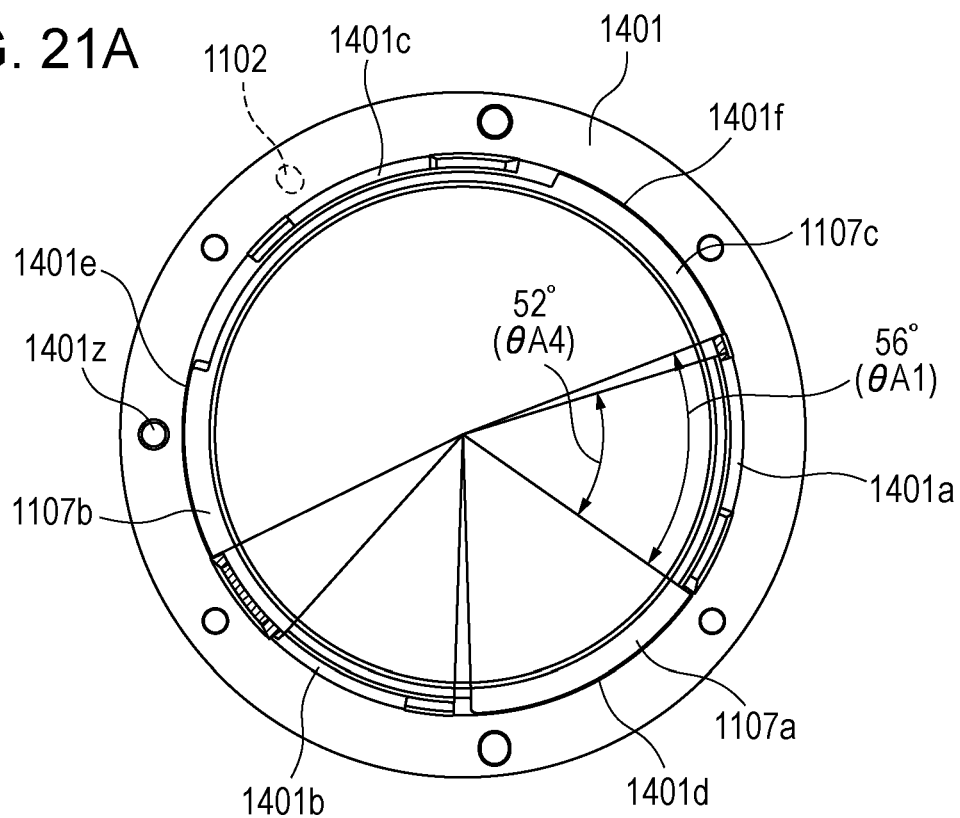
FIGS. 21A and 21B are diagrams exemplarily describing the way in which claw portions interfere with each other when attempting to mount the lens mount side to the camera mount side according to an embodiment of the present invention.
Figure 21B:
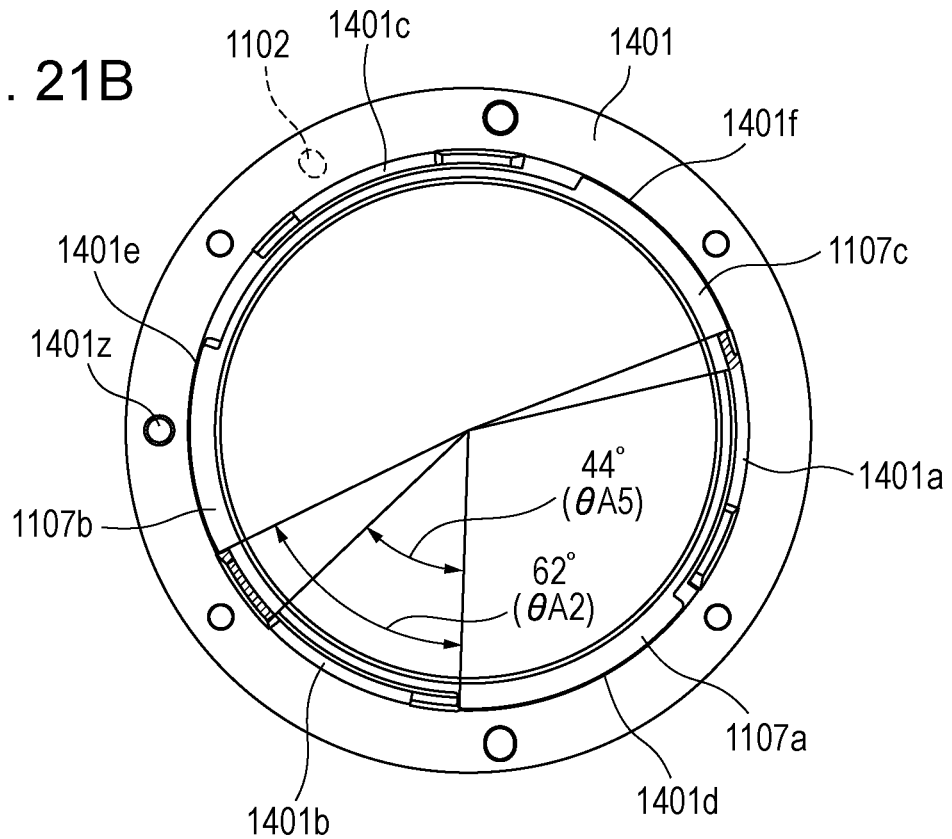

FIGS. 21A and 21B are diagrams exemplarily describing the way in which claw portions interfere with each other when attempting to mount the lens mount 101 side to the camera mount 1401 side according to the embodiment of the present invention. FIG. 21A illustrates the way in which the third lens-side claw portion 1107c and the first camera claw portion 1401a interfere, and FIG. 21B illustrates the way in which the second lens-side claw portion 1107b and the second camera claw portion 1401b interfere.

As described above, incompatible interchangeable lens assemblies and imaging apparatuses, and the mount portions of conversion adapters are configured so that two claw portions of each other out of the claw portions that an incompatible interchangeable lens assembly and imaging apparatus have interfere with each other in the present embodiment. According to this configuration, the risk of an incompatible interchangeable lens assembly being erroneously mounted to an imaging apparatus, or an incompatible interchangeable lens assembly and imaging apparatus being erroneously mounted to mount units provided to both ends of a conversion adapter, can be reduced.

However, even in a case where the above conditions are satisfied, there may be cases where, when attempting to insert three claw portions into incompatible cutaways, for example, two claw portions are inserted into cutaways depending on the angles of the claw portions and cutaways. Accordingly, the present embodiment further takes a configuration where the angles of at least two adjacent lens cutaways are smaller than the angles of all camera claw portions. Specifically, in the present embodiment, the angles θA4 and θA5 of the first lens-side cutaway 1108a and second lens-side cutaway 1108b in the circumferential direction are smaller than the angles θA1 through θA3 of the first through third camera claw portions 1401a through 1401c in the circumferential direction. That is to say, the relation between the claw portions and cutaways at the lens mount 1101 side and the camera mount 1401 side according to the present embodiment satisfy θA4<θA1, θA4<θA2, θA4<θA3, θA5<θA1, θA5<θA2, and θA5<θA3.

Figure 22A:
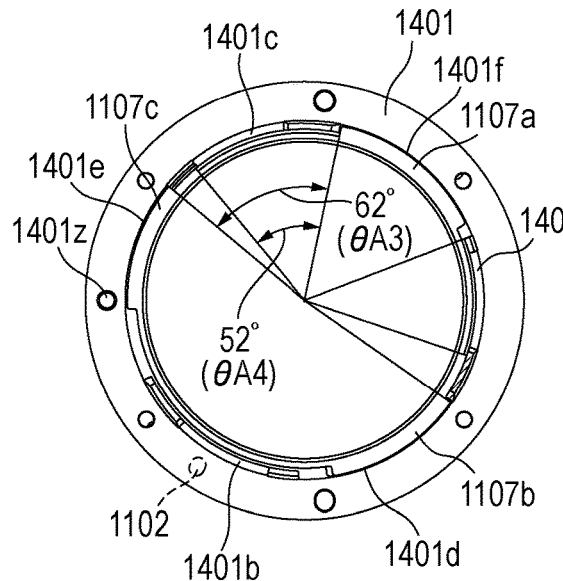
FIGS. 22A through 22D is a diagram exemplarily describing a case of attempting to insert incompatible claw portions into recesses at the lens mount side and camera mount side according to an embodiment of the present invention.
Figure 22C:
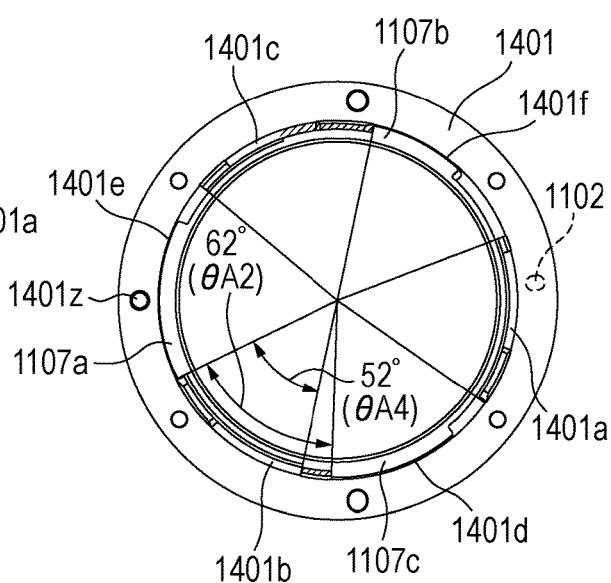
Figure 22B:
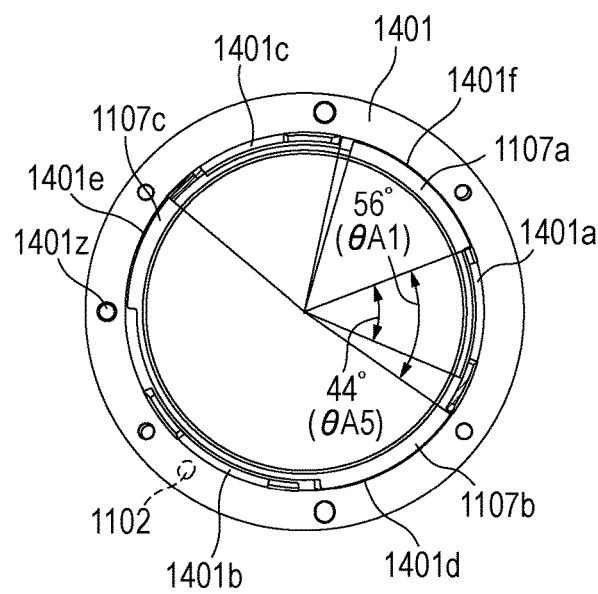
Figure 22D:
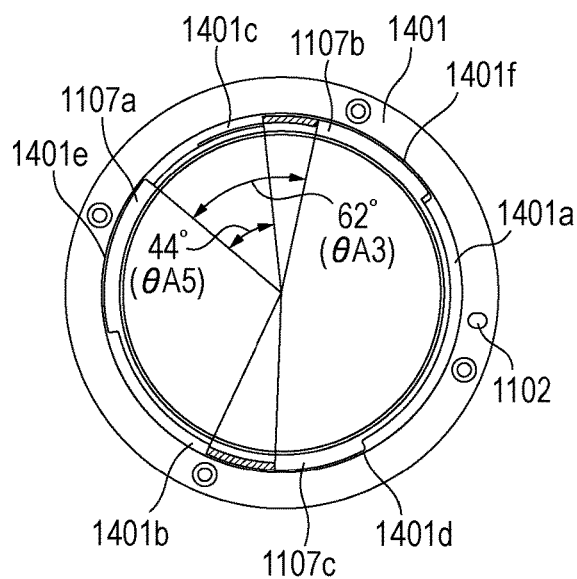

FIGS. 22A through 22D is a diagram exemplarily describing a case of attempting to insert incompatible claw portions into cutaways at the lens mount 1101 side and camera mount 1401 side according to the embodiment of the present invention. FIG. 22A illustrates the way in which the third lens-side claw portion 1107c and third camera claw portion 1401c interfere in a case of attempting to insert the first lens-side claw portion 1107a into the third camera cutaway 1401f. FIG. 22B illustrates the way in which second lens-side claw portion 1107b and first camera claw portion 1401a interfere in a case of attempting to insert the first lens-side claw portion 1107a into the third camera cutaway 1401f. FIG. 22C illustrates the way in which the third lens-side claw portion 1107c and second camera claw portion 1401b interfere in a case of attempting to insert the first lens-side claw portion 1107a into the second camera cutaway 1401e. FIG. 22D illustrates the way in which the second lens-side claw portion 1107b and third camera claw portion 1401c interfere in a case of attempting to insert the first lens-side claw portion 1107a into the second camera cutaway 1401e.

As illustrated in FIGS. 22A through 22D, the lens claw portions and camera claw portions interfere in at least two places in the present embodiment, regardless of the relative rotational angle of the lens mount 1101 and camera mount 1401. According to this configuration, erroneous mounting of an interchangeable lens assembly and conversion adapter having the lens mount 101(1101) to an imaging apparatus and conversion adapter having the camera mount 401(1401) can be prevented even more effectively.

Next, the angles (phases) at which bayonet claw portions are disposed on the circumferential direction of the camera mount and lens mount of the second conversion adapter 70 will be described with reference to FIGS. 22A through 27.

The second conversion adapter 70 is a mount adapter used for mounting the first lens 100 that has a short flange focal distance to the camera body 60 that has a long flange focal distance. The lens mount 1501 is provided at one end (third end) side of the second conversion adapter 70, and camera mount 1201 is provided at the other end (fourth end). Note that the camera mount 1201 of the second conversion adapter 70 has the same configuration as the camera mount 201 of the camera body 10 that is the first imaging apparatus described above. Also, the lens mount 1501 of the second conversion adapter 70 has the same configuration as the lens mount 501 of the second lens 50 described above.

Accordingly, it is preferable for the second conversion adapter 70 to be configured such that the camera body 10 that has a short flange focal distance cannot be directly mounted to the lens mount 1501, and the second lens 50 that has a long flange focal distance cannot be directly mounted to the camera mount 201. This configuration can be realized by satisfying the positional relation of claw portions and cutaways so that the lens mount 1501 provided to one end (third end) of the second conversion adapter 70 and the camera mount 1201 provided to the other end (fourth end) cannot each be directly mounted.

Figure 23A:
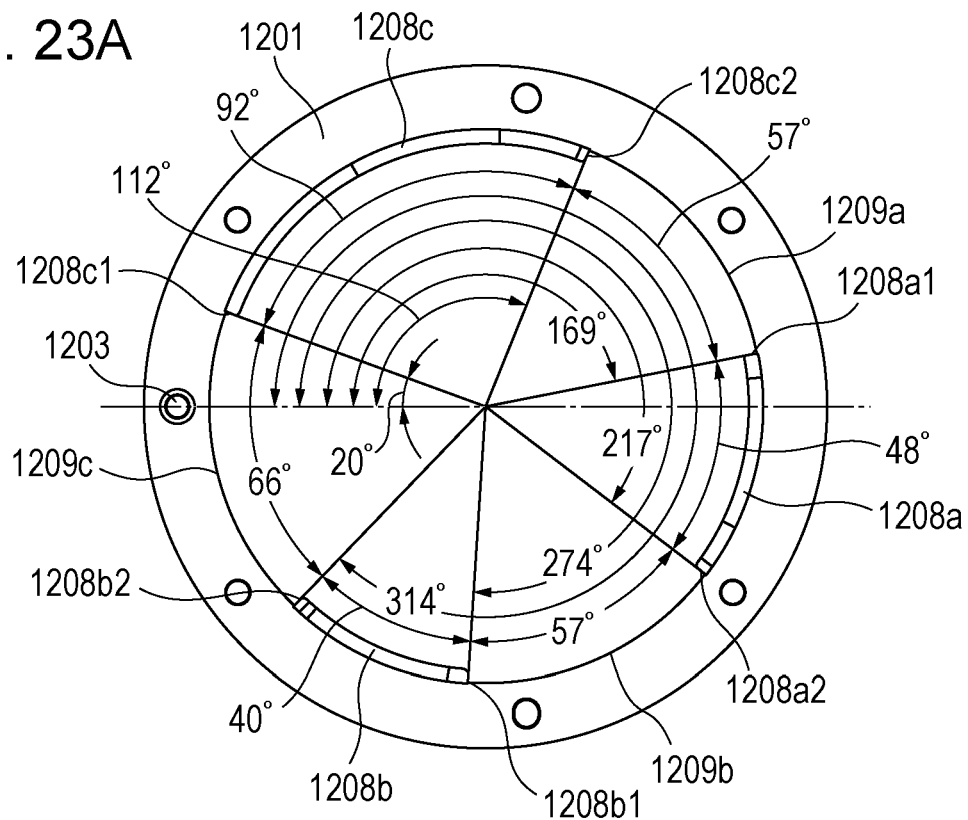
FIGS. 23A and 23B are diagrams exemplarily describing angle so disposing bayonet claw portions in the camera mount provided on one end of the second conversion adapter.
Figure 23B:
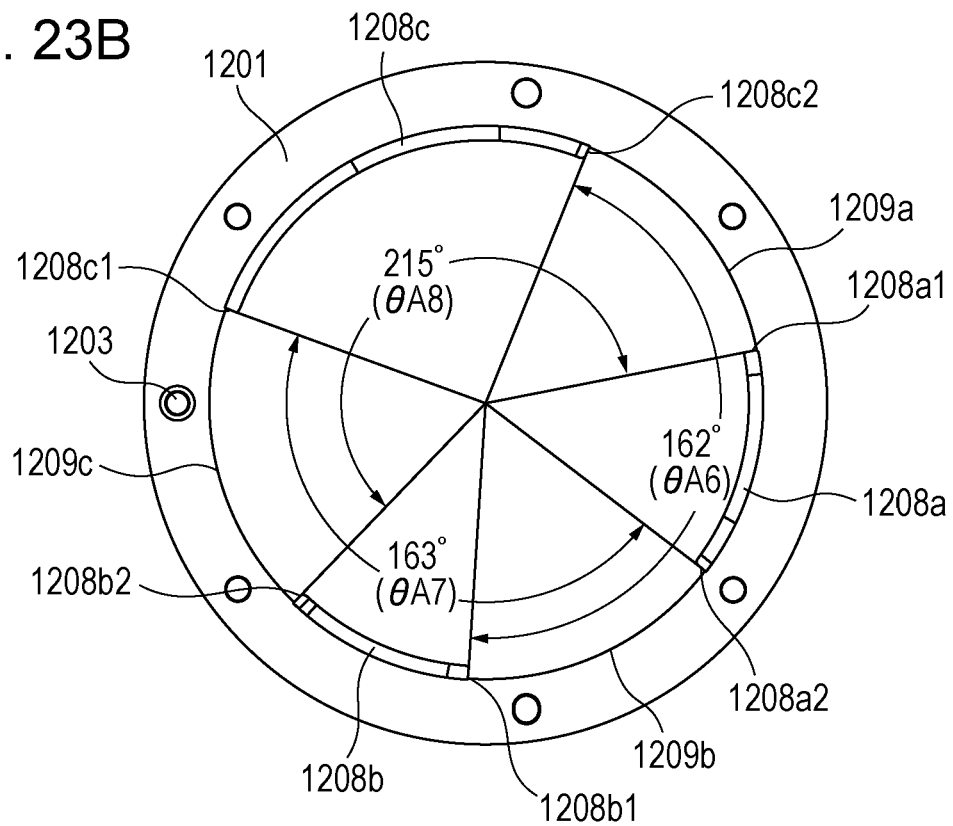

FIGS. 23A and 23B are diagrams exemplarily describing angles of disposing bayonet claw portions in the camera mount 1201 provided on one end of the second conversion adapter 70. FIG. 23A is a diagram illustrating angle ranges that camera claw portions and camera cutaways occupy in the circumferential direction of the camera mount 1201 with the lock pin 1203 as a reference, as viewed from the rear face side. FIG. 23B is a diagram illustrating angle ranges that, regarding multiple camera claw portions 1201a through 1201c, the claw portions occupy in the circumferential direction of the camera mount 1201, as viewed from the rear face side. Note that the angles of disposing the claw portions and cutaways on the camera mount 1201 of the second conversion adapter 70 are the same as the camera mount 201 of the camera body 10 described earlier, so description will be omitted.

As illustrated in FIG. 23B, the angle from the sixth end 1208c2 of the third camera-side claw portion 1208c to the third end 1208b1 of the second camera-side claw portion 1208b, in the circumferential direction of the camera mount 1201 including the first camera-side claw portion 1208a, is θA6 (162°). The angle from the second end 1201a2 of the first camera-side claw portion 1208a to the fifth end 1208c1 of the third camera-side claw portion 1208c, in the circumferential direction of the camera mount 1201 including the second camera-side claw portion 1208b, is θA7 (163°). The angle from the fourth end 1208b2 of the second camera-side claw portion 1208b to the first end 1208a1 of the first camera-side claw portion 1208a, in the circumferential direction of the camera mount 1201 including the third camera-side claw portion 1208c, is θA8 (215°).

Figure 24A:
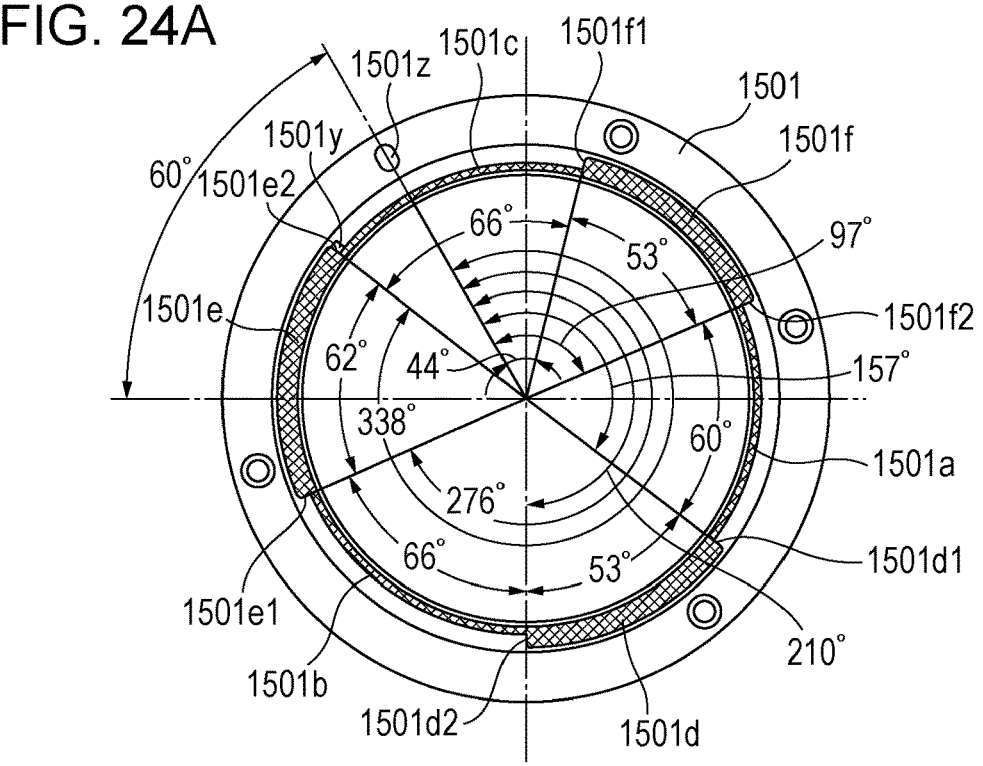
FIGS. 24A through 24C are diagrams exemplarily describing angle so disposing bayonet claw portions in a lens mount provided on the other end of the second conversion adapter.
Figure 24B:
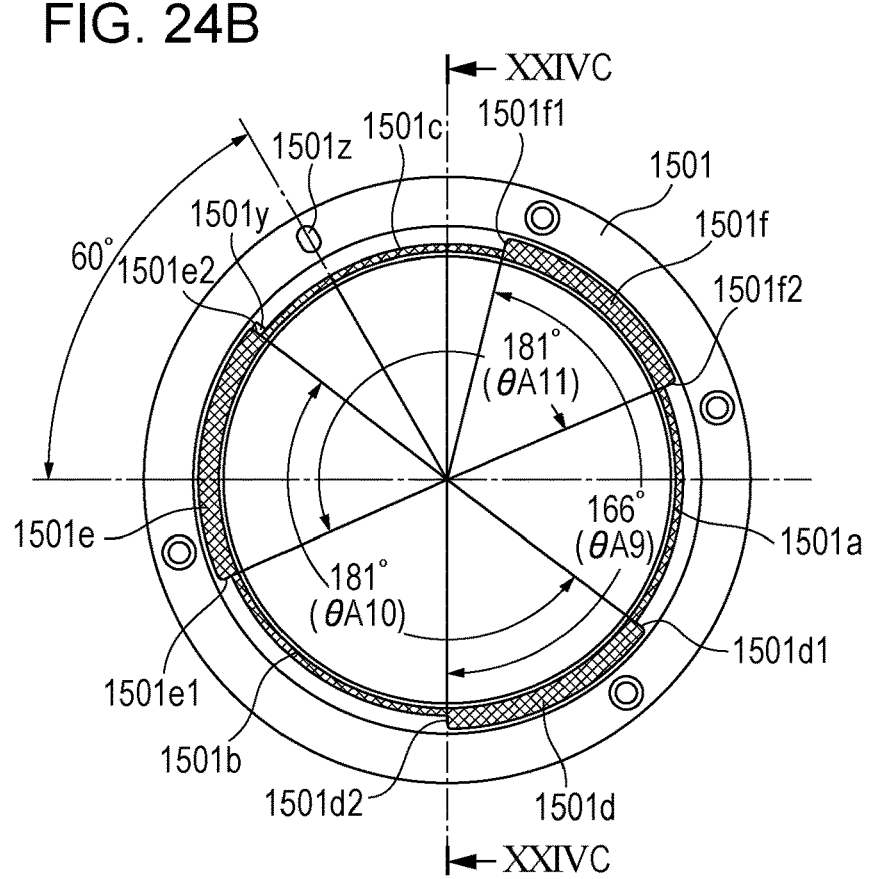
Figure 24C:
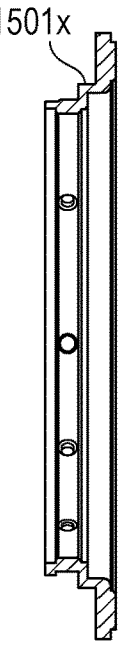

Next, FIGS. 24A through 24C are diagrams exemplarily describing angle so disposing bayonet claw portions in a lens mount 1501 provided on the other end of the second conversion adapter 70. FIG. 24A is a diagram illustrating angle ranges that lens claw portions and lens cutaways occupy in the circumferential direction of the lens mount 1501 with the lock pin 1501z as a reference, as viewed from the rear face side. FIG. 24B is a diagram illustrating angle ranges where cutaways are provided regarding the multiple lens cutaways 1501a through 1501c in the circumferential direction of the lens mount 1501, as viewed from the rear face side. FIG. 24C is a cross-sectional diagram taken along cross-section XXIVC-XXIVC in FIG. 24B.

A first lens claw portion 1501d, second lens claw portion 1501e, and third lens claw portion 1501f, are provided in order, to the camera mount 1501 in the circumferential direction (inner radial direction). Note that in a case of viewing the lens mount 1501 from the rear face side as illustrated in FIG. 24A, the lens claw portion that is provided at a position farthest from the lock groove 1501z is the first lens claw portion 1501d. The second lens claw portion 501e and third lens claw portion 1501f are then consecutively provided in order from the first lens claw portion 1501d in a clockwise direction.

Also, cutaways which are a first lens cutaway 1501a, second lens cutaway 1501b, and third lens cutaway 1501c are provided in order, to the lens mount 1501 in the circumferential direction (inner radial direction). Note that in a case of viewing the lens mount 1501 from the rear face side as illustrated in FIG. 24A, the cutaway that is provided at a position nearest to the lock groove 1501z is the third lens cutaway 1501c. The first lens cutaway 1501a and second lens cutaway 1501b are then consecutively provided in order from the third lens cutaway 1501c in a clockwise direction.

Note that the end portions of the lens claw portions 1501d, 1501e, and 1501f, in the circumferential direction, will be referred to as first end portion 1501d1, second end portion 1501d2, third end portion 1501e1, fourth end portion 1501e2, fifth end portion 1501f1, and sixth end portion 1501f2, for the sake of description. The end portions are denoted with part numerals in order from the first lens claw portion 1501d in the clockwise direction, when viewing the lens mount 1501 from the rear face side, as described above.

As illustrated in FIG. 24A, the angles that the lens claw portions and lens cutaways occupy in the circumferential direction of the lens mount 1501 (angle ranges) are stipulated as follows. The angle of the first lens claw portion 1501d is 53°, the angle of the second lens claw portion 1501e is 62°, and the angle of the third lens claw portion 1501f is 53°. That is to say, the angles of the lens claw portions on the lens mount 1501 side are the same as the angles of the lens claw portions on the lens mount 1101 side described earlier.

On the other hand, the angles of the lens cutaways at the lens mount 1501 side differ from the angles of the lens cutaways at the lens mount 1101 side described above. Specifically, the angle of the first lens cutaway 1501a is 60°, the angle of the second lens cutaway 1501b is 66°, and the angle of the third lens cutaway 1501c is 66°.

Also, when viewing the lens claw portions from the rear face side of the camera body 10, the angles in the clockwise direction where the lens claw portions are disposed on the circumferential direction of the lens mount 1501 with the position of the lock groove 1501z (referred to as reference position) as a reference are stipulated as follows. The first lens claw portion 1501d is disposed between 157° to 210° with the reference position as a start point. The second lens claw portion 1501e is disposed between 276° to 338° with the reference position as a start point. The third lens claw portion 1501f is disposed between 44° to 97° with the reference position as a start point.

As illustrated in FIG. 24C, a fitting member 1501x that restricts movement of the imaging apparatus in a direction parallel to the optical axis when mounted to the imaging apparatus is provided to the lens mount 1501 side. In the present embodiment, the diameter of the fitting member 1501x in a direction orthogonal to the optical axis at the camera mount 1501 side is the mount diameter. The mount diameters of the camera mounts and lens mounts described above are generally the same length.

As illustrated in FIG. 24B, the angle from the fifth end 1501f1 of the third lens claw portion 1501f to the second end 1501d2 of the second lens claw portion 1501d, in the circumferential direction of the lens mount 501 including the first lens cutaway 1501a, is θA9 (166°). The angle from the first end 1501d1 of the first lens claw portion 1501d to the fourth end 1501e2 of the second lens claw portion 501e, in the circumferential direction of the lens mount 1501 including the second lens cutaway 1501b, is θA10 (181°). The angle from the third end 1501e1 of the second lens claw portion 1501e to the sixth end 1501f/2 of the third lens claw portion 1501f, in the circumferential direction of the lens mount 1501 including the third lens cutaway 1501c, is θA11 (181°).

The angles of the claw portions and cutaways in the circumferential direction will be compared between the camera mount 1201 and lens mount 1501 provided to the second conversion adapter 70. For example, the angle (92°) of the third camera claw portion at the camera mount 1201 side is larger than the angles (66°) of the second and third lens cutaways 1501b and 1501c that are the largest angle of the lens cutaways at the lens mount 1501 side. That is to say, the angle of at least one camera claw portion at the camera mount 1201 side is larger than the angle of the lens cutaway having the largest angle at the lens mount 1501 side.

In this case, of the claw portions at the camera mount 1201 side and cutaways at the lens mount 1501 side, at least one or more camera claw portion and lens cutaway interfere with each other. Accordingly, even if an attempt is made to mount the interchangeable lens assembly to the camera body so that the optical axis at the camera mount 1201 side and lens mount 1501 side are generally parallel to each other, the claw portions and cutaways interfere, so the interchangeable lens assembly cannot be mounted to the camera body.

However, if only one claw portion and cutaway are interfering, there may be cases where claw portions of the camera mount side can be inserted into cutaways of the lens mount side, in the same way as the description of the first conversion adapter made above. For example, there are cases where, in a state where the optical axis of the lens mount side is obliquely inclined as to the optical axis of the camera mount side, one end of a camera claw portion is inserted into a lens cutaway, and the lens mount and camera mount are rotated relative to each other, and the interchangeable lens assembly can be mounted to the camera body.

Figure 25A:
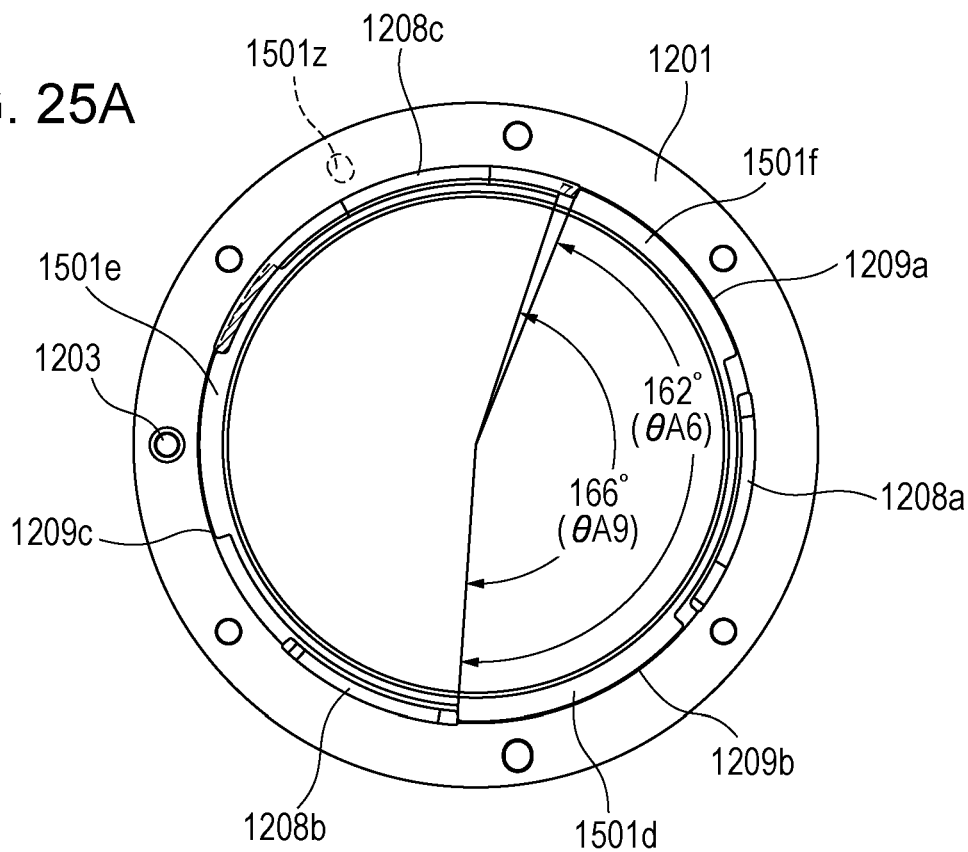
FIGS. 25A and 25B are diagrams exemplarily describing the way in which claw portions interfere with each other, when attempting to mount a reference claw at the lens mount side to a reference recess at the camera mount side according to an embodiment of the present invention.
Figure 25B:
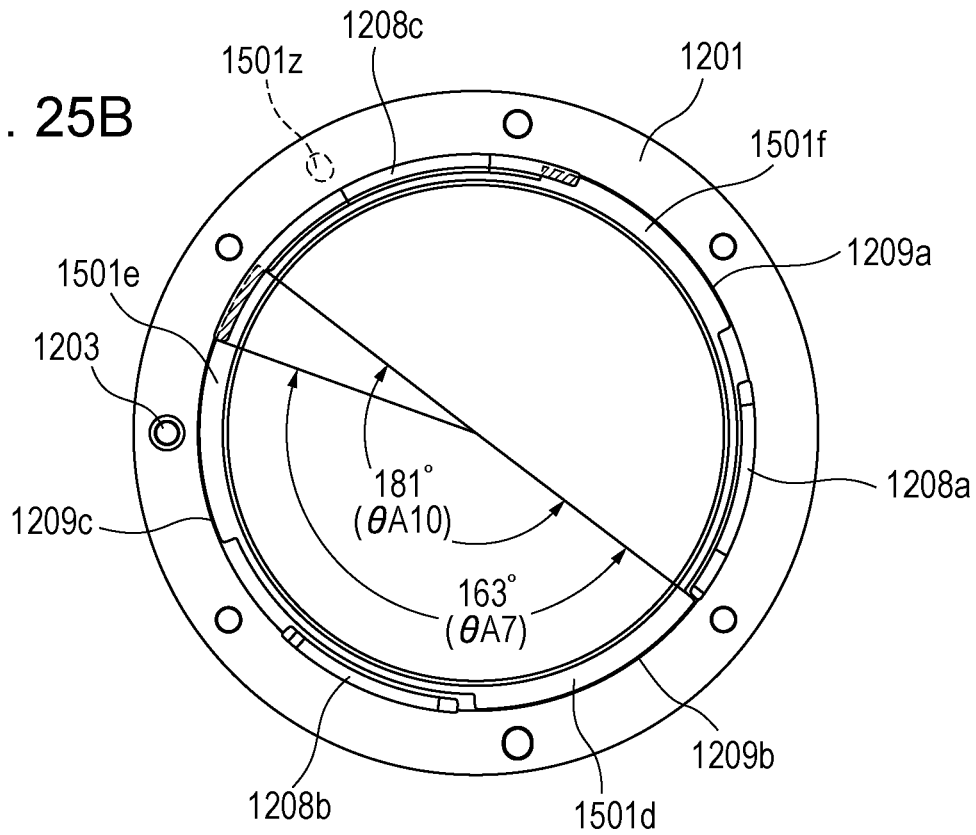

Accordingly, in the present embodiment, the claw portions and cutaways at the camera mount 1201 side and the lens mount 1501 side are disposed so as to satisfy θA6<θA9 and θA7<θA10 in the circumferential direction. FIGS. 25A and 25B are diagrams exemplarily describing the way in which claw portions interfere with each other, when attempting to mount a reference claw portion at the lens mount 1501 side to a reference cutaway at the camera mount 1201 side according to the embodiment of the present invention. FIG. 25A illustrates the way in which the third lens claw portion 1501f and the third camera-side claw portion 1208c interfere, and FIG. 25B illustrates the way in which the second lens claw portion 1501e and the third camera-side claw portion 1208c interfere.

As illustrated in FIGS. 25A and 25B, in a case where the reference first lens claw portion 501d is attempted to be inserted into the reference camera cutaway 1201d, for example, the third camera-side claw portion 1208c interferes with the second and third lens claw portions 1501e and 1501f.

That is to say, as viewed from the rear face side, the total sum of the angles of one reference lens claw portion, another lens claw portion adjacent thereto in the clockwise direction, and a lens cutaway situated between these lens claw portions, is taken as a first angle. Also, as viewed from the rear face side, the total sum of the angles of one reference camera cutaway, another camera cutaway adjacent thereto in the clockwise direction, and a camera claw portion situated therebetween, is taken as a second angle. Also, as viewed from the rear face side, the total sum of the angles of one reference lens claw portion, another lens claw portion adjacent thereto in the counterclockwise direction, and a lens cutaway situated between these lens claw portions, is taken as a first angle. Also, as viewed from the rear face side, the total sum of the angles of one reference camera cutaway, another camera cutaway adjacent thereto in the counterclockwise direction, and a camera claw portion situated therebetween, is taken as a fourth angle. According to the present embodiment, it is sufficient to layout the claw portions and cutaways at the camera mount 1201 side and lens mount 1501 side such that the first angle described above is larger than the second angle, and the third angle is larger than the fourth angle.

According to this configuration, at least two lens claw portions and one camera claw portion interfere with each other. Thus, the risk of an incompatible interchangeable lens assembly being erroneously mounted to an imaging apparatus, or an incompatible interchangeable lens assembly and imaging apparatus being erroneously mounted to mount units provided to both ends of a conversion adapter, can be reduced.

However, even in a case where the above conditions are satisfied, there may be cases where, when attempting to insert three claw portions into incompatible cutaways, for example, two claw portions are inserted into cutaways depending on the angles of the claw portions and cutaways. Accordingly, the claw portions and cutaways at the camera mount 1201 side and lens mount 1501 side are disposed in the circumferential direction so as to satisfy θA6<θA9, θA6<θA10, θA6<θA11, θA7<θA9, θA7<θA10, and θA7<θA11. That is to say, as viewed from the rear face side, the total sum of the angles of two claw portions other than the reference claw portion described above, and a lens cutaway situated therebetween, is taken as a fifth angle. According to the present embodiment, it is sufficient to layout the claw portions and cutaways at the camera mount 1201 side and lens mount 1501 side such that the second angle and fourth angle described above are smaller than any of the first angle, third angle, and fifth angle.

Figure 26A:
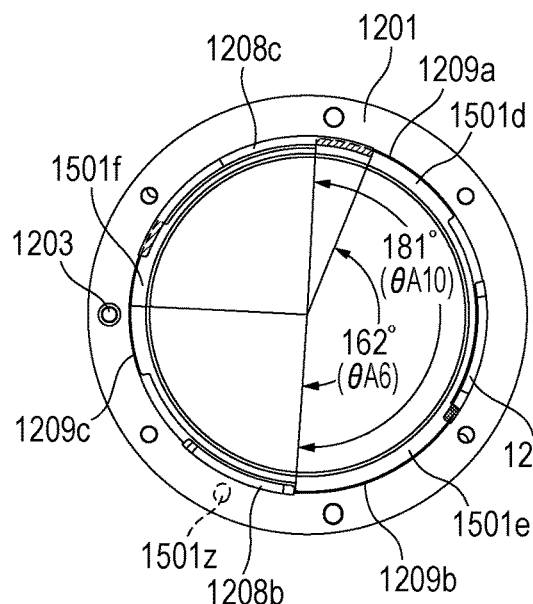
FIGS. 26A through 26D are diagrams exemplarily describing the way in which claw portions interfere with each other, when attempting to mount a claw other than the reference claw at the lens mount side to a reference recess at the camera mount side according to an embodiment of the present invention.
Figure 26B:
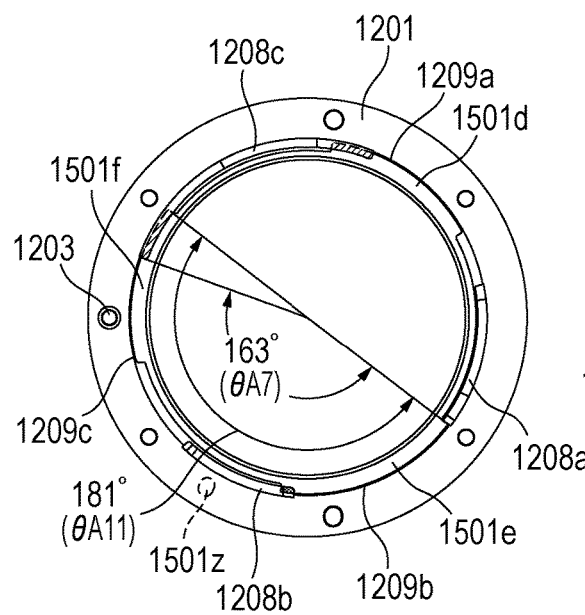
Figure 26C:
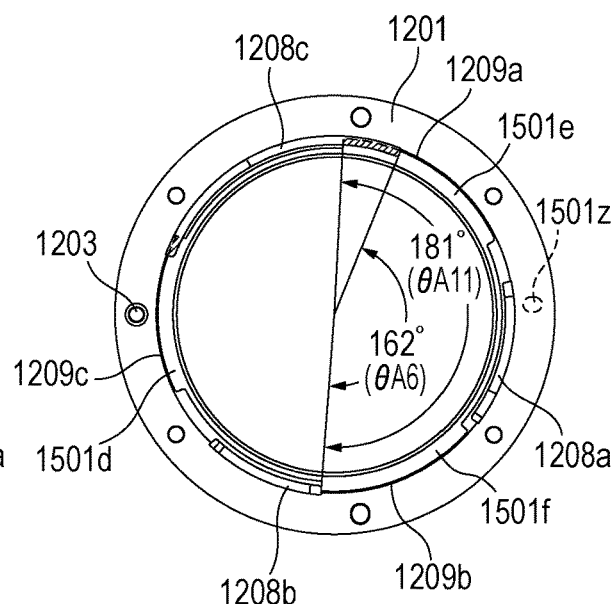
Figure 26D:
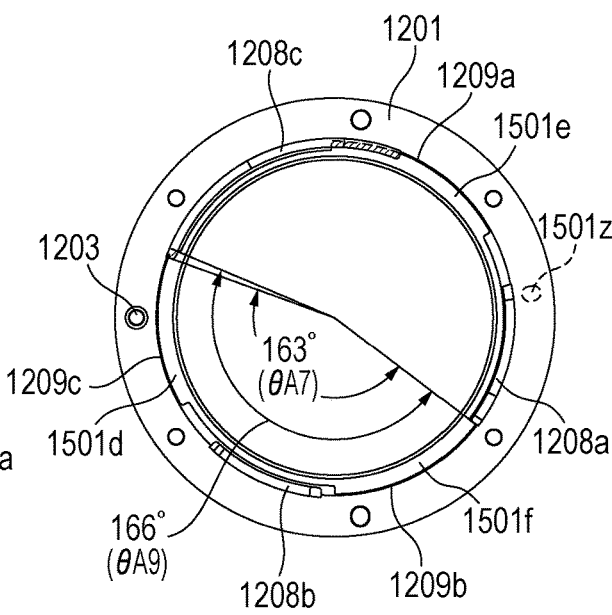

FIGS. 26A through 25D are diagrams exemplarily describing the way in which claw portions interfere with each other, when attempting to mount a claw portion other than the reference claw portion at the lens mount 1501 side to a reference cutaway at the camera mount 1201 side according to the embodiment of the present invention. FIG. 26A illustrates the way in which the first lens claw portion 1501d and the third camera-side claw portion 1208c interfere in a case of attempting to insert the second lens claw portion 1501e into the second camera-side cutaway 1209b. FIG. 26B illustrates the way in which the third lens claw portion 1501c and the third camera-side claw portion 1208c interfere in a case of attempting to insert the second lens claw portion 1501e into the second camera-side cutaway 1209b. FIG. 26C illustrates the way in which the second lens claw portion 1501e and the third camera-side claw portion 1208c interfere in a case of attempting to insert the third lens claw portion 1501f into the second camera-side cutaway 1209b. FIG. 26D illustrates the way in which the first lens claw portion 1501d and the third camera-side claw portion 1208c interfere in a case of attempting to insert the third lens claw portion 1501f into the second camera-side cutaway 1209b.

As illustrated in FIGS. 26A through 26D, at least two lens claw portions and one camera claw portion interfere, regardless of the relative rotation angle of the lens mount 501 and camera mount 1201 according to the present embodiment.

According to this configuration, erroneous mounting of an interchangeable lens assembly and conversion adapter having the lens mount 501 (1501) to an imaging apparatus and conversion adapter having the camera mount 201 (1201) can be prevented even more effectively.

Figure 27:
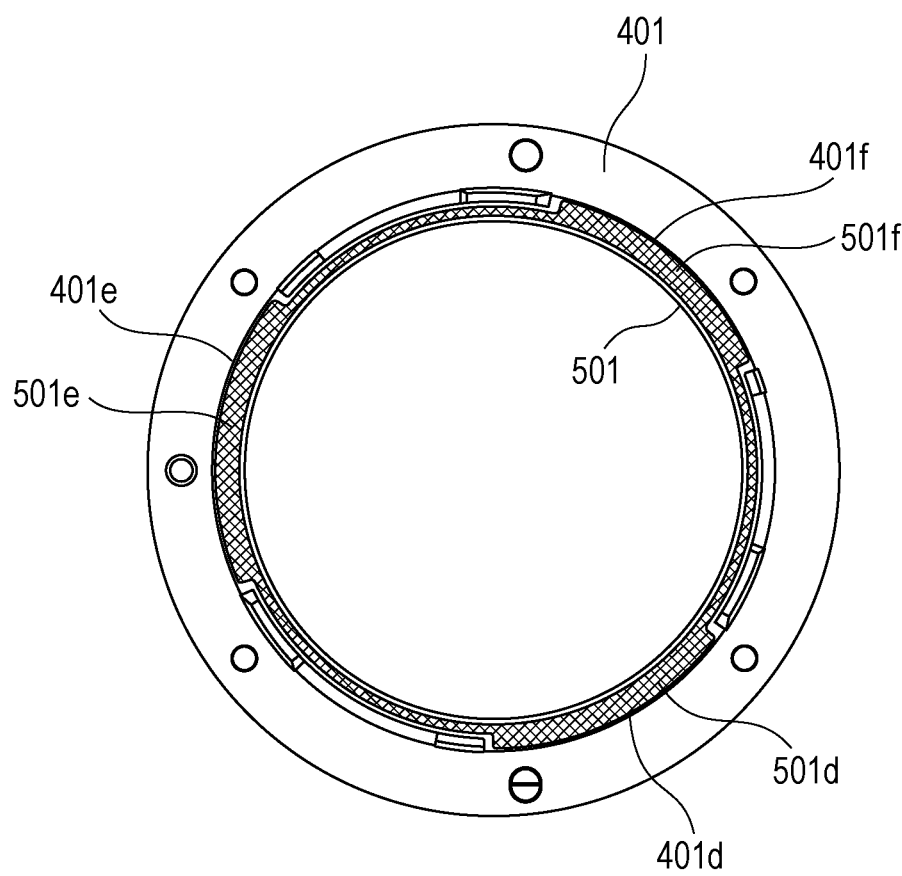
FIG. 27 is a diagram exemplarily describing a state in which claw portions provided to the camera mount side and lens mount side according to an embodiment of the present invention are engaged.

FIG. 27 is a diagram exemplarily describing a state in which claw portions provided to the camera mount 1401 side and lens mount 1501 side according to the embodiment of the present invention are engaged. The first lens claw portion 1501d can be inserted into the first camera cutaway 1401d, as illustrated in FIG. 27. Also, the second lens claw portion 1501e can be inserted into the second camera cutaway 1401e. Further, the third lens claw portion 1501f can be inserted into the third camera cutaway 1401f. That is to say, the camera mount 1401 side and the lens mount 1501 side are a combination compatible with being directly mounted to each other. Note that the camera mount 201 side and the lens mount 101 side are a combination compatible to being directly mounted to each other, as illustrated in FIG. 15A.

As described above, the camera mount 1401 corresponding to an imaging apparatus that has a long flange focal distance (e.g., the camera body 60), and the lens mount 501 corresponding to an interchangeable lens assembly that has a long flange focal distance (e.g., the second lens 50) can be directly mounted to each other. However, the camera mount 201 corresponding to an imaging apparatus having a short flange focal distance (e.g., the camera body 10) and the lens mount 501 corresponding to an interchangeable lens assembly that has a long flange focal distance (e.g., the second lens 50) cannot be directly mounted to each other. Also, the camera mount 201 corresponding to an imaging apparatus that has a short flange focal distance (e.g., the camera body 10) and the lens mount 101 corresponding to an interchangeable lens assembly that has a short flange focal distance (e.g., the first lens 100) can be directly mounted to each other. However, the camera mount 1401 corresponding to an imaging apparatus that has a long flange focal distance (e.g., the camera body 60) and the lens mount 101 corresponding to an interchangeable lens assembly that has a short flange focal distance (e.g., the first lens 100) cannot be directly mounted to each other.

Accordingly, an imaging apparatus and camera accessory employing the configuration of the above-described embodiment can prevent erroneous mounting of an imaging apparatus and camera accessory that have generally the same mount diameter but are not mutually compatible.

While the present invention has been described with reference to exemplary embodiments, it is to be understood that the invention is not limited to the disclosed exemplary embodiments.

What is claimed is:

1. A lens mount configured to be detachably mountable to a camera mount that includes a restricting portion and a plurality of first bayonet claw portions, the lens mount comprising:
   a plurality of second bayonet claw portions configured to allow engagement with the plurality of first bayonet claw portions; and
   a restricted portion configured to be restricted by the restricting portion when the lens mount is mounted to the camera mount,
   wherein, the plurality of second bayonet claw portions includes first and second claw portions adjacent to the restricted portion in a circumferential direction,
   wherein the plurality of first bayonet claw portions includes third and fourth claw portions adjacent to the restricting portion in the circumferential direction, and fifth claw portion disposed on opposite side of the restricting portion with respect to the third and fourth claw portions in the circumferential direction, wherein, when the lens mount is mounted to the camera mount, the first claw portion engages with the third claw portion after being inserted between the third and fifth claw portions in the circumferential direction, and the second claw portion engages with the fourth claw portion after being inserted between the third and fourth claw portions in the circumferential direction, wherein, when viewed in a central axis direction of the lens mount, a first reference line is a line passing through a center of the restricted portion and a central axis of the lens mount, a first line is a line passing through the central axis and an end of the first claw portion that is closer to the restricted portion, and a second line is a line passing through the central axis and an end of the second claw portion that is closer to the restricted portion, wherein the restricted portion is positioned at a region between the first line and the second line, and wherein $$90° < \theta_1 + \theta_2 < 180°$$

is satisfied, where $\theta_1$ is an angle formed between the first reference line and the first line, and $\theta_2$ is an angle formed between the first reference line and the second line.

2. The lens mount according to claim 1, wherein $$90° < \theta_1 + \theta_2 < 120°$$

is satisfied.

3. The lens mount according to claim 2, wherein $$90° < \theta_1 + \theta_2 < 100°$$

is satisfied.

4. The lens mount according to claim 1, wherein $$40° < \theta_1 < 70°, \text{ and}$$

$$40° < \theta_2 < 70°$$

are satisfied.

5. The lens mount according to claim 4, wherein $$40° < \theta_1 < 60°, \text{ and}$$

$$40° < \theta_2 < 60°$$

are satisfied.

6. The lens mount according to claim 1, wherein $$1.00 \leq \theta_1/\theta_2 \leq 1.40$$

is satisfied.

7. The lens mount according to claim 6, wherein $$1.00 \leq \theta_1/\theta_2 \leq 1.35$$

is satisfied.

8. The lens mount according to claim 1, wherein, when viewed in the central axis direction, the first and second claw portions both overlap a boundary line that is orthogonal to the first reference line and passes through the central axis.

9. The lens mount according to claim 1, wherein, when the lens mount is in a normal position, the second claw portion is positioned on a gravity direction side with respect to the first claw portion.

10. The lens mount according to claim 1, wherein a dimension of the second claw portion in the circumferential direction is larger than a dimension of the first claw portion in the circumferential direction.

11. The lens mount according to claim 1, wherein a dimension of a cutaway between the third and fourth claw portions in the circumferential direction is larger than a dimension of a cutaway between the third and fifth claw portions in the circumferential direction.

12. The lens mount according to claim 11, wherein a dimension of a cutaway between the third and fourth claw portions in the circumferential direction is larger than a dimension of a cutaway between the fourth and fifth claw portions in the circumferential direction.

13. The lens mount according to claim 1, wherein, when viewed in the central axis direction in a state of the lens mount and the camera mount contacting each other, a second reference line is a line passing through the central axis and a center of the restricting portion, $\theta_7$ is a minimum value of an angle formed between a line passing through the central axis and a point that is, in a region where the first and third claw portions overlap each other, nearest to the restricting portion, and the second reference line, $\theta_8$ is a minimum value of an angle formed between a line passing through the central axis and a point that is, in a region where the second and fourth claw portions overlap each other, nearest to the restricting portion, and the second reference line, $$0.75 \leq \theta_7/\theta_8 \leq 1.25$$

is satisfied.

14. The lens mount according to claim 13, wherein $$0.80 \leq \theta_7/\theta_8 \leq 1.20$$

is satisfied.

15. The lens mount according to claim 1, wherein, when viewed in the central axis direction in a state of the lens mount and the camera mount contacting each other, a second reference line is a line passing through the central axis and a center of the restricting portion, $\theta_5$ is an angle formed between a line passing through the central axis and a point that is, in a region where the first and third claw portions overlap each other, nearest to the restricting portion, and the second reference line, $\theta_6$ is an angle formed between a line passing through the central axis and a point that is, in a region where the second and fourth claw portions overlap each other, nearest to the restricting portion, and the second reference line, $\theta_7$ is a minimum value of $\theta_5$, and $\theta_8$ is a minimum value of $\theta_6$, a maximum value of $\theta_5$ is $\theta_9$, $$90° < \theta_7 + \theta_8 < 180°, \text{ and}$$

$$90° < \theta_9 + \theta_8 < 180°$$

are satisfied.

16. The lens mount according to claim 15, wherein $$90° < \theta_7 + \theta_8 < 110°, \text{ and}$$

$$140° < \theta_9 + \theta_8 < 170°$$

are satisfied.

17. The lens mount according to claim 1, wherein, when viewed in the central axis direction in a state of the lens mount and the camera mount contacting each other, a second reference line is a line passing through the central axis and a center of the restricting portion, θ7 is a minimum value of an angle formed between a line passing through the central axis and a point that is, in a region where the first and third claw portions overlap each other, nearest to the restricting portion, and the second reference line, θ8 is a minimum value of an angle formed between a line passing through the central axis and a point that is, in a region where the second and fourth claw portions overlap each other, nearest to the restricting portion, and the second reference line, $45° \leq \theta 7$, and $45° \leq \theta 8$ are satisfied.

18. The lens mount according to claim 1, wherein the plurality of second bayonet claw portions includes sixth claw portion disposed on opposite side of the restricted portion with respect to the first and second claw portions in the circumferential direction.

19. The lens mount according to claim 18, wherein a dimension of the second claw portion in the circumferential direction is larger than a dimension of the sixth claw portion in the circumferential direction.

20. The lens mount according to claim 18, wherein, when viewed in the central axis direction, the fifth and sixth claw portions overlap each other.

21. The lens mount according to claim 18, wherein $0.6 \leq \theta 3/\theta 4 \leq 0.9$ is satisfied, where θ3 is an angle formed between the first reference line and a line passing through the central axis and an end of the sixth claw portion that is on the side of the first claw portion, and θ4 is an angle formed between the first reference line and a line passing through the central axis and an end of the sixth claw portion that is on the side of the second claw portion.

22. The lens mount according to claim 21, wherein $0.6 \leq \theta 3/\theta 4 \leq 0.8$ is satisfied.

23. The lens mount according to claim 18, wherein a dimension of a cutaway between the first and second claw portions in the circumferential direction is larger than both of a dimension of a cutaway between the first and sixth claw portions and a dimension of a cutaway between the second and sixth claw portions in the circumferential direction.

24. The lens mount according to claim 18, wherein, when the lens mount mounted to the camera mount is viewed in the central axis direction, among sides of a hexagon passing through both ends of a region where the first and third claw portions overlap each other, both ends of a region where the second and fourth claw portions overlap each other, and both ends of a region where the fifth and sixth claw portions overlap each other, the side nearest to the restricting portion is the longest.

25. The lens mount according to claim 18, wherein $75° \leq \theta 10 \leq 105°$, $75° \leq \theta 20 \leq 105°$, $75° \leq \theta 30 \leq 105°$, and $75° \leq \theta L \leq 105°$ are satisfied, where, among internal angles of a quadrangle formed by connecting a center of the sixth claw portion, a center of the second claw portion, a center of the first claw portion, and the center of the restricted portion, θ10 is an internal angle in which a vertex thereof is the center of the sixth claw portion, θ20 is an internal angle in which a vertex thereof is the center of the second claw portion, θ30 is an internal angle in which a vertex thereof is the center of the first claw portion, and θL is an internal angle in which a vertex thereof is the center of the restricted portion.

26. The lens mount according to claim 18, wherein, when the lens mount is mounted to the camera mount, the sixth claw portion engages with the fifth claw portion after being inserted between the fourth and fifth claw portions in the circumferential direction.

27. The lens mount according to claim 26, wherein $60° \leq \theta 10 \leq 100°$, $60° \leq \theta 20 \leq 100°$, $60° \leq \theta 30 \leq 100°$, and $60° \leq \theta L \leq 100°$ are satisfied, where, among internal angles of a quadrangle formed by connecting a center of the sixth claw portion, a center of the second claw portion, a center of the first claw portion, and the center of the restricted portion, θ10 is an internal angle in which a vertex thereof is the center of the sixth claw portion, θ20 is an internal angle in which a vertex thereof is the center of the second claw portion, θ30 is an internal angle in which a vertex thereof is the center of the first claw portion, and θL is an internal angle in which a vertex thereof is the center of the restricted portion.

28. The lens mount according to claim 27, wherein $65° \leq \theta 10 \leq 100°$, $65° \leq \theta 20 \leq 100°$, $65° \leq \theta 30 \leq 100°$, and $65° \leq \theta L \leq 100°$ are satisfied.

29. The lens mount according to claim 28, wherein $70° \leq \theta 10 \leq 100°$, $70° \leq \theta 20 \leq 100°$, $70° \leq \theta 30 \leq 100°$, and $70° \leq \theta L \leq 100°$ are satisfied.

30. The lens mount according to claim 26, wherein at least one among θ10, θ20, θ30, and θL is in a range of 85 to 95, inclusive.

31. The lens mount according to claim 26, wherein $85° \leq \theta L \leq 95°$ is satisfied.

32. The lens mount according to claim 31, wherein $90° \leq \theta L \leq 95°$ is satisfied.

33. The lens mount according to claim 18, wherein $0.75 \leq \theta 30/\theta 20 \leq 1.25$ is satisfied, where, among internal angles of a quadrangle formed by connecting a center of the sixth claw portion, a center of the second claw portion, a center of the first claw portion, and the center of the restricted portion, θ20 is an internal angle in which a vertex thereof is the center of the second claw portion, and θ30 is an internal angle in which a vertex thereof is the center of the first claw portion.

34. The lens mount according to claim 33, wherein $0.85 \leq \theta 30/\theta 20 \leq 1.15$ is satisfied.

35. The lens mount according to claim 34, wherein $0.95 \leq \theta 30/\theta 20 \leq 1.05$ is satisfied.

36. An accessory comprising:
    the lens mount according to claim 1; and
    a lens.

37. An accessory comprising the lens mount according to claim 1,
    wherein the accessory is configured to be detachably mountable to a lens apparatus.

38. A camera mount comprising:
    a plurality of first bayonet claw portions; and
    a restricting portion,
    wherein the camera mount is configured to be detachably mountable to the lens mount according to claim 1.

39. An image pickup apparatus comprising:
    a camera mount having a plurality of first bayonet claw portions, and a restricting portion, wherein the camera mount is configured to be detachably mountable to the lens mount according to claim 1; and
    an image pickup element.

\* \* \* \* \*